US005872513A

United States Patent [19]

[11] Patent Number: 5,872,513

[45] Date of Patent: Feb. 16, 1999

Fitzgibbon et al.

[54] GARAGE DOOR OPENER AND WIRELESS KEYPAD TRANSMITTER WITH TEMPORARY PASSWORD FEATURE

[75] Inventors: James J. Fitzgibbon, Streamwood; Paul E. Wanis, Chicago, both of Ill.

[73] Assignee: The Chamberlain Group, Inc., Elmhurst, Ill.

[21] Appl. No.: 638,962

[22] Filed: Apr. 24, 1996

[51] Int. Cl.[6] ................................ G08B 1/08; G06F 7/04

[52] U.S. Cl. ........................ 340/539; 340/543; 340/932.2; 340/825.31; 340/825.34; 340/825.69; 49/25; 235/382; 235/382.5; 341/176; 361/171

[58] Field of Search .................................... 340/539, 543, 340/928, 932.2, 908.1, 908, 825.31, 825.32, 825.3, 825.34, 825.69, 825.72; 49/25; 235/382, 382.5, 384; 341/176; 361/171, 172

[56] References Cited

U.S. PATENT DOCUMENTS

| | | | |
|---|---|---|---|
| 3,716,865 | 2/1973 | Willmott | 343/225 |
| 3,906,348 | 9/1975 | Willmott | 325/37 |
| 4,037,201 | 7/1977 | Willmott | 340/167 R |
| 4,178,549 | 12/1979 | Ledenbach et al. | 325/38 R |
| 4,454,509 | 6/1984 | Buennagel et al. | 340/825.69 |
| 4,529,980 | 7/1985 | Liotine et al. | 340/825.52 |
| 4,535,333 | 8/1985 | Twardowski | 340/825.69 |
| 4,623,887 | 11/1986 | Welles, II | 340/825.57 |
| 4,626,848 | 12/1986 | Ehlers | 340/825.57 |
| 4,638,433 | 1/1987 | Schindler | 364/400 |
| 4,703,359 | 10/1987 | Rumbolt et al. | 358/194.1 |
| 4,750,118 | 6/1988 | Heitschel et al. | 364/400 |
| 4,802,114 | 1/1989 | Sogame | 364/900 |
| 4,807,052 | 2/1989 | Amano | 358/194.1 |
| 4,825,200 | 4/1989 | Evans et al. | 341/23 |
| 4,831,509 | 5/1989 | Jones et al. | 364/167.01 |
| 4,856,081 | 8/1989 | Smith | 455/151 |
| 4,905,279 | 2/1990 | Nishio | 380/9 |
| 4,922,168 | 5/1990 | Waggamon et al. | 318/286 |
| 4,988,987 | 1/1991 | Barrett et al. | 340/825.31 |
| 4,988,992 | 1/1991 | Heitschel et al. | 340/825.69 |
| 5,170,431 | 12/1992 | Dawson et al. | 380/23 |
| 5,412,379 | 5/1995 | Waraksa et al. | 340/825.72 |
| 5,420,925 | 5/1995 | Michaels | 380/23 |
| 5,471,668 | 11/1995 | Soenen et al. | 455/352 |

FOREIGN PATENT DOCUMENTS

WO 92/00638 1/1992 WIPO .

*Primary Examiner*—Donnie L. Crosland
*Attorney, Agent, or Firm*—Fitch, Even, Tabin & Flannery

[57] ABSTRACT

A garage door opener system includes providing temporary access permission for some user or users while maintaining near permanent access permission for other users. The temporary access permission may be controlled by number of uses or a predetermined amount of time.

18 Claims, 32 Drawing Sheets

TURN TRANSISTOR 368B ON AND 468 OFF
802

804
PINS P07 AND P08 LOW ?
YES
806
SWITCH 39D IS CLOSED
NO
808
TURN TRANSISTOR 368B OFF AND 369 ON
808
PAUSE
810
812
PINS P07 AND P08 LOW ?
YES
814
NO SWITCHES CLOSED
NO
PAUSE 2 MILLISECONDS
816
818
PINS P07 AND P08 LOW ?
YES
820
LIGHT SWITCH 396 CLOSED
NO
822
PAUSE 16 MILLISECONDS
824
PINS P07 AND P08 LOW ?
YES
826
VACATION SWITCH CLOSED 39C
NO
828
NO SWITCHES CLOSED
830
UPDATE SWITCHES STATUS AND RETURN

GARAGE DOOR OPENER AND WIRELESS KEYPAD TRANSMITTER WITH TEMPORARY PASSWORD FEATURE

BACKGROUND OF THE INVENTION

This invention relates to garage door actuation systems and particularly providing temporary access permission for some user or users while maintaining near-permanent access permission for other users.

In modern society, homeowners frequently have products delivered to their homes or admit workers to their homes to perform prearranged tasks. This usually involves the inconvenience of scheduling a time of arrival by the outsiders and the scheduling of homeowner time to meet and admit them. The some cases, the keys to the house may be given to the outsiders, however, given the ease of key copying, lending keys is not a situation undertaken lightly.

The garage door of many homes is controlled by a garage door opening apparatus which protects from unwanted uses by means of electronically transmitted and received access codes. The access codes and their use provide sufficient security that for many homeowners the garage door is one of the primary means of entering and exiting the house. Since the access codes of many garage door opening apparatuses are changeable, house access could be provided to outsiders by giving them an access code transmitter or access to a keypad type access code sender. After the outsiders no longer have a need to access the house, the garage door actuating apparatus could then be reprogrammed to new codes for continued high security. Although the reprogramming of existing garage door opening apparatus may provide a partial solution to the outside worker access problem, the reprogramming after the outsider use takes time and in some cases many never be done. Also, during a period of reprogrammed use it is possible that other regular users will be denied access and/or they may have to reprogram their access code transmitters.

A need exists for a door security system which provides access to outsiders for a limited period, does not limit access to regular users and which automatically removes the limited access by outsiders with little or no service inconvenience to regular users.

SUMMARY OF THE INVENTION

This need is met and an advance in the art is achieved with the present invention, in which a garage door actuating receiver stores both normal codes called semipermanent access codes for use by, for example, homeowners and temporary access codes for use by outsiders. The normal, semipermanent codes of the system remain unchanged and a temporary code can be programmed into the door opening system for use by outsiders. The receiver counts the passage of time and at some predetermined time after programming a temporary code, it is invalidated. The receiver responds to received access codes and activates the door only when a received code matches a stored valid code. Thus, the receiver never stops responding to proper semipermanent access codes so that regular users are not inconvenienced. On the other hand, the temporary codes are active for only a limited period, e.g. two hours. During that time the outside workers can enter the temporary access code and be admitted by the door opener. When two hours of our example expires, however, the temporary codes are automatically invalidated by the receiver, for example, by erasing them from memory. Accordingly, any attempt to use the temporary access code after two hours will be ignored.

Other arrangements for computing the duration of limited access might also be used, either alone or in conjunction with the elapsed time invalidation. For example, the temporary code might be stored in the receiver and invalidated after a predetermined number of uses to activate entry. After invalidation, re-use of the temporary code would be ignored.

According to an embodiment described below, a door jamb code transmitter called a keypad transmitter is used to enter temporary access codes during a temporary code learning and for outsider access. Before the outsiders arrive, the temporary access code is stored in the receiver along with the other specifics, such as number of entries or elapsed time. The temporary access code can then be given to the outsider who makes use of it by entering it into the keypad of the door jamb transmitter. The outsider can gain repeated access to the house via the key pad until the temporary access code is automatically invalidated when the elapsed time expires and/or the preset number of entries has occurred. The access of regular users of the door opener is not changed by the temporary code. Thus, all users have access to the house without difficult program changes and the temporary access automatically clears itself, also without reprogramming.

More specifically, the keypad transmitter permits activation of a barrier movement system by transmitting a rolling code including a fixed code portion. The fixed code portion includes an indication of which keypad keys were pressed by a user and which of three special keys, enter, * and #, have been used to initiate transmission. In ordinary usage of the keypad transmitter, the user enters four password digits and presses the enter button. A resulting rolling code is generated in which the fixed code portion conveys the password and enter button identity. The receiver interprets the rolling code and activates movement of a barrier or garage door. In accordance with a disclosed embodiment the operator can press the password and send it using the * key. When the receiver receives a password sent with the * key, it sets a temporary password learn mode.

When a four digit password and enter key indication is received from the keypad transmitter while the temporary password learn mode is active, the four digit password is entered as a temporary password and a learn duration mode is entered. The operator then sends a code to the receiver specifying either the amount of time for which the password is valid or the number of activations to be permitted using the temporary access code. The duration code is entered at the keypad by pressing keys to represent the numeric value and sending the code with the * key when time is represented, or the # key when activations are entered. The time or usage value is then stored in the receiver.

When time is the limiting factor for the temporary password, the receiver periodically decrements a timer and tests it for “0”. When the timer is found to have “0” value, the temporary password is erased from receiver memory. When the number of activations is the limiting factor, the stored usage value is decremented each time the temporary password is used and when it becomes “0” the temporary password is erased.

The attached Appendix, consisting of pages A-1 through A-83, is a program listing for a microcontroller used in the disclosed embodiment.

DETAILED DESCRIPTION OF THE PREFERRED EMBODIMENT

Figure 1:
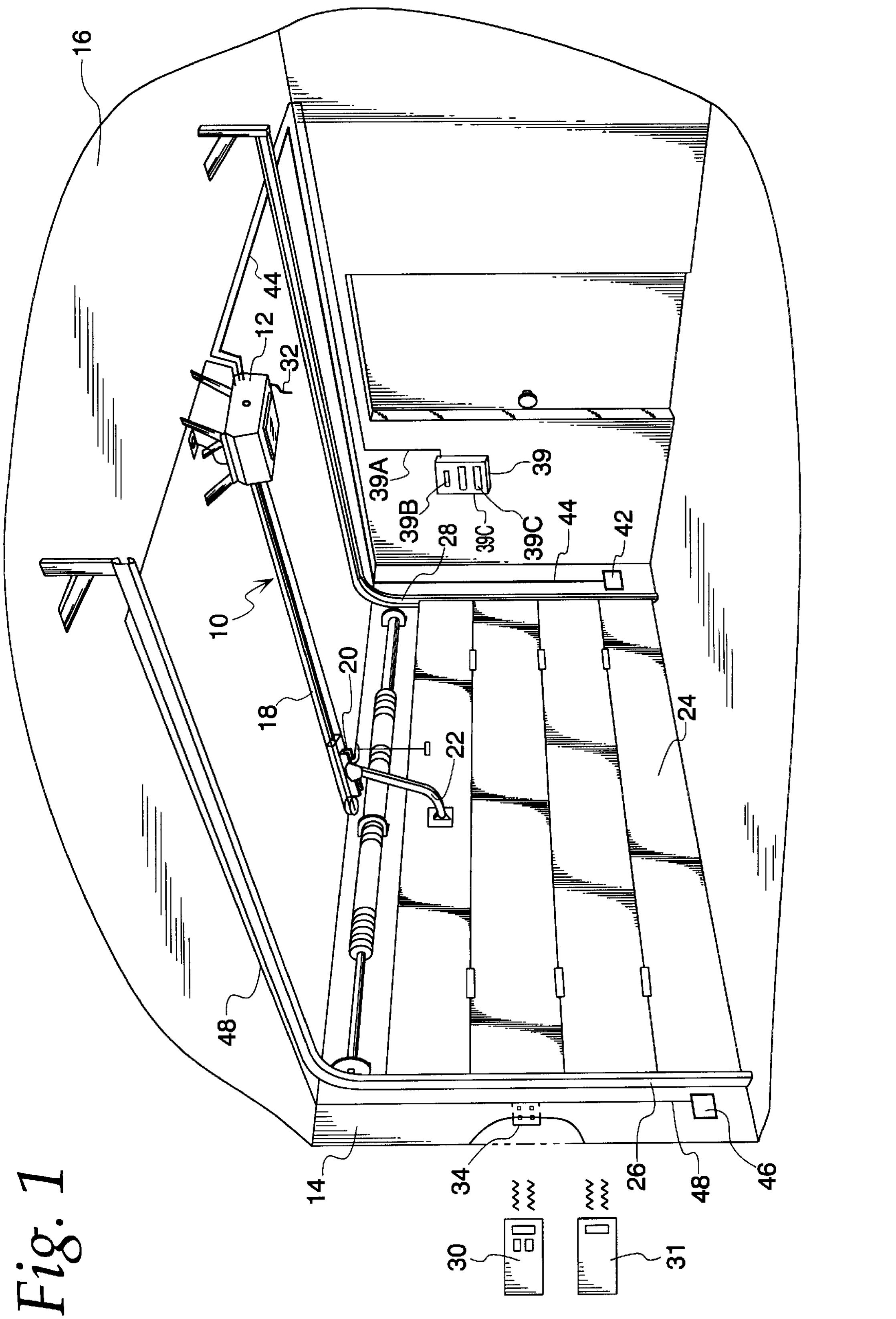
FIG. 1 is a perspective view of a garage having mounted within it a garage door operator embodying the present invention.

Referring now to the drawings and especially to FIG. 1, more specifically a movable barrier door operator or garage door operator is generally shown therein and referred to by numeral 10 includes a head unit 12 mounted within a garage 14. More specifically, the head unit 12 is mounted to the ceiling of the garage 14 and includes a rail 18 extending therefrom with a releasable trolley 20 attached having an arm 22 extending to a multiple paneled garage door 24 positioned for movement along a pair of door rails 26 and 28. The system includes a hand-held transmitter unit 30 adapted to send signals to an antenna 32 positioned on the head unit 12 and coupled to a receiver as will appear hereinafter. An external control pad 34 is positioned on the outside of the garage having a plurality of buttons thereon and communicate via radio frequency transmission with an antenna 32 of the head unit 12. A switch module 39 is mounted on a wall of the garage. The switch module 39 is connected to the head unit by a pair of wires 39*a*. The switch module 39 includes a light switch 39*b*, a lock switch 39*c* and a command switch 39*d*. An optical emitter 42 is connected via a power and signal line 44 to the head unit. An optical detector 46 is connected via a wire 48 to the head unit 12.

Figure 2:
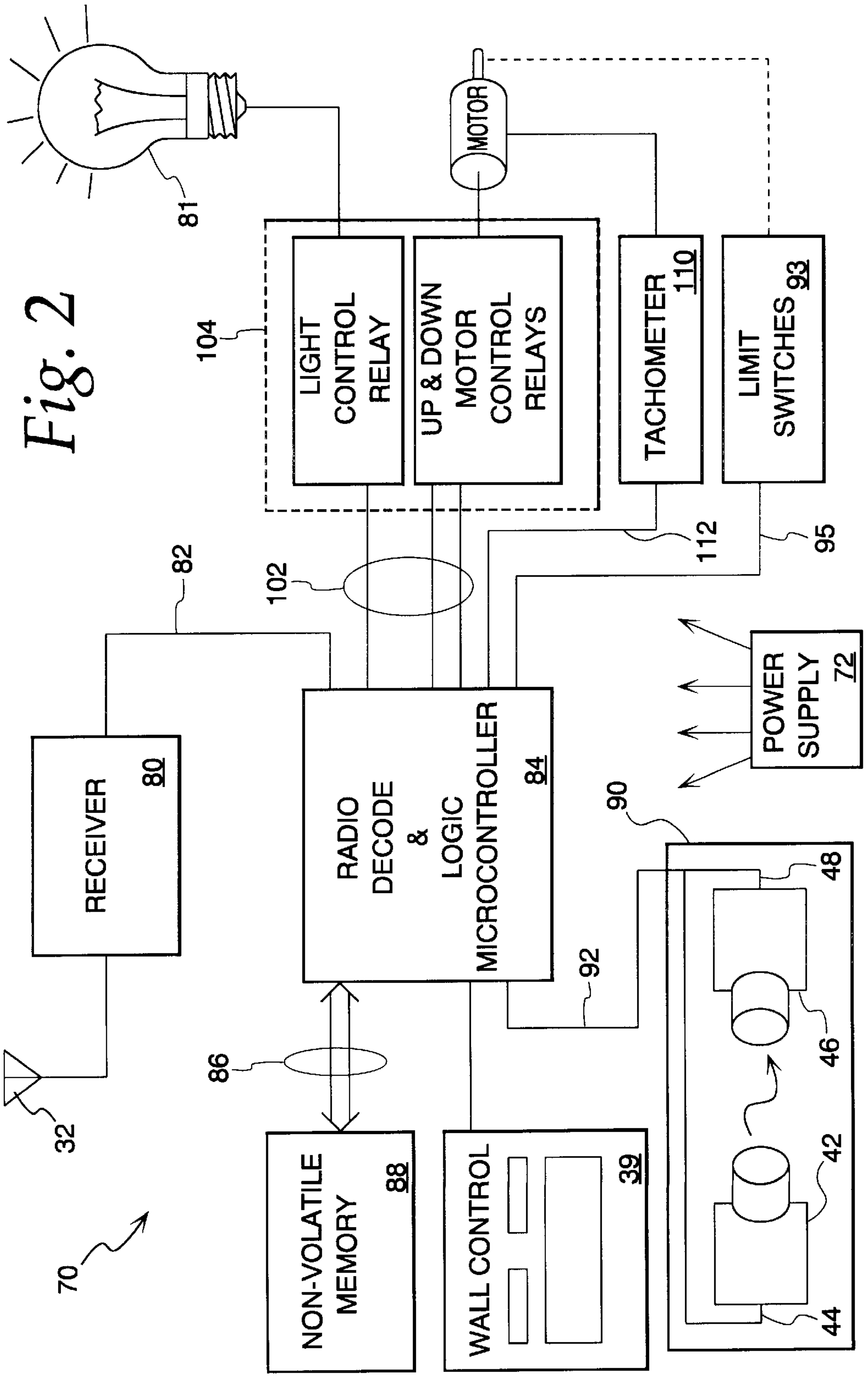
FIG. 2 is a block diagram of a controller mounted within the head unit of the garage door operator employed in the garage door operator shown in FIG. 1.
Figure 3A:
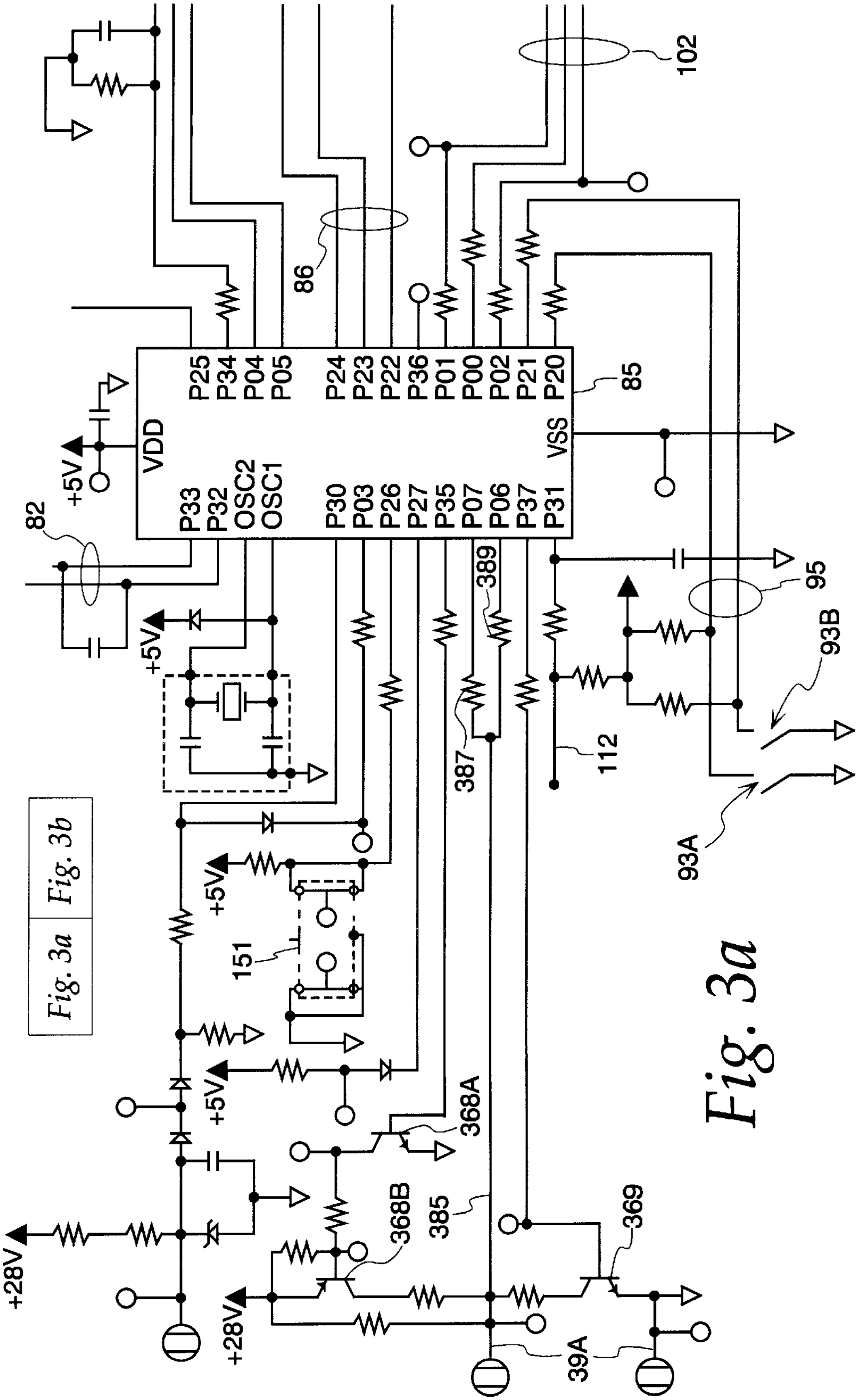
FIGS. 3*a*–3*b* are a schematic diagram of the controller shown in block format in FIG. 2.
Figure 3B:
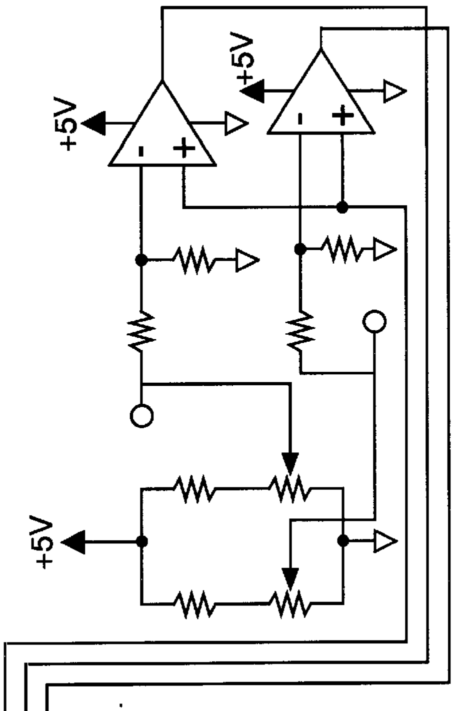
Figure 3B:
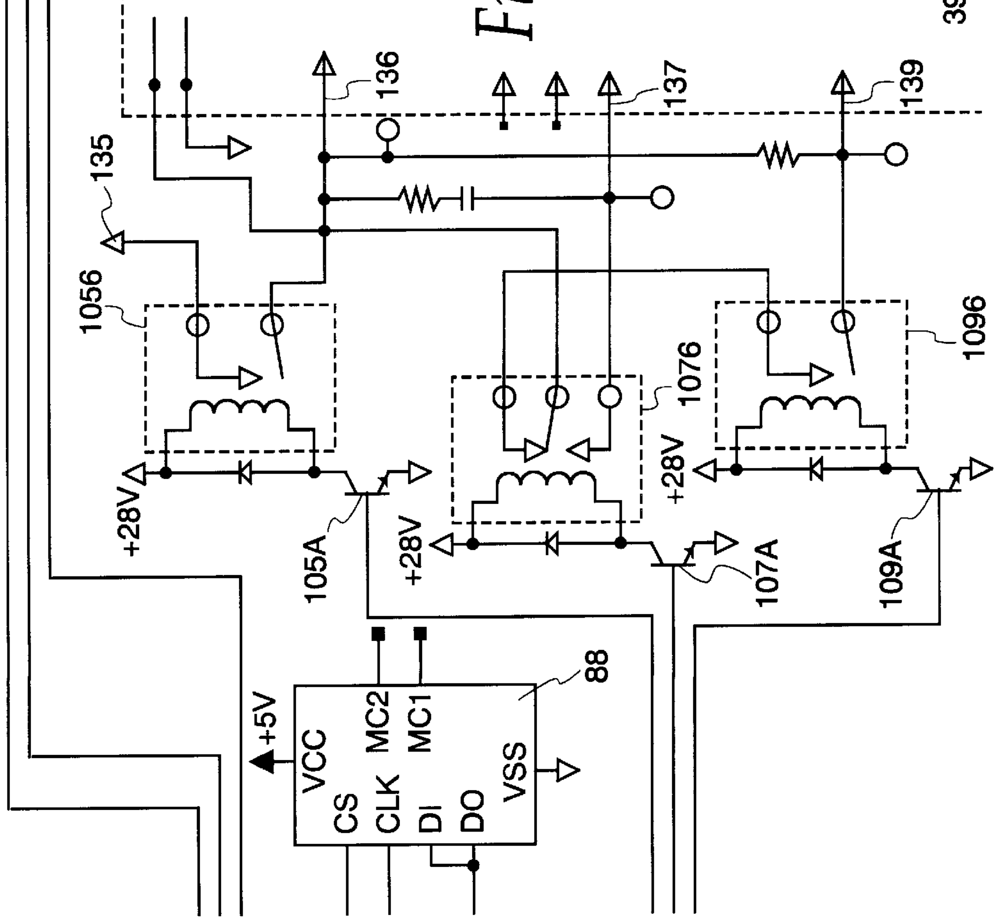

As shown in FIG. 2, the garage door operator 10, which includes the head unit 12 has a controller 70 which includes the antenna 32. The controller 70 includes a power supply 72 (FIG. 4) which receives alternating current from an alternating current source, such as 110 volt AC, and converts the alternating current to required levels of DC voltage. The controller 70 includes a super-regenerative receiver 80 (FIG. 5) coupled via a line 82 to supply demodulated digital signals to a microcontroller 84. The receiver 80 is energized by the power supply 72. The microcontroller is also coupled by a bus 86 to a non-volatile memory 88, which non-volatile memory stores user codes, and other digital data related to the operation of the control unit. An obstacle detector 90, which comprises the emitter 42 and infrared detector 46 is coupled via an obstacle detector bus 92 to the microcontroller. The obstacle detector bus 92 includes lines 44 and 48. The wall switch 39 (FIG. 6) is connected via the connecting wires 39*a* to the microcontroller 84. The microcontroller 84, in response to switch closures and received codes, will send signals over a relay logic line 102 to a relay logic module 104 connected to an alternating current motor 106 having a power take-off shaft 108 coupled to the transmission 18 of the garage door operator. A tachometer 110 is coupled to the shaft 108 and provides an RPM signal on a tachometer line 112 to the microcontroller 84; the tachometer signal being indicative of the speed of rotation of the motor. The apparatus also includes up limit switches 93*a* and down limit switches 93*b* which respectively sense when the door 24 is fully open of fully closed. The limit switches are shown in FIG. 2 as a functional box 93 connected to microcontroller 84 by leads 95.

Figure 4:
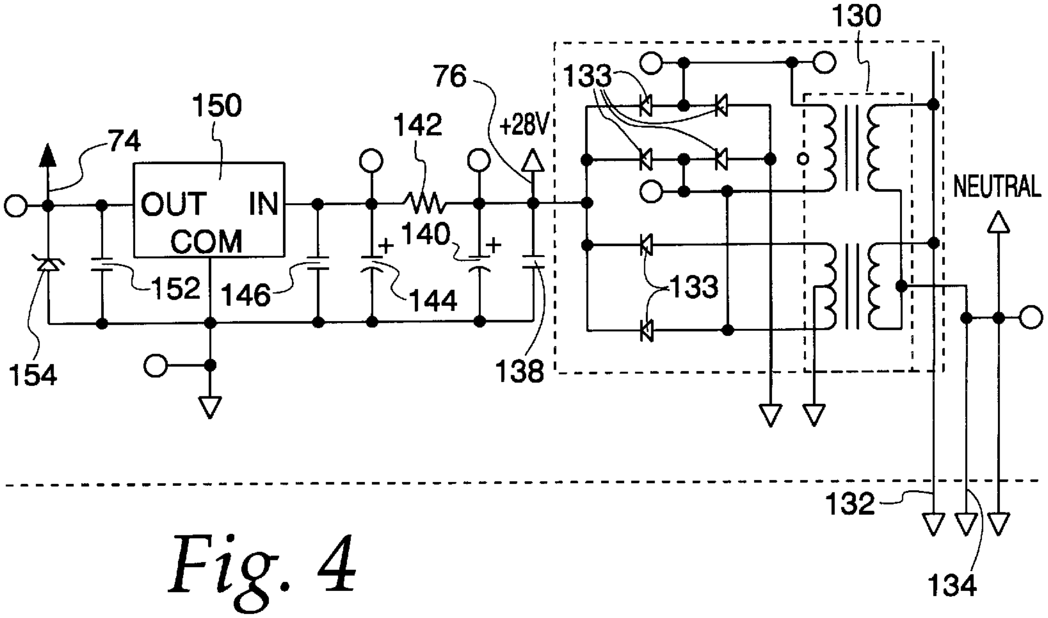
FIG. 4 shows a power supply for use with the apparatus.

FIG. 4 shows the power supply 72 for energizing the DC powered apparatus of FIG. 2. A transformer 130 receives alternating current on leads 132 and 134 from an external source of alternating current. The transformer steps down the voltage to 24 volts and the reduced feeds alternating current is rectified by a plurality of diodes 133. The resulting direct current is connected to a pair of capacitors 138 and 140 which provide a filtering function. A 28 volt filtered DC potential is supplied at a line 76. The DC potential is fed through a resistor 142 across a pair of filter capacitors 144 and 146, which are connected to a 5 volt voltage regulator 150, which supplies regulated 5 volt output voltage across a capacitor 152 and a Zener diode 154 to a line 74.

The controller 70 is capable of receiving and responding to a plurality of types of code transmitters such as the multibutton rolling code transmitter 30, single button fixed code transmitter 31 and keypad type door frame mount transmitter 34 (called keyless).

Figure 7:
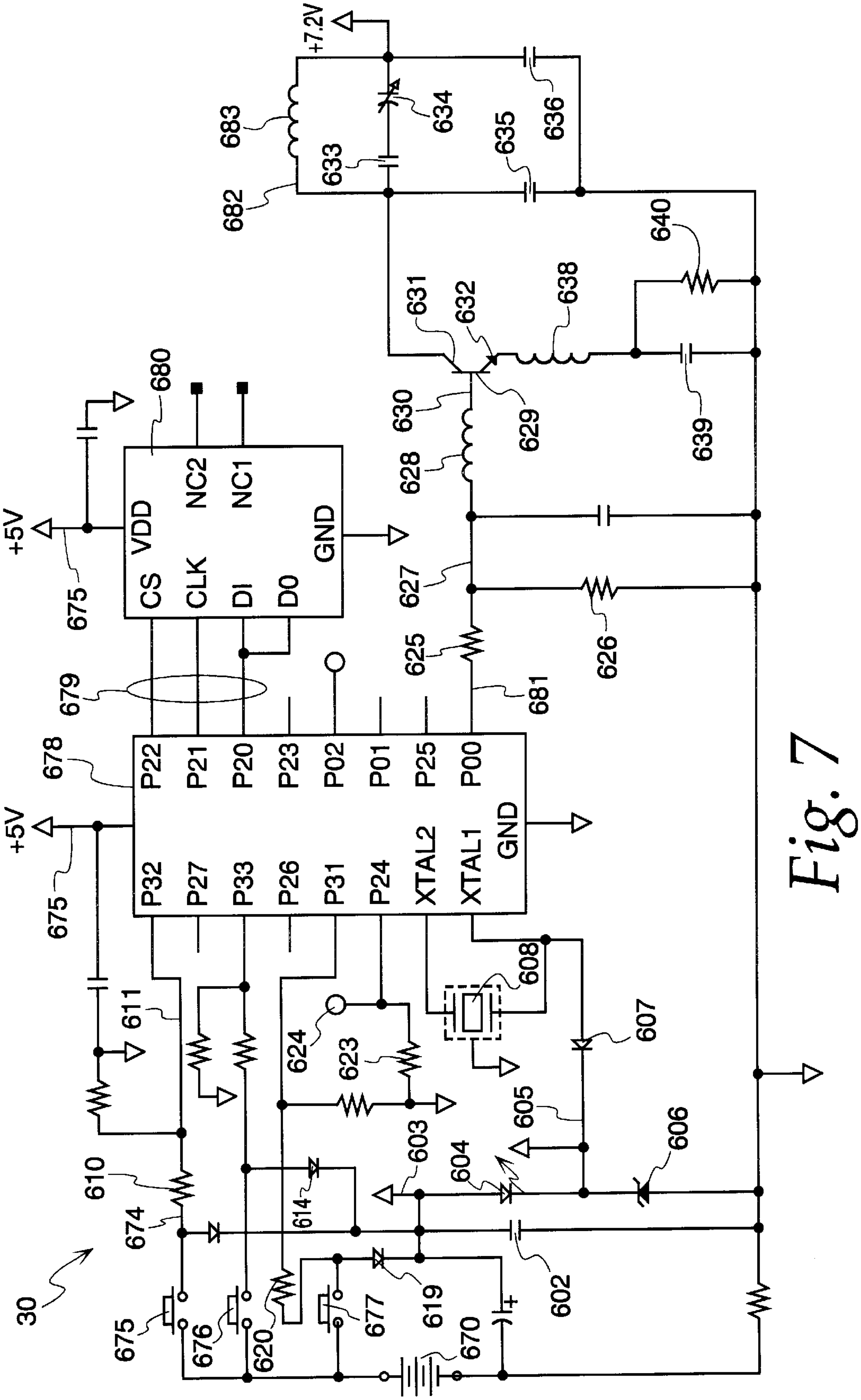
FIG. 7 is a circuit diagram of a rolling code transmitter.

Referring now to FIG. 7, the transmitter 30 is shown therein and includes a battery 670 connected to three pushbutton switches 675, 676 and 677. When one of the pushbutton switches is pressed, a power supply at 674 is enabled which powers the remaining circuitry for the transmission of security codes. The primary control of the transmitter 30 is performed by a microcontroller 678 which is connected by a serial bus 679 to a non-volatile memory 680. An output bus 681 connects the microcontroller to a radio frequency oscillator 682. The microcontroller 678 produces coded signals when a button 675, 676 or 677 is pushed causing the output of the RF oscillator 682 to be amplitude modulated to supply a radio frequency signal at an antenna 683 connected thereto. When switch 675 is closed, power is supplied through a diode 600 to a capacitor 602 to supply a 7.1 volt voltage at a lead 603 connected thereto. A light emitting diode 604 indicates that a transmitter button has been pushed and provides a voltage to a lead 605 connected thereto. The voltage at conductor 605 is applied via a conductor 675 to power microcontroller 678 which is a Zilog 125CO113 8-bit in this embodiment. The signal from switch 675 is also sent via a resistor 610 through a lead 611 to a P32 pin of the microcontroller 678. Likewise, when a switch 676 is closed, current is fed through a diode 614 to the lead 603 also causing the crystal 608 to be energized, powering up the microcontroller at the same time that pin P33 of the microcontroller is pulled up. Similarly, when a switch 677 is closed, power is fed through a diode 619 to the crystal 608 as well as pull up voltage being provided through a resistor 620 to the pin P31.

The microcontroller 678 is coupled via the serial bus 679 to a chip select port, a clock port and a DI port to which and from which serial data may be written and read and to which addresses may be applied. As will be seen hereinafter in the operation of the microcontroller, the microcontroller 678 produces output signals at the lead 681, which are supplied to a resistor 625 which is coupled to a voltage dividing resistor 626 feeding signals to the lead 628. A 30-nanohenry inductor 628 is coupled to an NPN transistor 629 at its base 620. The transistor 629 has a collector 631 and an emitter 632. The collector 631 is connected to the antenna 683 which, in this case, comprises a printed circuit board, loop antenna having an inductance of 25-nanohenries, comprising a portion of the tank circuit with a capacitor 633, a variable capacitor 634 for tuning, a capacitor 635 and a capacitor 636. A 30-nanohenry inductor 638 is coupled via a capacitor 639 to ground. The capacitor has a resistor 640 connected in parallel with it to ground. When the output from lead 681 is driven high by the microcontroller, the capacitor Q1 is switched on causing the tank circuit to output a signal on the antenna 683. When the capacitor is switched off, the output to the drive the tank circuit is extinguished causing the radio frequency signal at the antenna 683 also to be extinguished.

Figure 8:
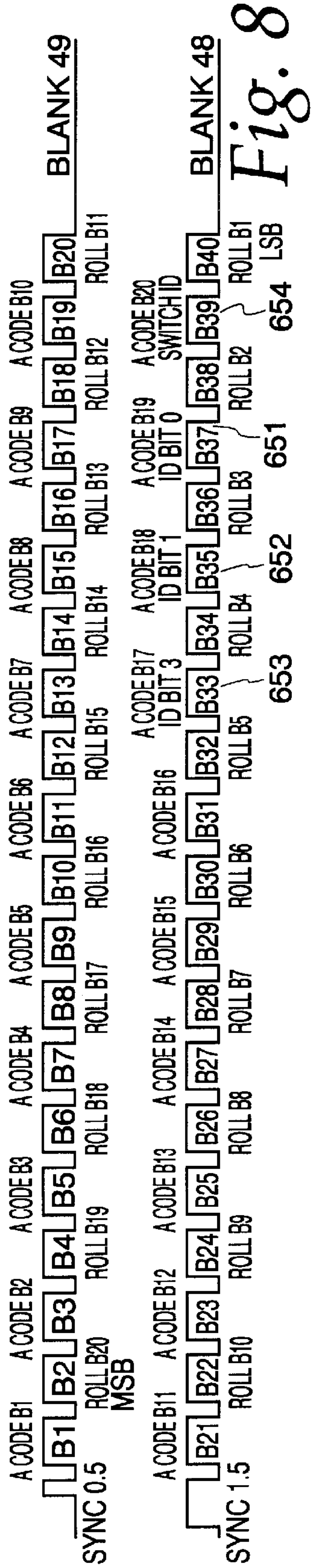
FIG. 8 is a representation of codes transmitted by the rolling code transmitter of FIG. 7.

Microcontroller 678 reads a counter value from nonvolatile memory 680 and generates therefrom a 20-bit (trinary) rolling code. The 20-bit rolling code is interleaved with a 20-bit fixed code stored in the nonvolatile memory 680 to form a 40-bit (trinary) code as shown in FIG. 8. The "fixed" code portion includes 3 bits 651, 652 and 653 (FIG. 8) which identify the type of transmitter sending the code and a function bit 654. Since bit 654 is a trinary bit, it is used to identify which of the three switches, 675, 676 or 677 was pushed.

Figure 9A:
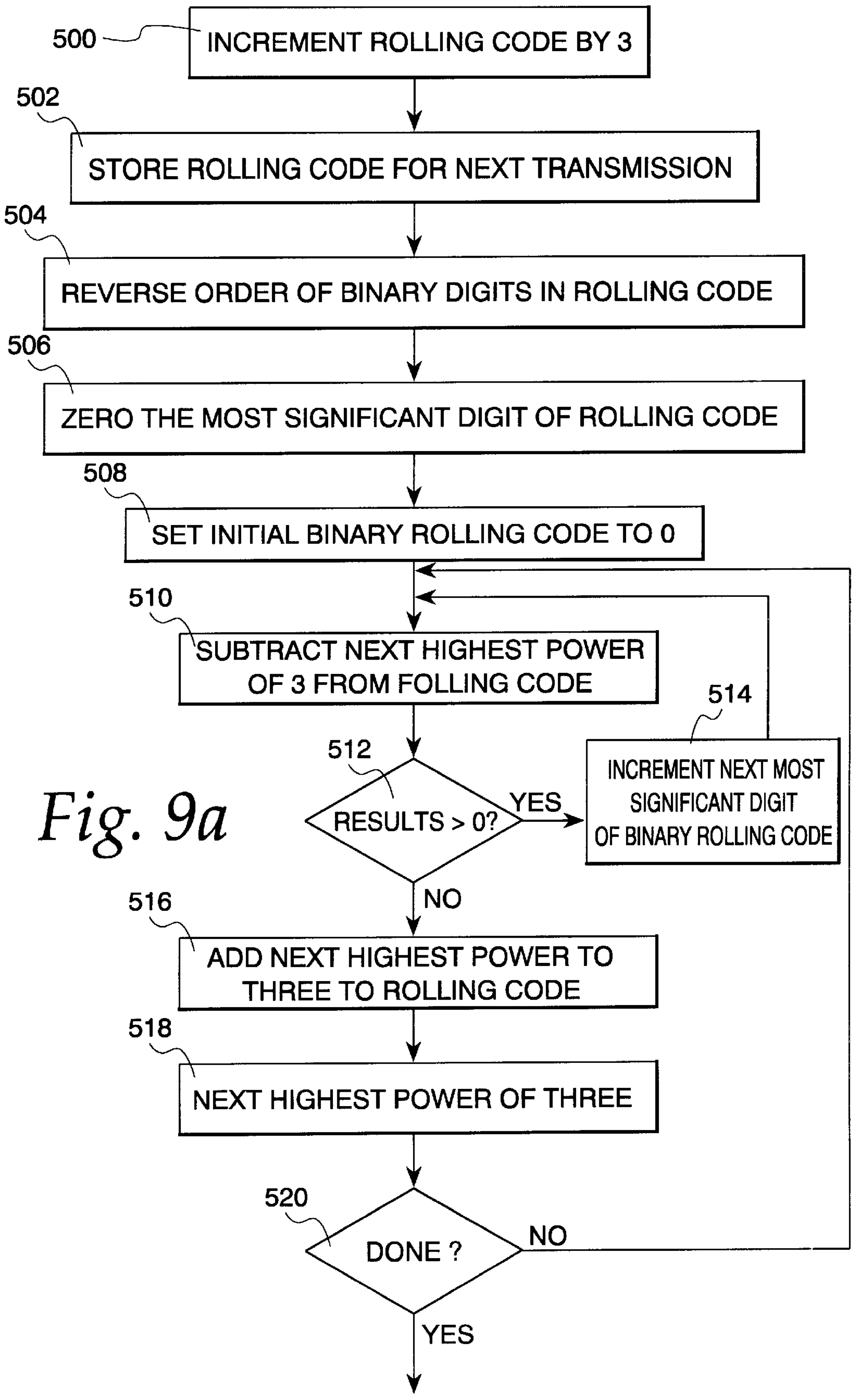
FIGS. 9*a*–9*b* are flow diagrams of the operation of the rolling code transmitter of FIG. 7.
Figure 9B:
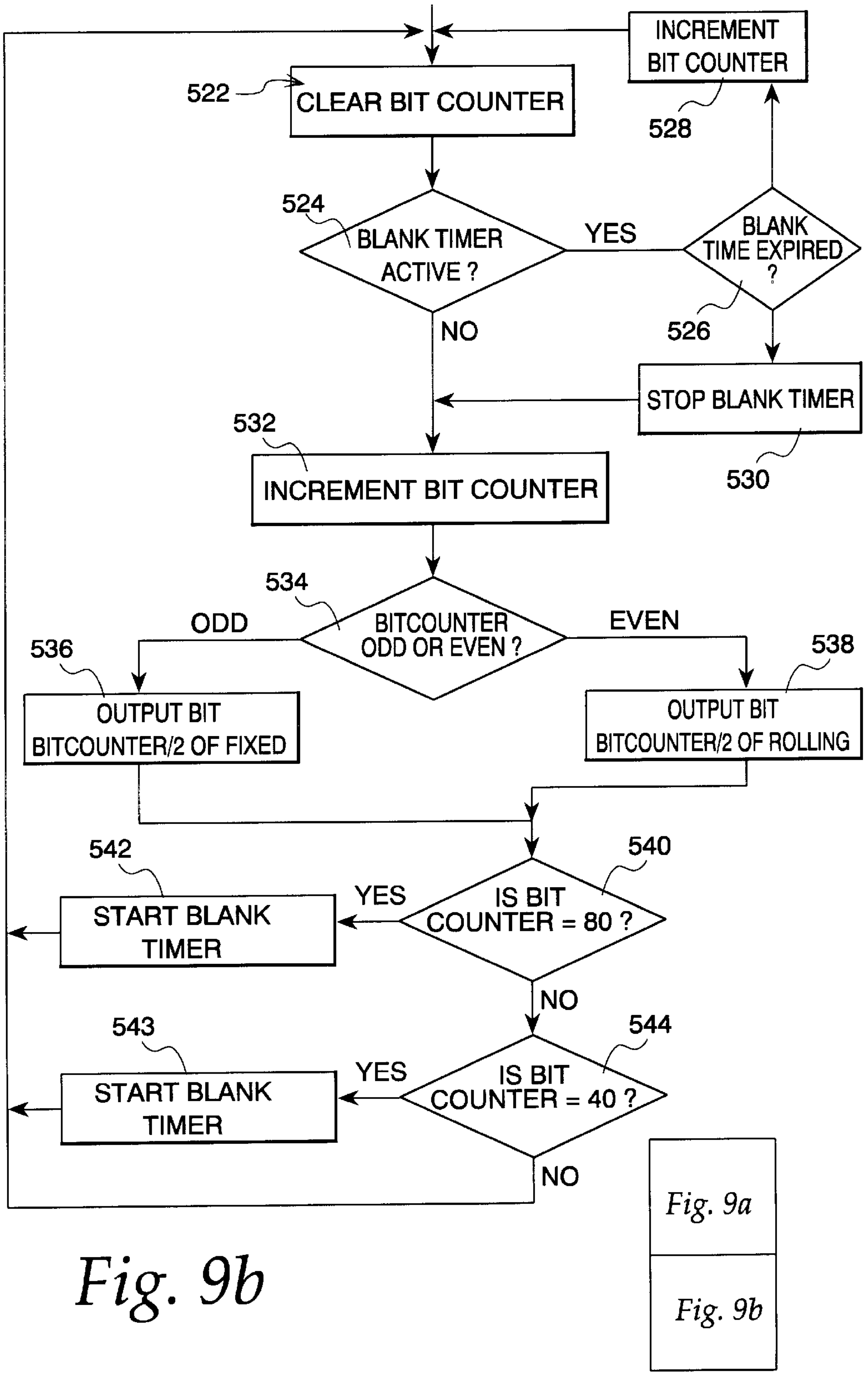

Referring now to FIGS. 9*a* through 9*b*, the flow chart set forth therein describes the operation of the transmitter 30. A rolling code from nonvolatile memory is incremented by three in a step 500, followed by the rolling code being stored for the next transmission from the transmitter when a transmitter button is pushed. The order of the binary digits in the rolling code is inverted or mirrored in a step 504, following which in a step 506, the most significant digit is converted to zero effectively truncating the binary rolling code. The rolling code is then changed to a trinary code having values 0, 1 and 2 and the initial trinary rolling code is set to 0. It may be appreciated that it is trinary code which is actually used to modify the radio frequency oscillator signal and the trinary code is best seen in FIG. 8. It may be noted that the bit timing in FIG. 8 for a 0 is 1.5 milliseconds down time and 0.5 millisecond up time, for a 1, 1 millisecond down and 1 millisecond up and for a 2, 0.5 millisecond down and 1.5 milliseconds up. The up time is actually the active time when carrier is being generated. The down time is inactive when the carrier is cut off. The codes are assembled in two frames, each of 20 trinary bits, with the first frame being identified by a 0.5 millisecond sync bit and the second frame being identified by a 1.5 millisecond sync bit.

In a step 510, the next highest power of 3 is subtracted from the rolling code and a test is made in a step 512 to determine if the result is equal to zero. If it is, the next most significant digit of the binary rolling code is incremented in a step 514, following which flow is returned to the step 510. If the result is not greater than 0, the next highest power of 3 is added to the rolling code in the step 516. In the step 518, another highest power of 3 is incremented and in a step 520, a test is determined as to whether the rolling code is completed. If it is not, control is transferred back to step 510. If it has, control is transferred to step 522 to clear the bit counter. In a step 524, the blank timer is tested to determine whether it is active or not. If it is not, a test is made in a step 526 to determine whether the blank time has expired. If the blank time has not expired, control is transferred to a step 528 in which the bit counter is incremented, following which control is transferred back to the decision step 524. If the blank time has expired as measured in decision step 526, the blank timer is stopped in a step 530 and the bit counter is incremented in a step 532. The bit counter is then tested for odd or even in a step 534. If the bit counter is not even, control is transferred to a step 536 where the bit of the fixed code bit counter divided by 2 is output. If the bit counter is even, the rolling code bit counter divided by 2 is output in a step 538. By the operation of 534, 536 and 538, the rolling code bits and fixed code bits are alternately transmitted. The bit counter is tested to determine whether it is set to equal to 80 in a step 540. If it is, the blank timer is started in a step 542. If it is not, the bit counter is tested for whether it is equal to 40 in a step 544. If it is, the blank timer is tested and is started in a step 544. If the bit counter is not equal to 40, control is transferred back to step 522.

Figure 10:
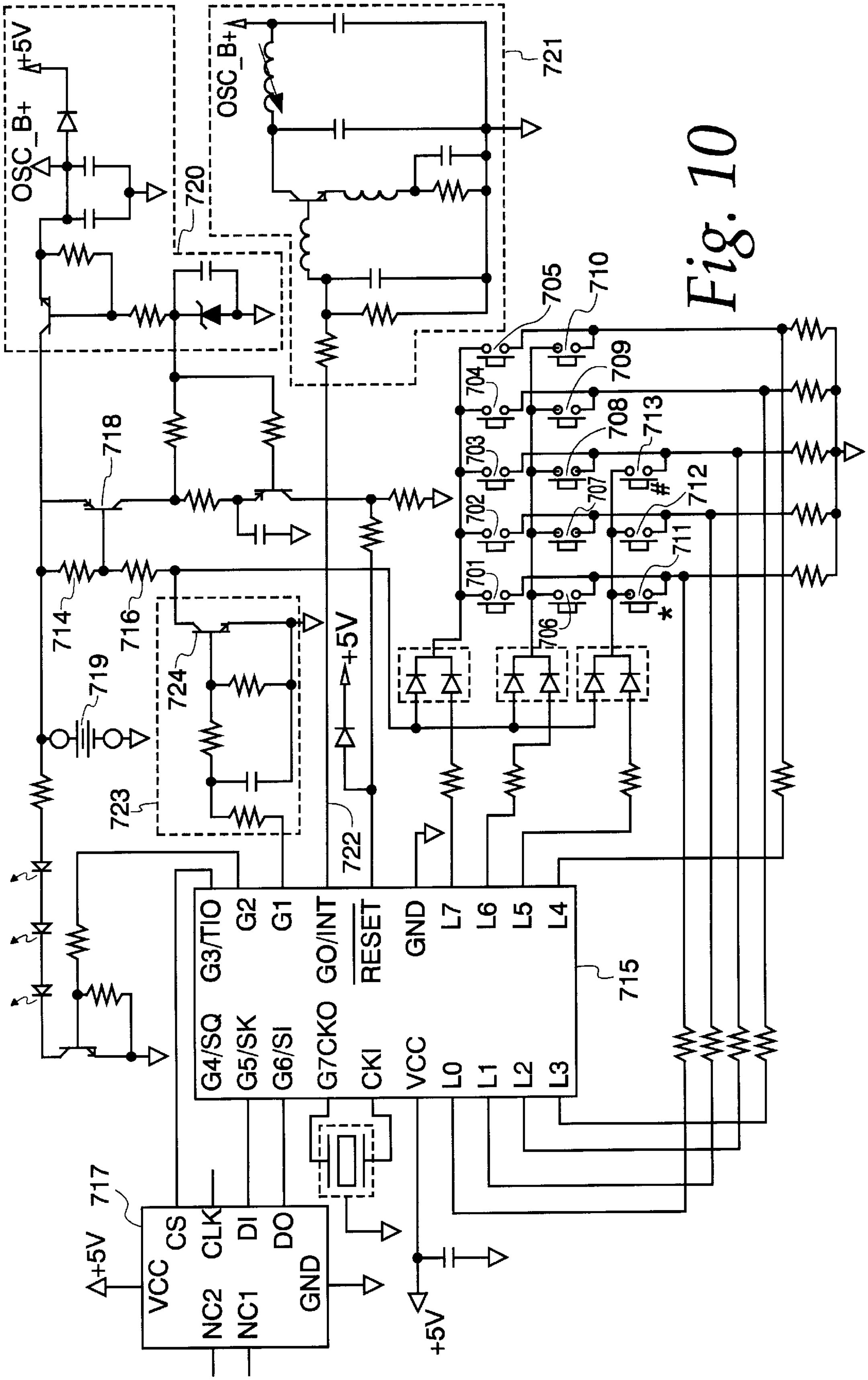
FIG. 10 is a circuit diagram of a keypad transmitter.

FIG. 10 shows a keypad type rolling code transmitter 34 which is sometimes referred to as a keyless transmitter because it replaces an old style entry in which a physical key was used. Transmitter 34 includes a microprocessor 715 and non-volatile memory 717 powered by a switched battery 719. Also included are 13 keys 710–713 connected in row and column format. The battery 719 is not normally supplying power to the transmitter. When a button, e.g. 701, is pressed, current flows through series connected resistors 714 and 716 and through the pressed switch to ground. Voltage division by resistors 714 and 716 causes the power supply 720 to be switched on, supplying power from battery 719 to microprocessor 715, memory 717 and an RF transmitter stage 721. Initially, microprocessor 715 enables a power on circuit 723 to cause a transistor 724 to conduct, thereby keeping the power supply 720 active. Microprocessor 715 includes a timer which disables power on circuit 723 a predetermined period of time, e.g. 10 seconds, after the last key 701–713 is pressed, to preserve battery life.

Figure 11:
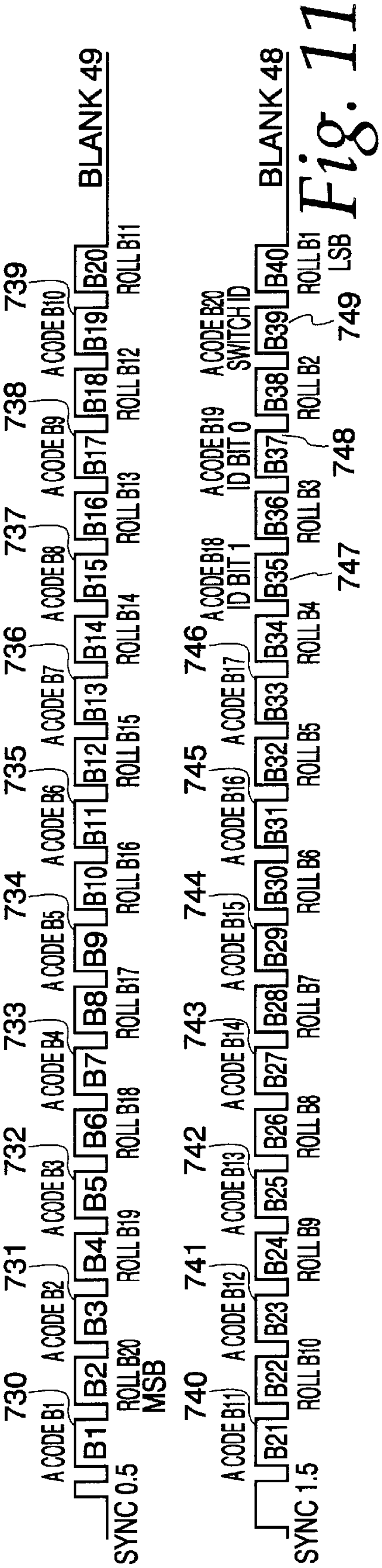
FIG. 11 is a representation of the codes transmitted by the keypad transmitter of FIG. 10.

The row and column conductors are repeatedly sensed at input terminals L0–L7 of the microprocessor 715 so that microprocessor 715 can read each key pressed and store a representation thereof. A human operator presses a number of, for example, four keys followed by pressing the enter key 712, the * key 711 or the # key 713. When one of the keys 711–713 is pressed, microprocessor 715 generates a 40-bit (trinary) code which is sent via conductors 722 to transmitter stage 721 for transmission. The code is formed by microprocessor 715 from a fixed code portion and a rolling code portion in the manner previously described with regard to transmitter 30. The fixed code portion comprises, however, a serial number associated with the transmitter 34 and a key press portion identifying the four keys pressed and which of the three keys 711–713 initiated the transmission. FIG. 11 represents the code transmitted by keypad transmitter 34. As with prior rolling code transmission, the code consists of alternating fixed and rolling code bits (trinary). Bits 730–749 are the fixed code bits. Bits 730–739 represent the keys pressed and bits 740–748 represent the serial number of the unit in which bits 746–748 represent the type of transmitter. In some transmitters 34 no * and # keys are present. In this situation the * and # keys are respectively simulated by simultaneously pressing the 9 key and enter key or the 0 key and enter key.

Figure 12:
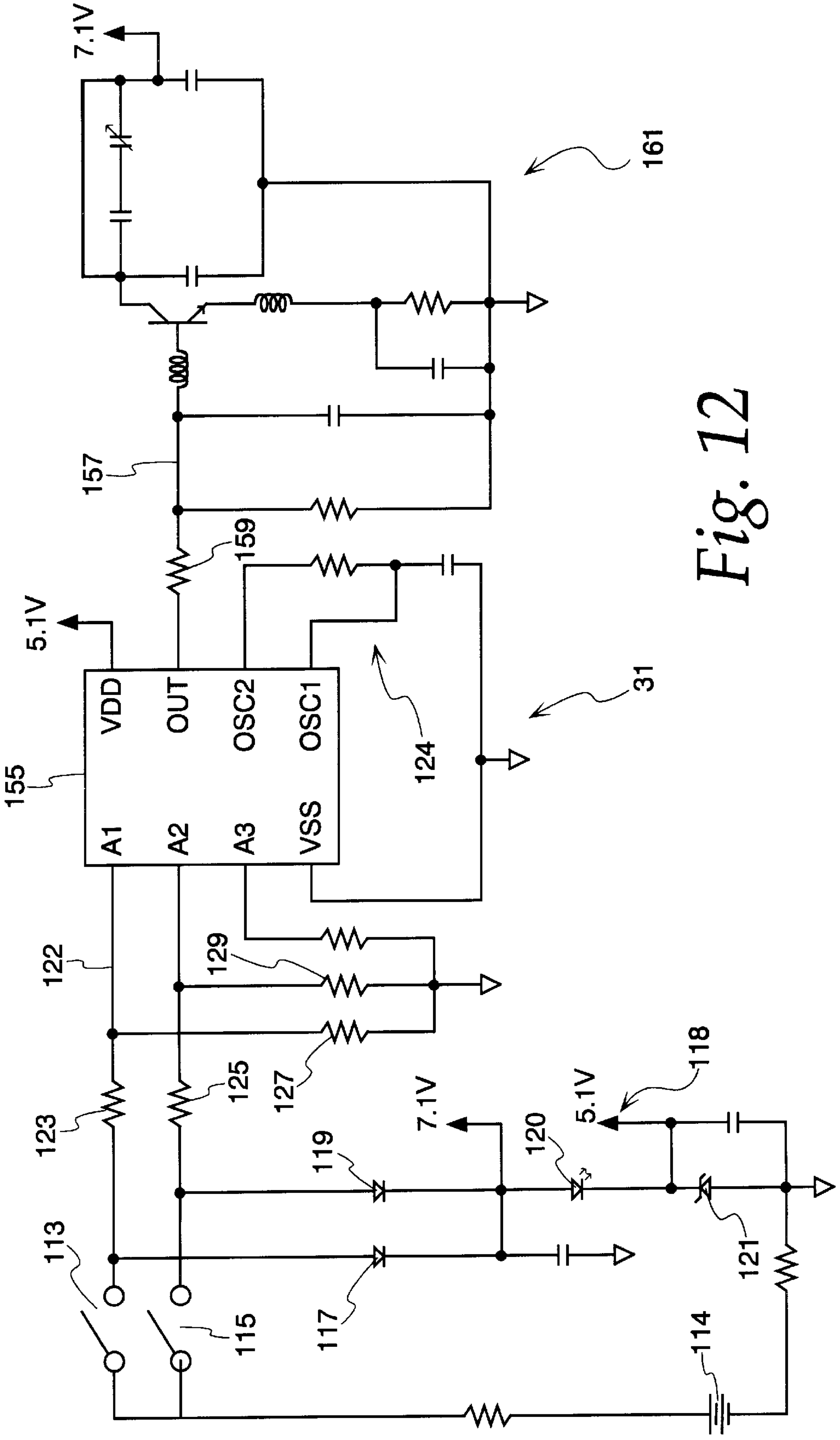
FIG. 12 is a circuit diagram of a fixed code transmitter.

FIG. 12 is a circuit description of a fixed code transmitter 31 which includes a controller 155, a pair of switches 113 and 115, a battery 114 and an RF transmitter stage 161 of the type discussed above. Controller 155 is a relatively simple device and may be a combination logic circuit. Controller 155 permanently stores 19 bits (trinary) of the 20 bit fixed code (FIG. 13) to be transmitted. When a switch, e.g., 113, is pressed, current from the battery 114 is applied via the switch 113 and a diode 117 to a 7.1 volt source 116 which powers RF transmitter stage 161. The 7.1 volt source is also connected to ground via a LED 120 and Zener diode 121 which produces a regulated 5.1 volt source 118. The 5.1 volt source is connected to power the controller 155.

Closing switch 113 also applies battery voltage to series connected resistors 123 and 127 so that upon switch 113 closing, a voltage on a conductor 122 rises from substantially ground to an amount representing a logic "1". Upon power up, controller 155 reads the logic 1 on conductor 122 and generates a 20 bit (trinary) code from the permanently stored 19 bits integral to the controller and the state of the switch 113. Controller 155 then transmits the 20 bit code to the RF stage 161 via a resistor 159 and conductor 157. The code is thus transmitted to receiver 80. Controller 155 includes an internal oscillator regulated by an RC circuit 124 to control the timing of controller operations.

Figure 13:
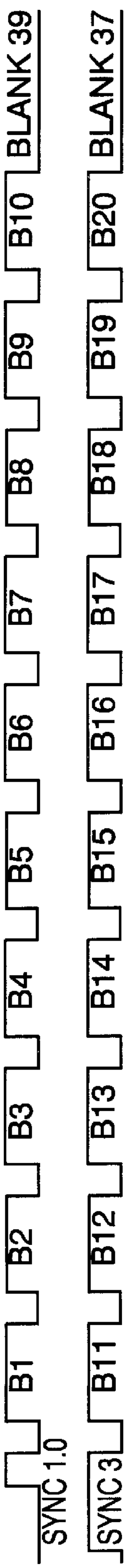
FIG. 13 is a representation of the codes transmitted by the fixed code transmitter of FIG. 12.

FIG. 13 represents the code transmitted from a fixed code transmitter such as transmitter 30. The code comprises 20 bits in two 10 bit words with a blank period between the words. Each word is preceded by a sync bit which allows receiver synchronization and which identifies the type of code being sent. The sync bit for the first code word is active for approximately 1.0 milliseconds and the sync bit of the second word is active for approximate 3 milliseconds.

Figure 6:
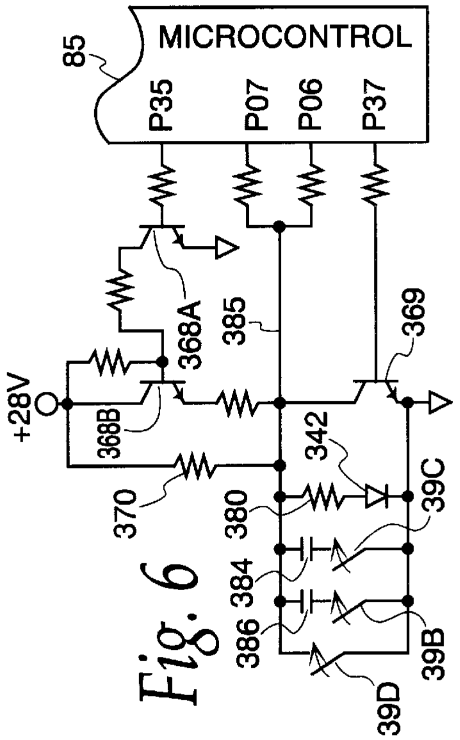
FIG. 6 is a circuit diagram of a wall switch used in the embodiment.
Figure 14:
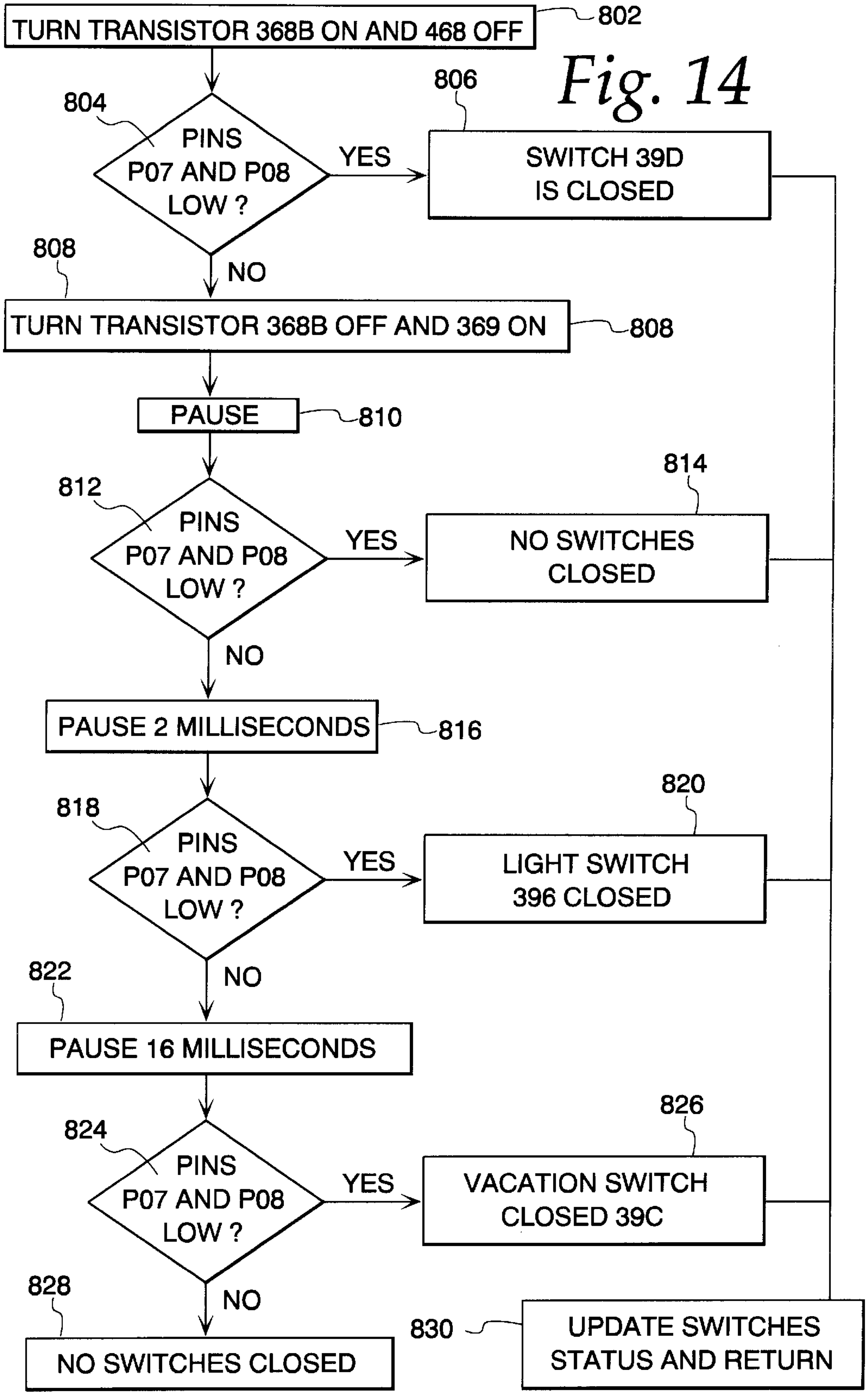
FIG. 14 is a flow diagram of the interrogation of the wall switch of FIG. 6.

The wall switch 39 is shown in detail in FIG. 6 along with a portion of microcontroller 85 and the interrogate/sense circuitry interconnecting the two. Wall switch 39 comprises three switches 39*b*–39*d*. Switch 39*d* is the command switch which is connected directly between the conductors 39*a*. Switch 39*b*, the light switch, is connected between the conductors 39*a* via a 1 microfarad capacitor 386. Switch 39*c*, the vacation or lock switch, is connected between conductors 39*a* by a 22 microfarad capacitor 384. Wall switch 39 also includes a resistor 380 and diode 392 serially connected between conductors 39*a*. Microcontroller 85 interrogates the wall switch 39 approximately once every 10 milliseconds to determine whether a button 39*b–d* is being pressed. FIG. 14 is a flow diagram of the interrogation. At the beginning (step 802, FIG. 14) of each test, microcontroller 85 turns on transistor 368*b* by a signal applied from pin P35 to the base of transistor 368*a* and at the same time turns a transistor 369 off from pin P37. Pins P07 and P06 are connected to read the voltage level between conductors 39*a* by a conductor 385 and respective resistors 387 and 389. If pins P07 and P06 are low (step 804) the command switch 39*d* is closed (step 806) and a status bit is marked in RAM (step 830) to indicate such. Alternatively, if pins P07 and P06 are high, further tests (step 803) must be performed. First, microcontroller 85 turns transistor 368*b* off and transistor 369 on. Then, after a short pause (step 810) to allow stay capacitance to discharge, pins P07 and P06 are again sensed (step 812). If P07 and P06 are low, no switches have been closed (step 814) and their status in RAM is so set (step 830). However, if after the short pause the level of conductor 385 is high, microcontroller 85 waits approximately 2 milliseconds (step 816) and again tests (step 818) the voltage level of conductor 385. If the voltage is now low, the light switch 396 has been closed (step 820). This assessment can be made since 2 milliseconds is adequate time for the 1 microfarad capacitor 386 to discharge. If the input at pins P07 and P06 is still high at the 2 millisecond test, the controller retests (step 824) after an additional 16 millisecond delay (step 822). If the pins P07 and P06 are low after the 16 millisecond delay, the vacation switch 39*c* was closed (step 826) and, alternatively, if the voltage at pins P07 and P06 is high, no switches were closed (step 828). At the completion of the wall switch test the status bits of the three switches 39*b*, 39*c* and 39*d* are set to reflect their identified state (step 830).

Figure 5:
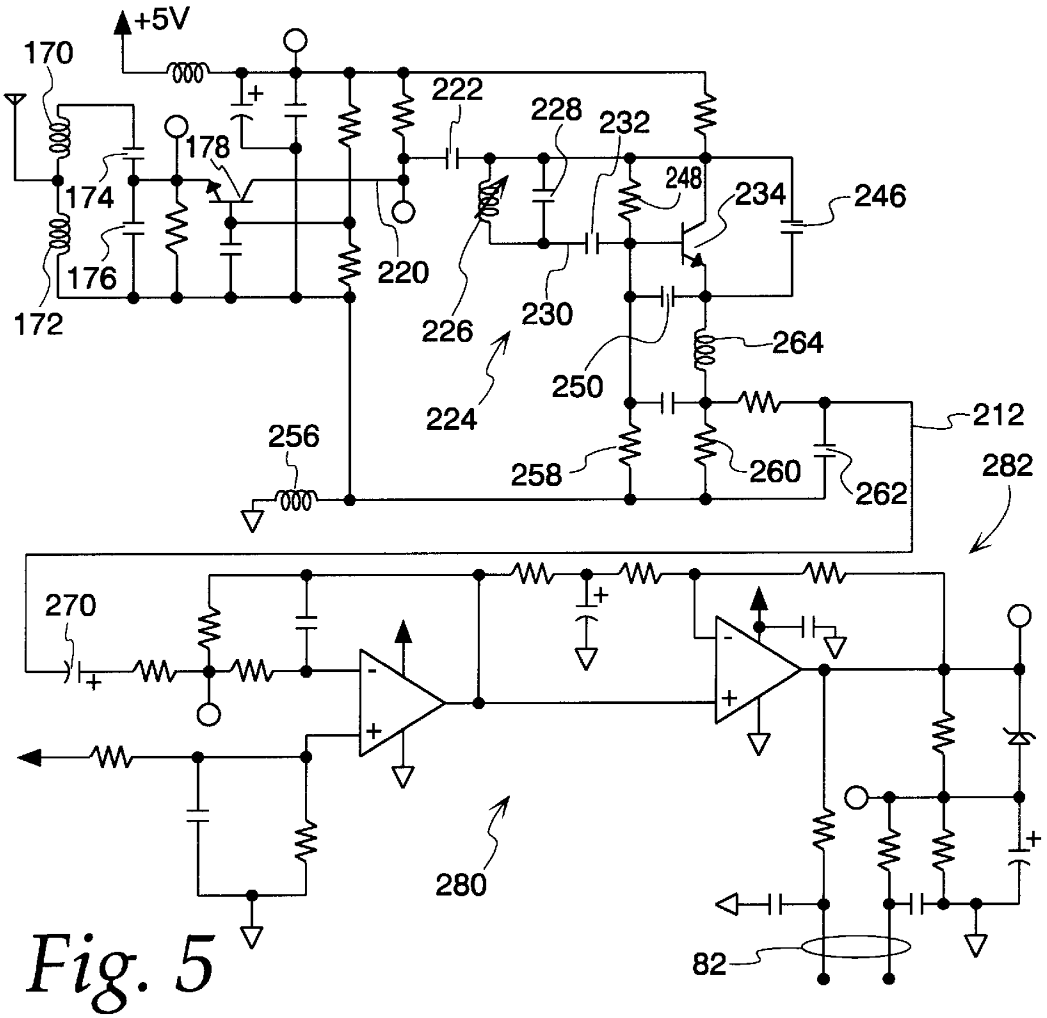
FIG. 5 is a detailed circuit description of the radio receiver used in the apparatus.

The receiver 80 is shown in detail in FIG. 5. RF signals may be received by the controller 70 at the antenna 32 and fed to the receiver 80. The receiver 80 includes a pair of inductors 170 and 172 and a pair of capacitors 174 and 176 that provide impedance matching between the antenna 32 and other portions of the receiver. An NPN transistor 178 is connected in common base configuration as a buffer amplifier. The RF output signal is supplied on a line 200, coupled between the collector of the transistor 178 and a coupling capacitor 220. The buffered radio frequency signal is fed via the coupling capacitor 222 to a tuned circuit 224 comprising a variable inductor 226 connected in parallel with a capacitor 228. Signals from the tuned circuit 224 are fed on a line 230 to a coupling capacitor 232 which is connected to an NPN transistor 234 at its base. The collector 240 of transistor 234 is connected to a feedback capacitor 246 and a feedback resistor 248. The emitter is also coupled to the feedback capacitor 246 and to a capacitor 250. A choke inductor 256 provides ground potential to a pair of resistors 258 and 260 as well as a capacitor 262. The resistor 258 is connected to the base of the transistor 234. The resistor 260 is connected via an inductor 264 to the emitter of the transistor 234. The output signal from the transistor is fed outward on a line 212 to an electrolytic capacitor 270.

As shown in FIG. 5, the capacitor 270 couples the demodulated radio frequency signal from transistor 234 to a bandpass amplifier 280 to an average detector 282. An output of the bandpass amplifier 280 is coupled to pin P32 of a Z86233 microcontroller 85. Similarly, an output of average detector 282 is connected to pin P33 of the microcontroller. The microcontroller is energized by the power supply 72 and also controlled by the wall switch 39 coupled to the microcontroller by the lead 39*a*.

Pin P26 of microcontroller 85 is connected to a grounding program switch 151 which is located at the head end unit 12. Microcontroller 85 periodically reads switch 151 to determine whether it has been pressed. As discussed later herein, switch 151 is normally pressed by an operator who wants to enter a learn or programming mode to add a new transmitter to the accepted transmitters last stored in the receiver. When the operator continuously presses switch 151 for 6 seconds or more, all memory settings are overwritten and a complete relearning of transmitter codes and the type of codes to be received is then needed. Pressing switch 151 for a momentary time after a 6+ second press enters the apparatus into a mode for learning a new transmitter type which can be either rolling code type or fixed code type.

Pins P30 and P03 of microcontroller 85 are connected to obstacle detector 90 via conductor 92. Obstacle detector 90 transmits a pulse on conductor 92 every 10 milliseconds when the infrared beam between sender 42 and receiver has not been broken by an obstacle. When the infrared beam is blocked, one or more pulses will be skipped by the obstacle detector 46. Microcontroller scans the signal on conductor 92 every 1 millisecond to determine if a pulse has been received in the last 12 milliseconds. When a pulse has not been received, an obstacle is assumed and appropriate action, as discussed below, may be taken.

Microcontroller pin P31 is connected to tachometer 110 via conductor 112. When motor 106 is turning, pulses having a time separation proportional to motor speed are sent on conductor 112. The pulses on conductor 112 are repeatedly scanned by microcontroller 85 to identify if the motor 106 is rotating and, if so, how fast the rotation is occurring.

The apparatus includes an up limit switch 93*a* and a down limit switch 93*b* which detect the maximum upward travel of door 24 and the maximum downward travel of the door. The limit switches 93*a* and 93*b* may be connected to the garage structure and physically detect the door travel or, as in the present embodiment, they may be connected to a mechanical linkage inside head end 12, which arrangement moves a cog (not shown) in proportion to the actual door movement and the limit switches detect the position of the moved cog. The limit switches are normally open. When the door is at the maximum upward travel, up limit switch 93*a* is closed, which closure is sensed at port P20 of microcontroller 85. When the door is at its maximum down position, down limit switch 93*b* will close, which closure is sensed at port P21 of the microcontroller.

The microcontroller 85 responds to signals received from the wall switch 39, the transmitters 30 and 34, the up and down limit switches, the obstruction detector and the RPM signal to control the motor 106 and the light 81 by means of the light and motor control relays 104. The on or off state of light 81 is controlled by a relay 105*b*, which is energized by pin P01 of microcontroller 85 and a driver transistor 105*a*. The motor 106 up windings are energized by a relay 107*b* which responds to pin P00 of microcontroller 85 via driver transistor 107*a* and the down windings are energized by relay 109*b* which responds to pin P02 of microcontroller 85 via a driver transistor 109*a*.

Each of the pins P00, P01 and P02 is associated with a memory mapped bit, such as a flip/flop, which can be written and read. The light can thus be turned on by writing a logical "1" in the bit associated with pin P01 which will drive transistor 105*a* on energizing relay 105*b*, causing the lights to light via the contacts of relay 105*b* connecting a hot AC input 135 to the light output 136. The status of the light 81 can be determined by reading the bit associated with pin P01. Similar actions with regard to pins P00 and P02 are used to control the up and down rotation of motor 106. It should be mentioned, however, that energizing the light relay 105*b* provides hot AC to the up and down motor relays 107*b* and 109*b* so the light should be enabled each time a door movement is desired.

The radio decode and logic microcontroller 84 (FIG. 2) of the present embodiment can respond to both rolling codes as shown in FIG. 8 and fixed codes as shown in FIG. 13; however, after it has learned one type of code all permissible codes will be of the same type until the system memory is erased and the other type of code is entered and exclusively responded to. When the apparatus is first powered up or after memory control values have been erased in response to a greater than 6 second press of program button 151, the system does not know whether it will be trained to respond to fixed or rolling codes. Accordingly, the system enters a test mode to enable it to receive both types of access codes and determine which type of code is being received. In the test mode the apparatus periodically resets itself to receive one of rolling codes or alternatively, fixed codes, until a code of the expected type is received. A short press of switch 151 after the 6+ second press causes a learn mode to be entered. When a code is correctly received in the test mode, and the apparatus is in a learn mode, the type of expected code becomes the code type to be received and the received fixed code or fixed code portion of a received rolling code is stored in nonvolatile memory for use in matching later received codes. In the case of a received rolling code, the rolling code portion is also stored in association with the stored fixed code portion to be used in matching subsequently received rolling codes. After a rolling code has been learned by the system, only additional rolling codes can be learned until a reprogramming occurs. Similarly, after a fixed code is learned, only additional fixed codes can be received and learned until reprogramming occurs.

Figure 15:
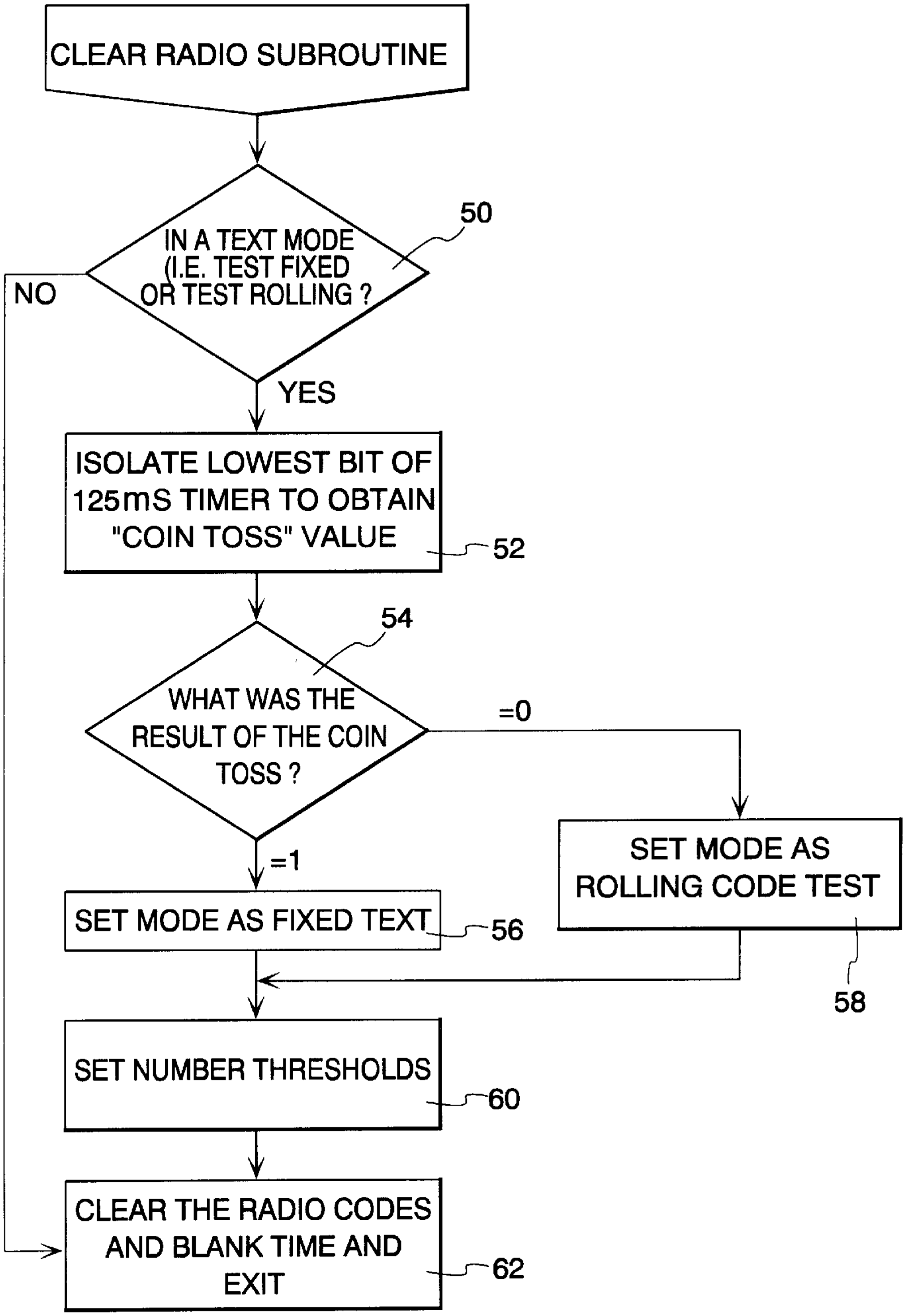
FIG. 15 is a flow diagram of a clear radio subroutine performed by a controller of the embodiment.

From time to time while receiving incoming codes, it is determined that a code being received is not proper and a clear radio subroutine (FIG. 15) is called by microcontroller 85. A decision step 50 is first performed to determine whether the apparatus is in a test mode or a regular mode. When not in a test mode, flow proceeds to a step 62 to clear radio codes and blank timer after which the subroutine is exited. When decision step 50 identifies the test mode, steps 52–60 are performed to arbitrarily select the fixed code or rolling code mode and set up necessary values to seek the selected mode. In step 52 the lowest bit of a continuous timer is selected as a randomizer. The value of the lowest bit is then analyzed in a decision step 54. When the lowest bit is a "1" the fixed test mode is selected in step 56 and the numeric thresholds needed for receiving fixed codes are stored in a step 60 before clearing the radio codes and exiting in step 62. When decision step 54 determines that the lowest bit is a "0", the rolling code mode is selected in step 58 followed by the storage of rolling code numeric threshold values in step 60. Flow proceeds to step 62 when radio codes are cleared and the clear radio subroutine is exited.

Figure 16:
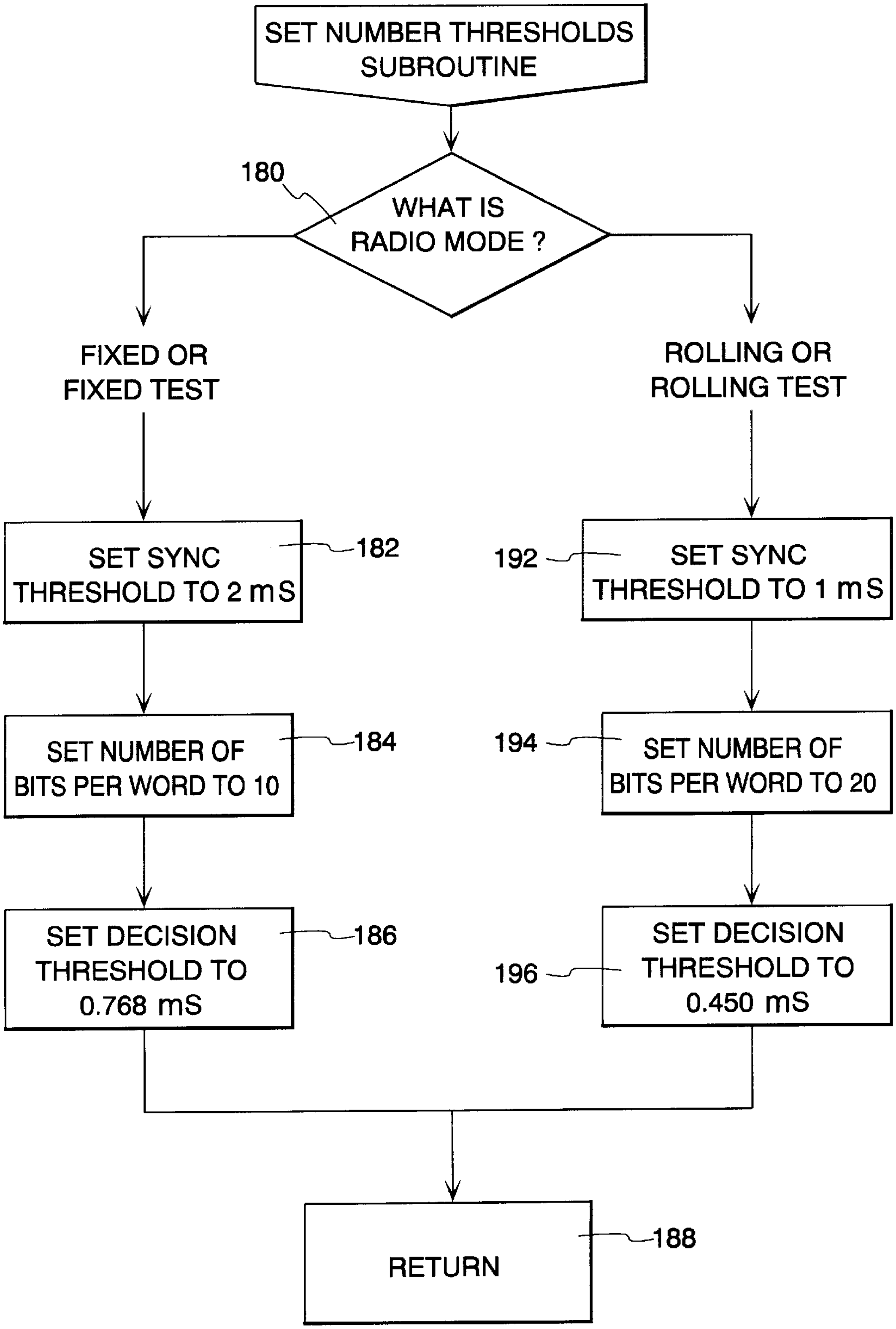
FIG. 16 is a flow diagram of a set number thresholds subroutine.

The set number thresholds subroutine (step 60 of FIG. 15) is shown in more detail in FIG. 16. Initially, a step 180 is performed to identify which mode is presently selected. When the mode is determined to be a fixed code mode, steps 182, 184 and 186 are next performed to set the sync threshold to 2 milliseconds, the number of bits per word to 10 and the decision threshold to 0.768 milliseconds. Alternatively, when step 180 determines that the rolling code mode is selected, steps 192, 194 and 196 are performed to set the sync threshold to 1 millisecond, the number of bits per word to 20 and the decision threshold to 0.450 milliseconds. After the performance of either step 186 or 196 the subroutine returns in step 188.

Figure 17:
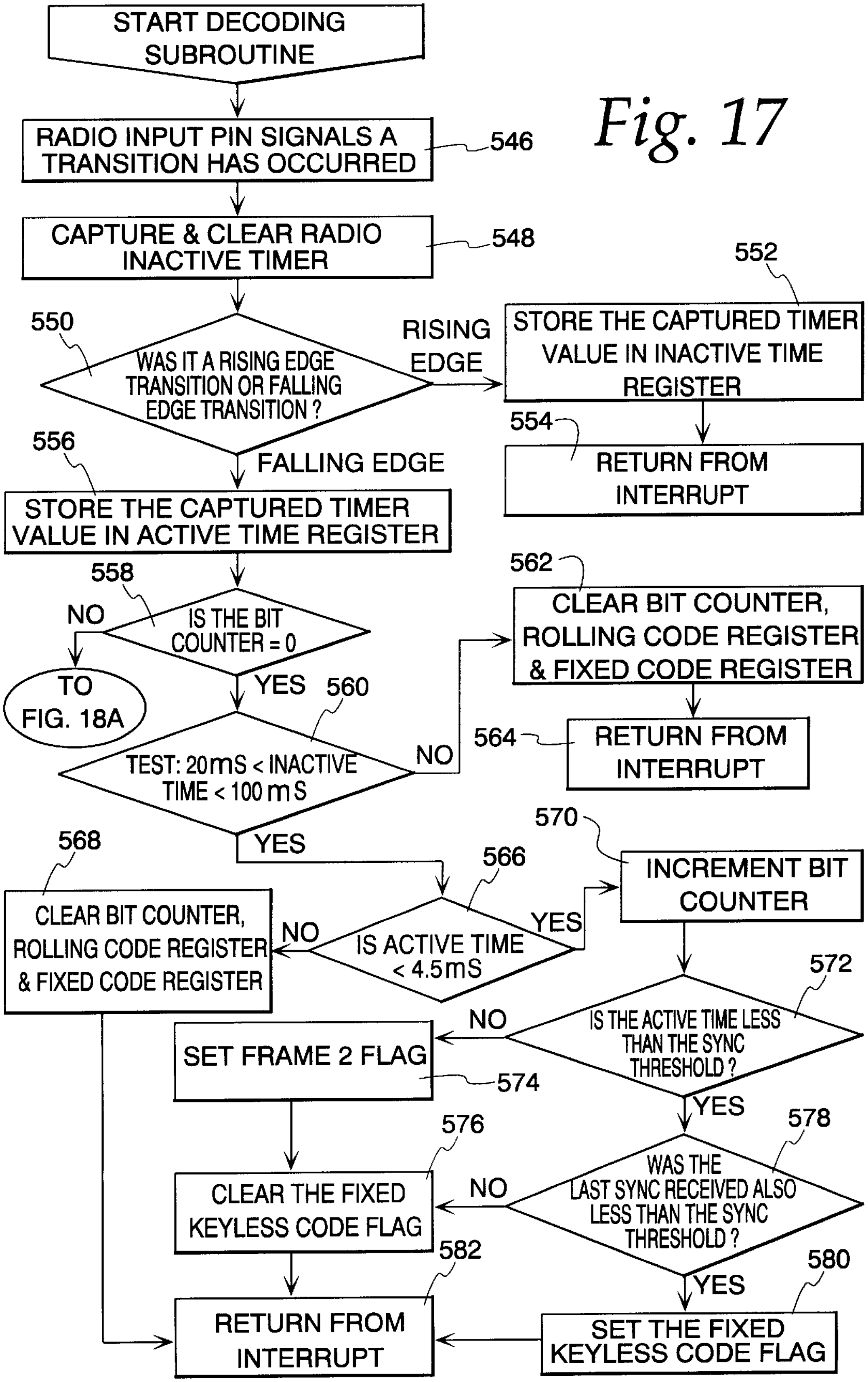
FIG. 17 is a flow diagram of the beginning of radio code reception by the controller.

The primary received code analysis routine performed by microcontroller 85 begins at FIG. 17 in response to an interrupt generated by a rising or falling edge being received from the receiver 80 at pins P32 and P33. Given the pulse width format of coded signals, the microcontroller maintains active or inactive timers to measure the duration between rising and falling edges of the detected radio signal. Initially, a step 546 is performed when a transition of radio signal is detected and a step 548 follows to capture the inactive timer and perform the clear radio routine. Next, a determination is made in step 550 of whether the transition was a rising or falling edge. When a rising edge is detected, step 552 is next performed in which the captured timer is stored followed by a return in step 554. When a falling edge is detected in step 550, the timer value captured in step 548 is stored (step 556) in the active timer. A decision step 558 is next performed to determine if this is the first portion of a new word. When the bit counter equals "0" this is a first portion in which a sync pulse is expected and the flow proceeds to step 560 (FIG. 17).

In step 560, the inactive timer value is measured to see if it exceeds 20 milliseconds but is less than 100 milliseconds. When the inactive timer is not in the range, step 562 is performed to clear the bit counter, the rolling code register and the fixed code register. Subsequently, a return is performed. When the inactive timer is within the range of step 560, step 566 is performed to determine if the active timer is less than 4.5 milliseconds. When the active timer is too large, the values are cleared in step 568 followed by a return in step 582.

When the active timer is found to be less than 4.5 milliseconds in step 566, a sync pulse has been found, the bit counter is incremented in step 570 and a decision step 572 is performed. In decision step 572, the active timer is compared with the sync threshold established in the set number thresholds subroutine of FIG. 16. Accordingly, decision step 572 uses a value of 2 milliseconds when a fixed code is expected and a value of 1 millisecond when a rolling code is expected. When step 572 determines that the active timer exceeds the threshold, a frame 2 flag is set in step 574 and a fixed keyless code flag is cleared in step 576. Thereafter, a return is performed in step 582. When the active timer is found in step 572 to be less than the sync threshold, a decision step 578 is performed to determine if two successive sync pulses have been of the same length. If not, the keyless code flag is cleared in step 576 and a return is performed in step 582. Alternatively, when two equal successive sync pulses are detected in step 578, the fixed keyless code flag is set in step 580 and a return is implemented in step 582.

Figure 18A:
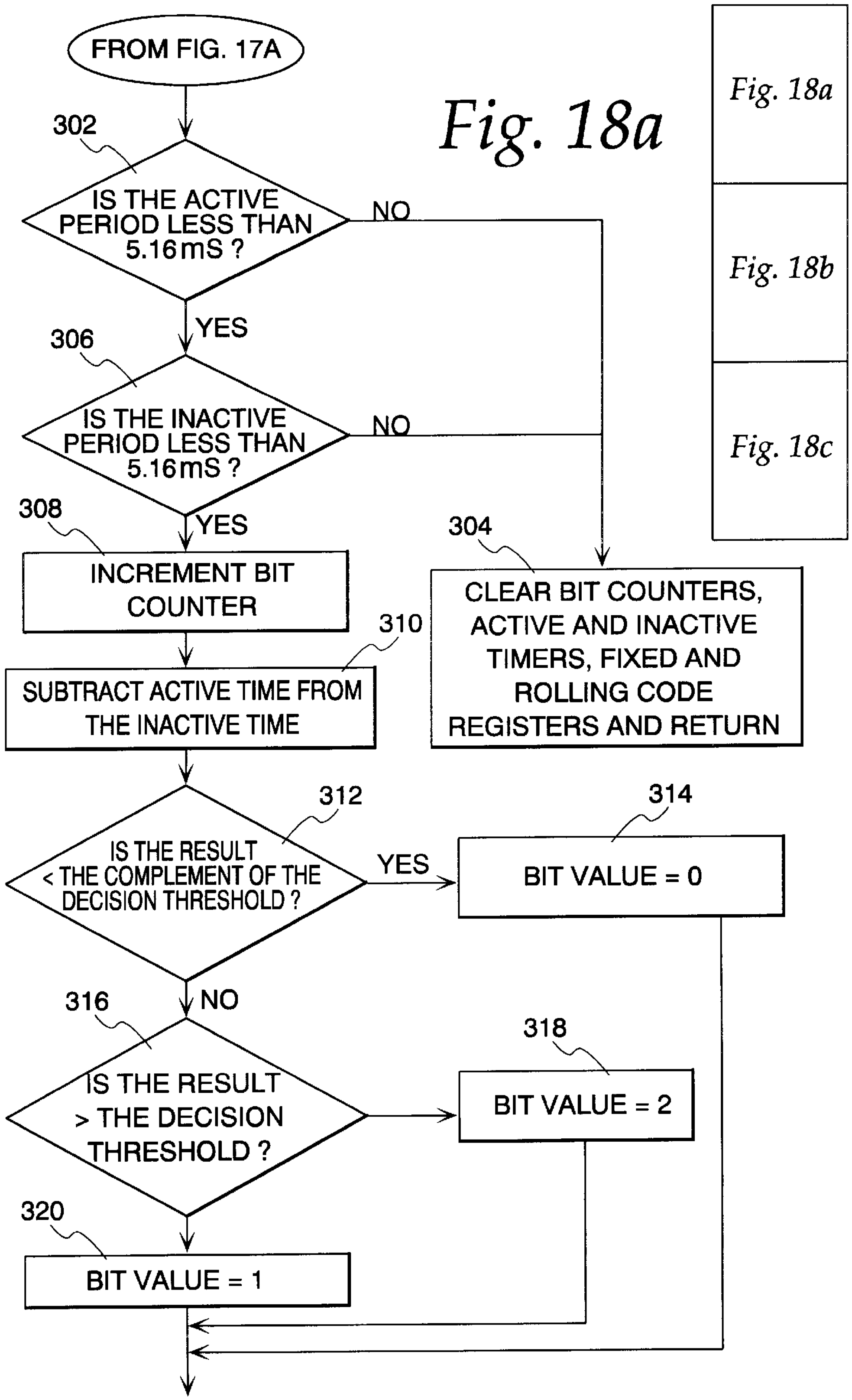
FIGS. 18*a*–18*c* are flow diagrams of the reception of the code bites comprising full code words.

When the performance of step 558 identifies that the bit count is not "0", indicating a non-sync bit, the flow proceeds to step 302 (FIG. 18A). In the sequence of steps shown in FIGS. 18*a*–18*c*, microcontroller 85 identifies the individual code bits of a received code word. In step 302 the length of the active period is compared with 5.16 milliseconds and when the active period is not less, the registers and counters are cleared and a return is performed. When step 302 indicates that the active period was less than 5.16 milliseconds, a step 306 is performed to determine if the inactive period is less than 5.16 milliseconds. If it is less, the step 304 is performed to clear values and return. Alternatively, when step 306 is answered in the affirmative a bit has been received and the bit counter is incremented in a step 308. In the subsequent step 310 the value of the active and inactive timers are subtracted and the result is compared in step 312 with the complement of the decision threshold for the type of code expected. When the result is less than the complement of the decision threshold, a bit value of "0" has been received and flow continues through a step 314 to step 322 (FIG. 18B) where it is determined whether or not a rolling code is expected.

When step 312 determines that the time difference is not less than the complement of the decision threshold flow proceeds to decision block 316 (FIG. 18*a*) where the result is compared to the decision threshold. When the result exceeds the decision threshold, a bit having a value 2 has been received and the flow proceeds via step 318 to the decision step 322. When decision step 316 determines that the result does not exceed the decision threshold, a bit having a value of 1 has been received and flow continues via step 320 to decision step 322.

Figure 18B:
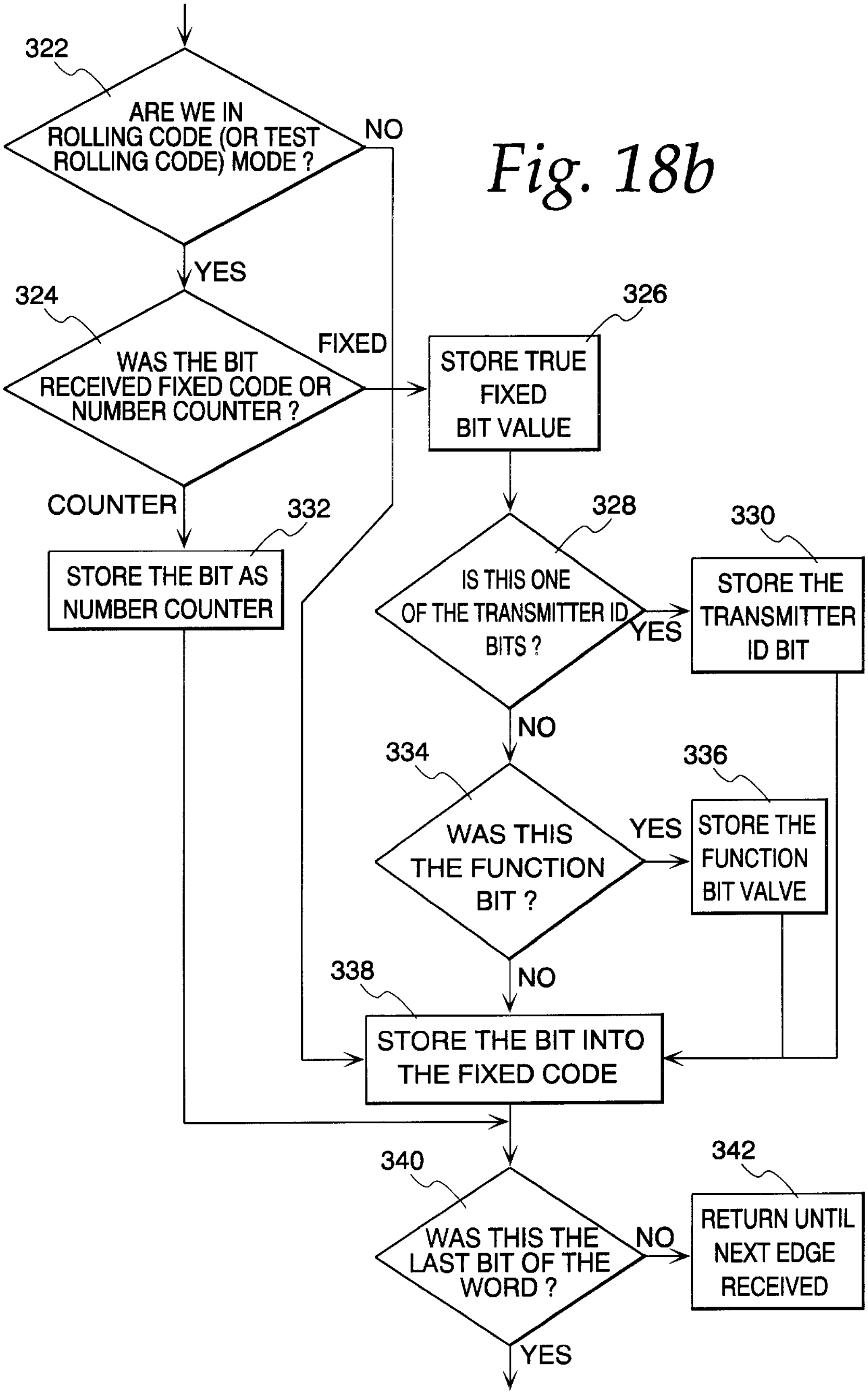
Figure 18C:
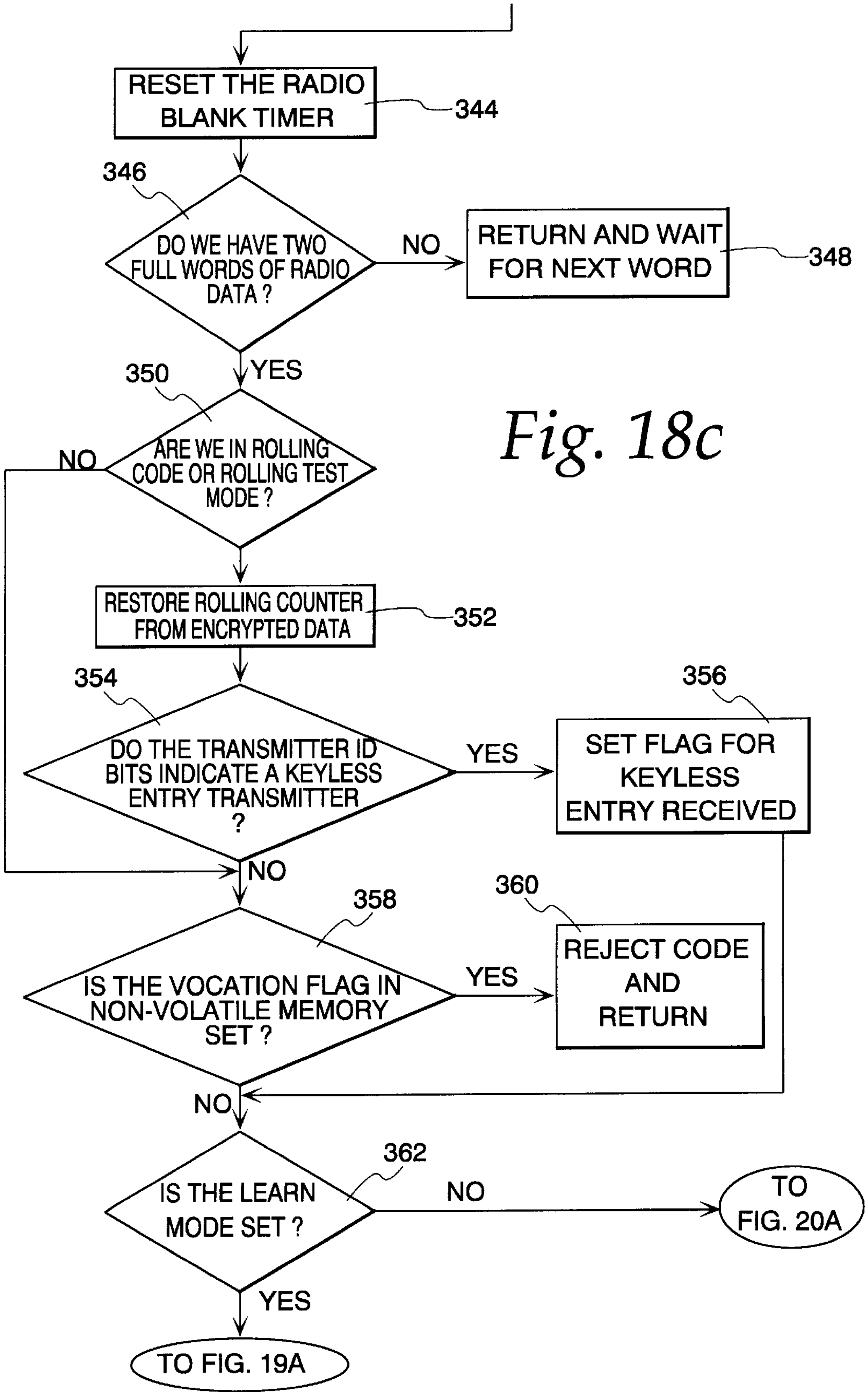

In step 322, microprocessor 85 identifies if rolling codes are expected. If not, flow proceeds to step 338 (FIG. 18*b*) where the bit value is stored as a fixed code bit. When rolling codes are expected, flow continues from block 322 to a decision step 324 where the bit count is checked to identify whether a fixed code bit or a rolling code bit is received. When step 324 identifies a rolling code bit, flow proceeds directly to a step 340 (FIG. 18*b*) to determine whether this is the last bit of a word. When a fixed bit is detected in step 324, its value is stored in a step 326 and a step 328 is performed to identify if the currently received bit is an ID bit. If the bit count identifies an ID bit, a step 330 is performed to store the ID bit and flow proceeds to the storage step 338 (FIG. 18*b*). When step 328 determines that the currently received bit is not an ID bit, flow continues to step 334 (FIG. 18*b*) to determine whether the currently received bit is a function bit. If it is a function bit, its value is stored as a function indicator in step 336 and flow continues to step 338 for storage as a fixed code bit. When step 334 indicates that the currently received bit is not a function bit, flow proceeds directly to step 338. After the storage step 338, flow for the fixed bit reception also proceeds to step 340 to determine whether a full word has been received. Such determination is made by comparing the bit counter with the threshold values established for the type of code expected. When less than a word has been received, flow proceeds to step 342 to await other bits.

Figure 19A:
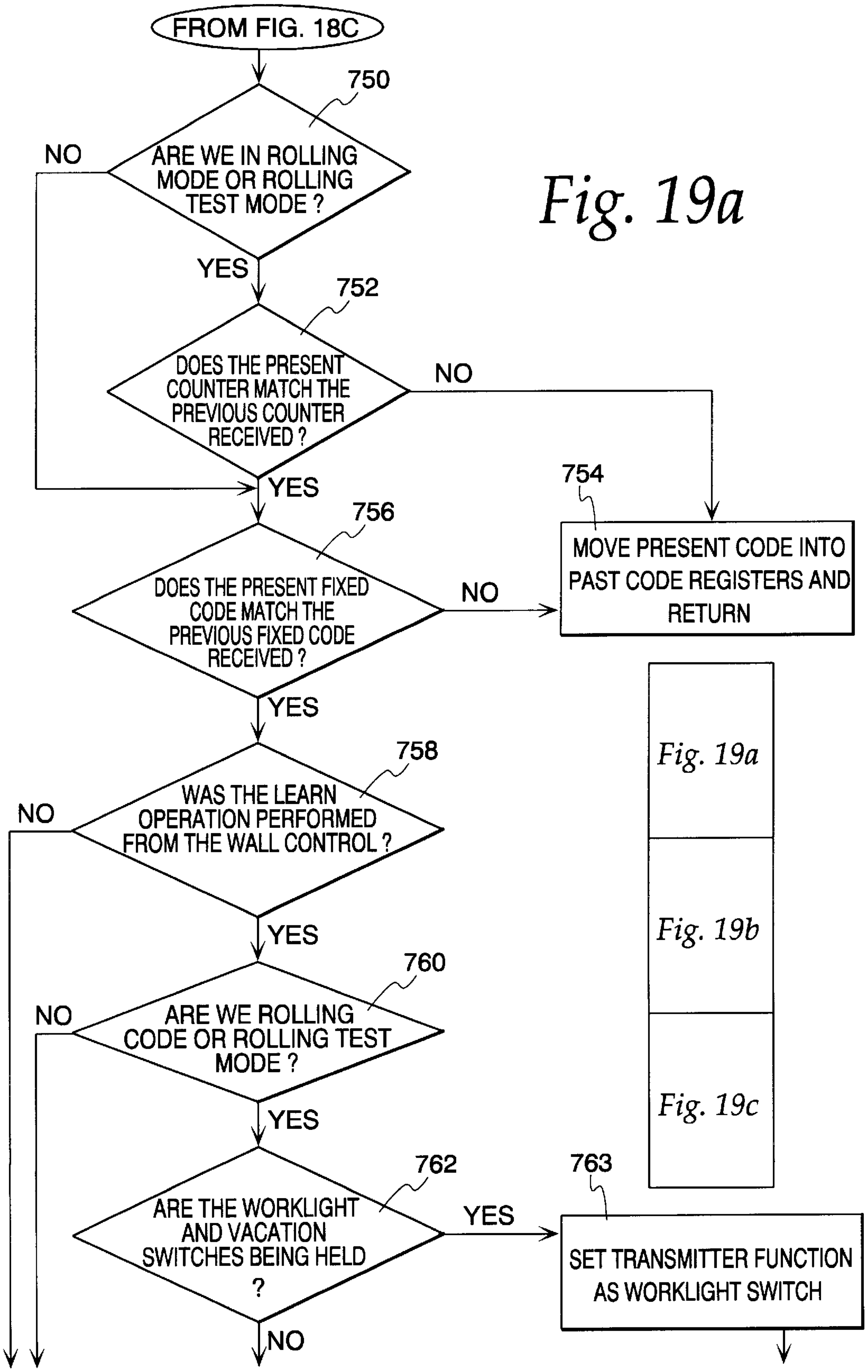
FIGS. 19*a*–19*c* are flow diagrams of a learning mode of the system.

When a full word has been received, flow proceeds to a step 344 where the blank timer is reset. Thereafter, flow continues to decision step 346 to determine if two full words (a complete code) have been received. When two full words have not been received, flow proceeds to block 348 to await the digits of a new word. When two full words are detected in step 346, flow proceeds to step 350 (FIG. 18*c*) to determine whether rolling codes are expected. When rolling codes are not expected, flow continues to step 358. When rolling codes are expected, flow proceeds from step 350 through restoration of the rolling code in a step 352 to a decision step 354 where it is identified if the ID bits indicate a keyless entry transmitter, e.g., transmitter 34. When a keyless entry transmitter code is detected, a flag is set in step 356 and flow proceeds to a decision step 362, discussed below. When step 354 indicates that the code is not from a keyless transmitter, flow continues to the decision step 358 to identify whether a vacation flag is set in memory. The vacation flag is set in response to a human activated vacation switch and when the vacation flag is set, no radio codes are allowed to activate the door open while codes from keypad (keyless) transmitters such as 34 are permitted to activate the system. Accordingly, if a vacation flag is detected in step 358, the code is rejected and a return is performed. When no vacation flag has been set, flow proceeds to a step 362 where it is determined if a learn mode is set. Learn modes can be set by several types of operator interaction. The program switch 151 can be pressed. Also, by preprogramming, microprocessor 85 is instructed to interpret the press and hold of the command and light buttons of the wall control 39 while energizing a code transmitter. Additionally, prior radio commands can place the system in a learn mode. The decision at step 362 is not dependent on how the learn mode is set, but merely on whether a learn mode is requested. At this point it is assumed that a learn mode has been set and flow continues to step 750 (FIG. 19A).

Figure 19B:
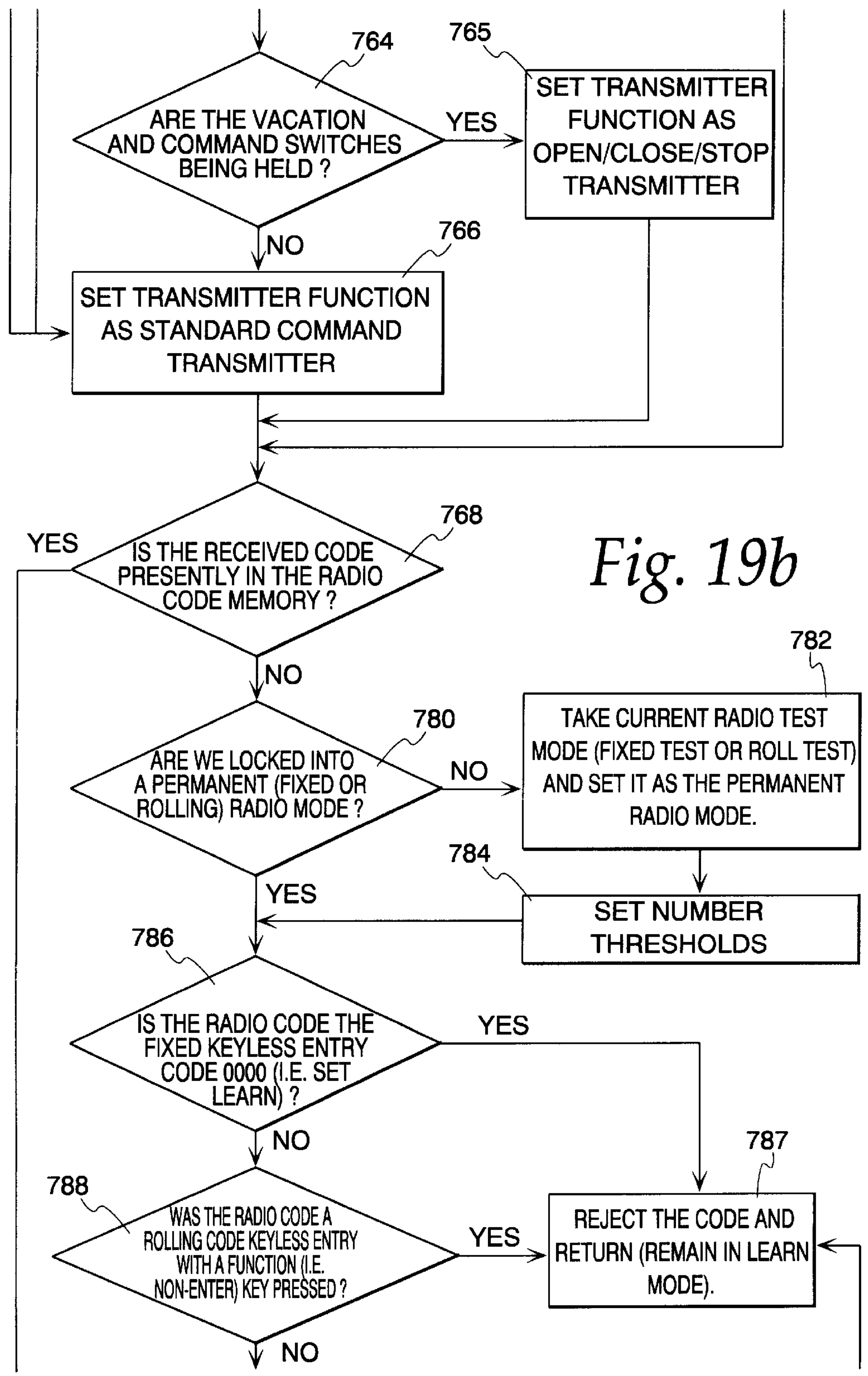

In step 750, a determination is made concerning the type of code expected. When a fixed code is expected, flow proceeds to step 756 where the present fixed code is compared with the prior fixed code. When step 756 does not detect a match, the present code is stored in a past code register and a return is executed. When step 750 identifies that rolling code is expected, a step 752 is performed to determine if the present rolling code matches the past rolling code. If no match is found, flow proceeds to step 754 where the present code is stored in a past code register and a return is executed. When step 752 determines that the rolling codes match, the fixed portion of the received rolling code is compared with the past fixed portions in step 756. When no match is detected, the code is stored in a past code register and a return is executed. When step 756 detects a match, flow proceeds to step 758 to identify if the learn was requested from the wall control 39. If not, flow proceeds to step 766 (FIG. 19B) where the transmitter function is set to be a standard command transmitter. When step 758 determines that the learn mode was commenced from wall control 39, flow proceeds to step 760 to determine whether fixed or rolling codes are expected. When fixed codes are expected, flow proceeds to step 766 (FIG. 19B) where the function is set to be that of standard command transmitter. When rolling codes are identified in step 760, flow proceeds to step 762 (FIG. 19*a*).

Figure 19C:
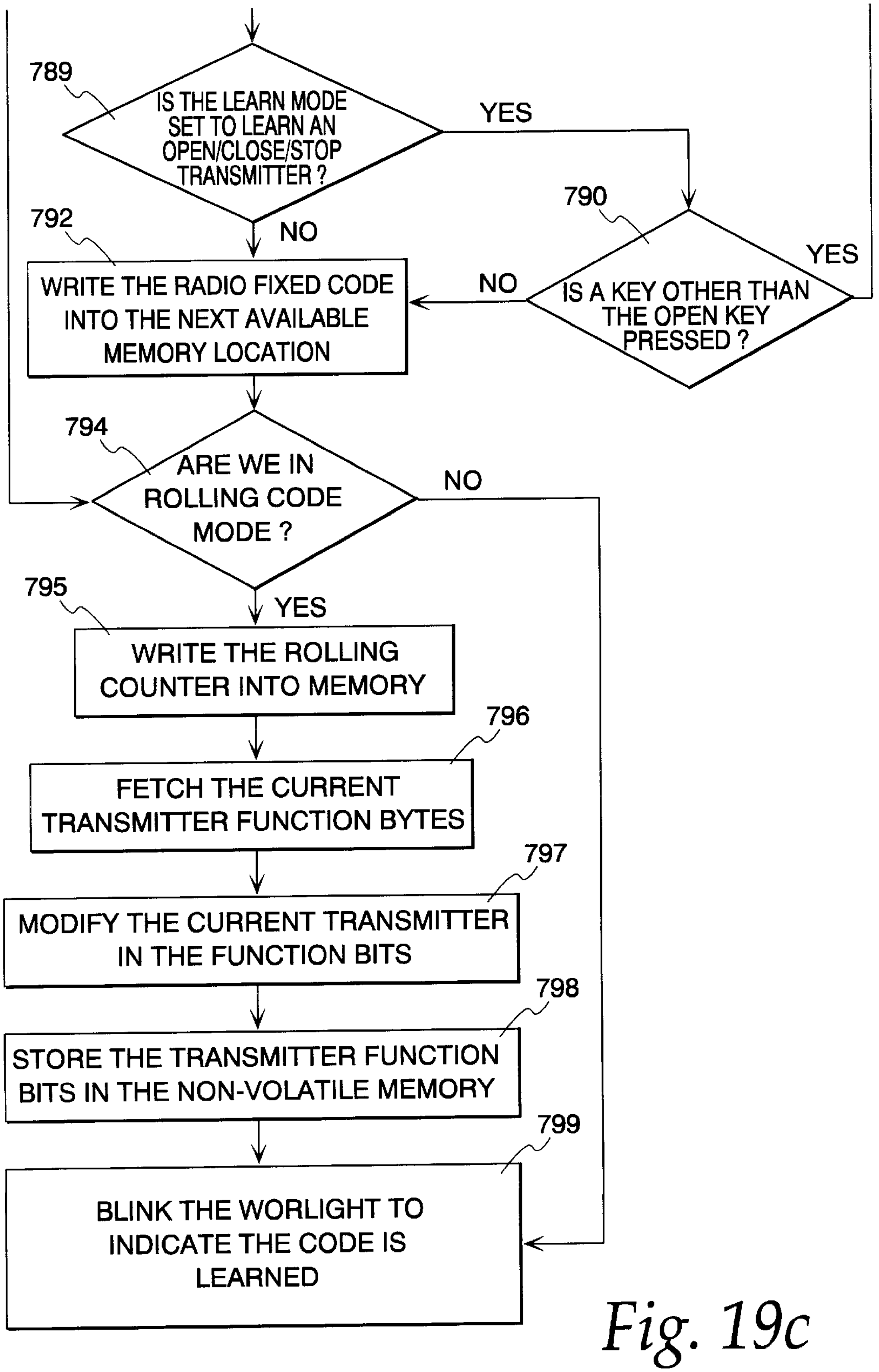

In step 762 it is determined if the light and vacation switches of the wall control 39 are being held. If so, the transmitter is set to be a light switch only in step 763 and flow proceeds to step 768. When step 762 is answered in the negative, flow proceeds to step 764 to determine if the vacation and command switches are being held. If they are, flow proceeds to step 765 to set the transmitter function as open/close/stop and flow proceeds to step 768. When step 764 determines that the vacation and command switches are not being held, flow proceeds to step 766 where the transmitter is marked as a standard command transmitter. After step 766, a step 768 is performed to identify if the received code is in the radio code memory. If the present code is in radio code memory, flow proceeds to step 794 (FIG. 19C). If the received code is not in radio code memory, flow proceeds from step 768 to 780 to determine whether the system is in a permanent or a test mode. When step 780 determines that the system is in a test mode, the current radio mode, either fixed or rolling, is set as a permanent mode in step 782 and flow proceeds to a step 784 to set the current thresholds by storing a pointer to the storage location in ROM into permanent memory.

After step 784, flow proceeds to step 786 (FIG. 19*b*) to determine if the present code is from the keypad transmitter and specifies an input code 0000. If so, the step 787 is executed where the received code is rejected and a return is executed while remaining in the learn mode. When the code 0000 is not present, flow continues to step 788 to find whether a non-enter key (* or #) was pressed. If so, flow proceeds to step 787. If not, flow continues to decision step 789 to identify if an open/close/stop transmitter is being learned. When the present learning does not involve an open/close/stop transmitter, flow proceeds to step 792 where the code is written into nonvolatile memory. When step 789 determines that an open/close/stop transmitter is being learned, flow proceeds to step 790 to determine if a key other than the open key is being pressed. If so, flow proceeds to block 789 and if not, flow proceeds to block 792 where the fixed code is stored in nonvolatile memory.

After step 792, step 794 is performed to determine if rolling code is the present mode. If not, flow proceeds to step 799 where the light is blinked to indicate the completion of a learn and a return is executed. When step 794 identifies the mode as rolling code, flow proceeds to step 795 where the received rolling code is written into nonvolatile memory in association with the fixed code written in step 792. After step 795, the current transmitter function bytes are read in step 796, modified in step 797 and stored in nonvolatile memory. Following such storage, the work light is blinked in step 799 and a return is executed.

Figure 20A:
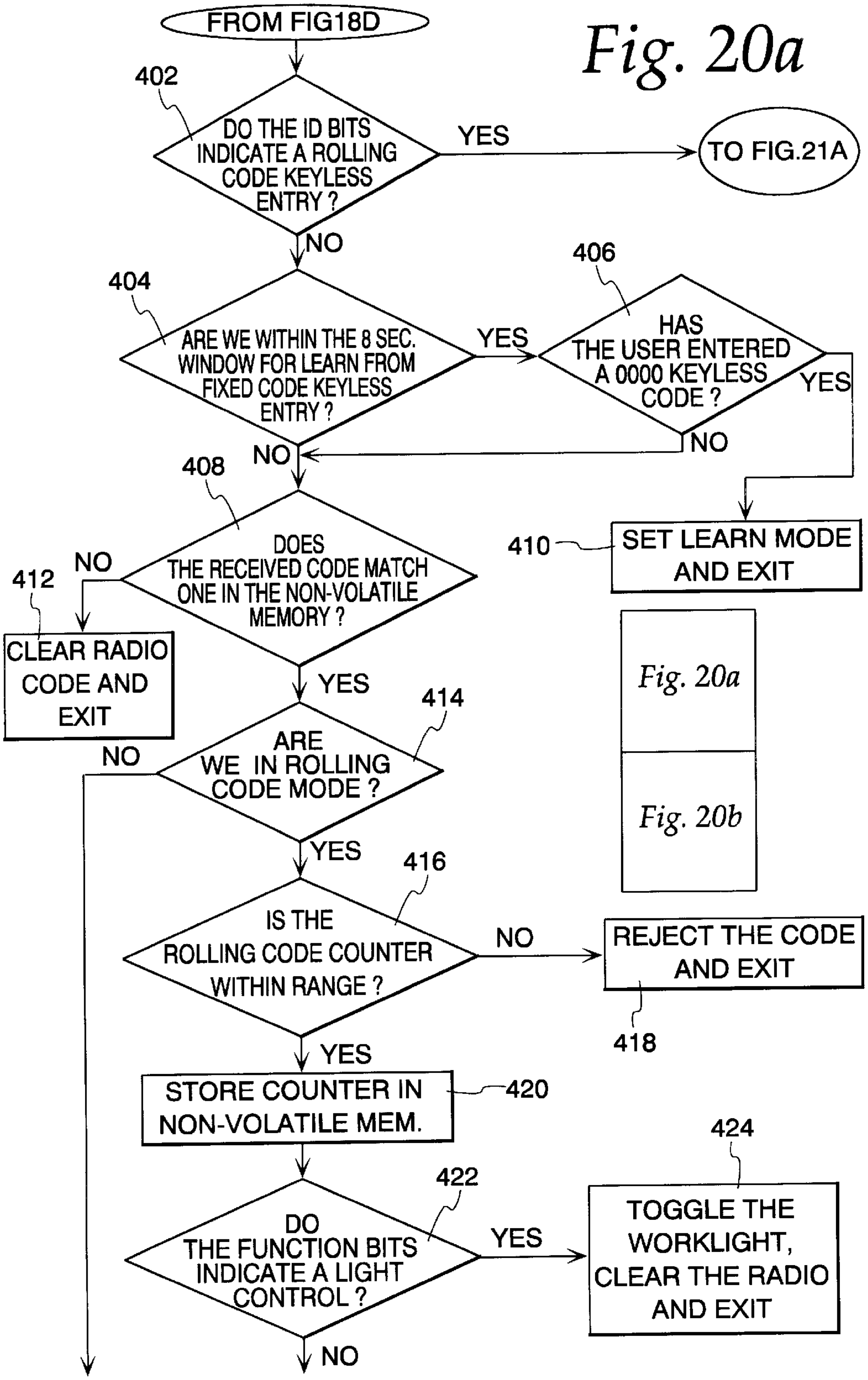
FIGS. 20*a*–20*b* are flow diagrams regarding the interpretation of received codes.
Figure 21A:
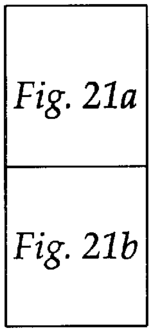
FIGS. 21*a*–21*b* and 22 are flow diagrams of the interpretation of transmitted codes from keypad type transmitters.
Figure 21A:
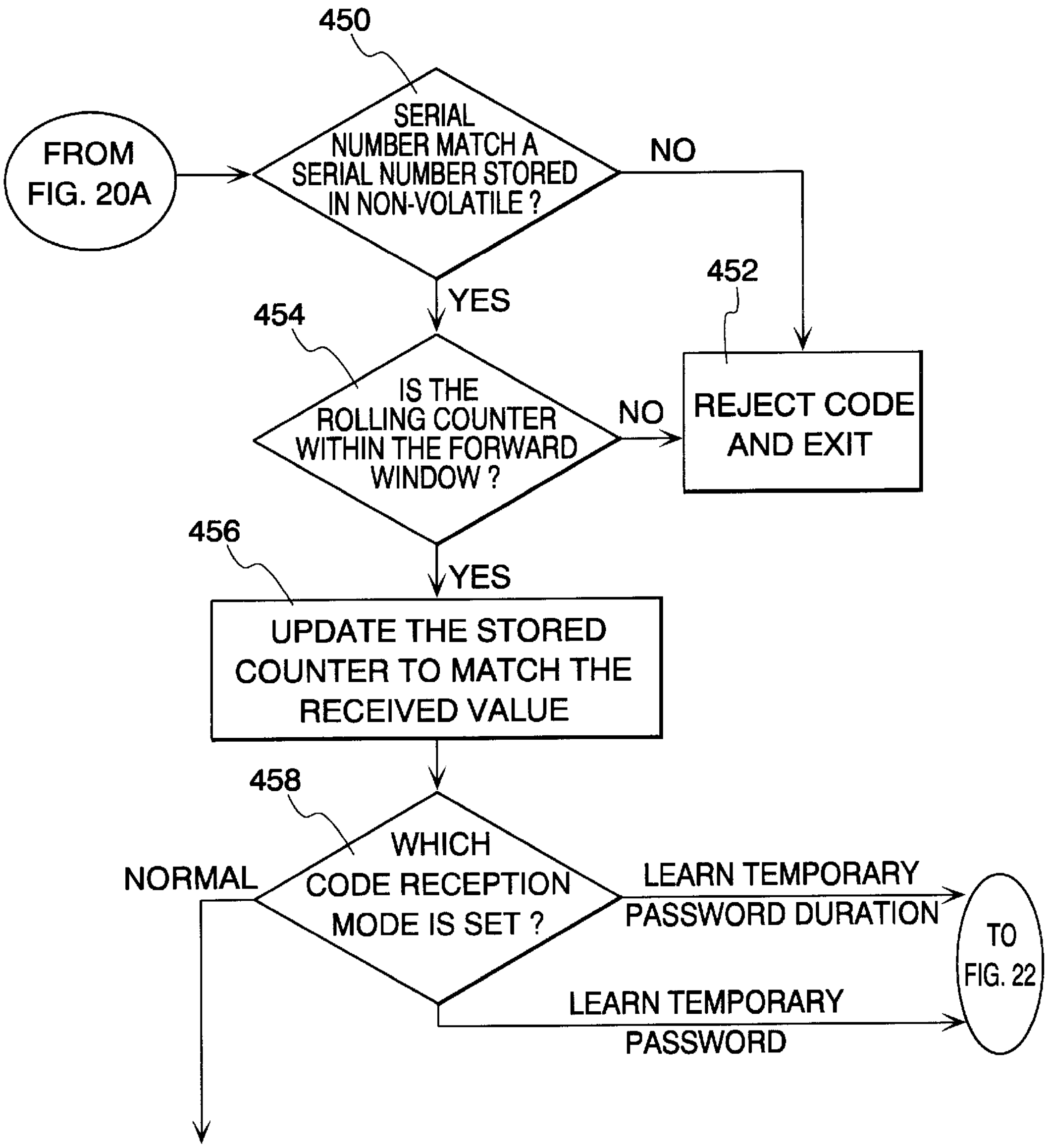

The performance of step 799 concludes the learn function which began when step 362 (FIG. 18*c*) identified a learn mode. When step 362 does not identify a learn mode, flow proceeds from step 362 to step 402 (FIG. 20A). In step 402 the ID bits of the received code are interpreted to identify whether the code is from a rolling code keypad type transmitter, e.g. 34. If so, flow proceeds to step 450 (FIG. 21A). When the ID bits do not indicate a rolling code keypad entry, flow proceeds to a step 404 where a check is made to see if an 8 second window in which a learn mode may be set exists which was entered from a fixed code keypad transmitter. When the learn mode exists, flow proceeds to step 406 to determine if the operator has entered a special "0000" code. If the special code has been entered, flow proceeds from step 406 to step 410 where the learn mode is set and an exit performed. When step 406 does not detect the special "0000" code, flow proceeds to a step 408, which step is also entered when no 8 second learn mode was detected in step 404.

In step 408 the received code is compared with the codes previously stored in nonvolatile memory 88. When no match is detected, the radio code is cleared and an exit is performed in step 412. Alternatively, when step 408 detects a match, flow proceeds to step 414 (FIG. 20*a*) which identifies when rolling codes are expected. When step 414 determines that rolling codes are not expected, flow proceeds to step 428 where a radio command is executed and an exit performed. When step 414 determines that a rolling code is expected, flow proceeds to step 416 to determine if the rolling portion of the received code is within the accepted range. When the rolling portion is out of range, step 418 is performed to reject the code and exit. When the rolling code is within the range, step 420 is performed to store the received rolling code portion (rolling code counter) in nonvolatile memory and flow proceeds to a step 422, which identifies whether the function bits of the received code identify a light control signal. When a light control signal is identified, flow proceeds to step 424 where the status of the light is changed, the radio is cleared and an exit performed. When the presently received code is not identified in step 422 as a light control, flow proceeds to step 426 to identify if the present code is an open/close/stop command. When step 426 does not identify an open/close/stop command, flow proceeds to the step 428 where a radio command is set and an exit performed.

Figure 20B:
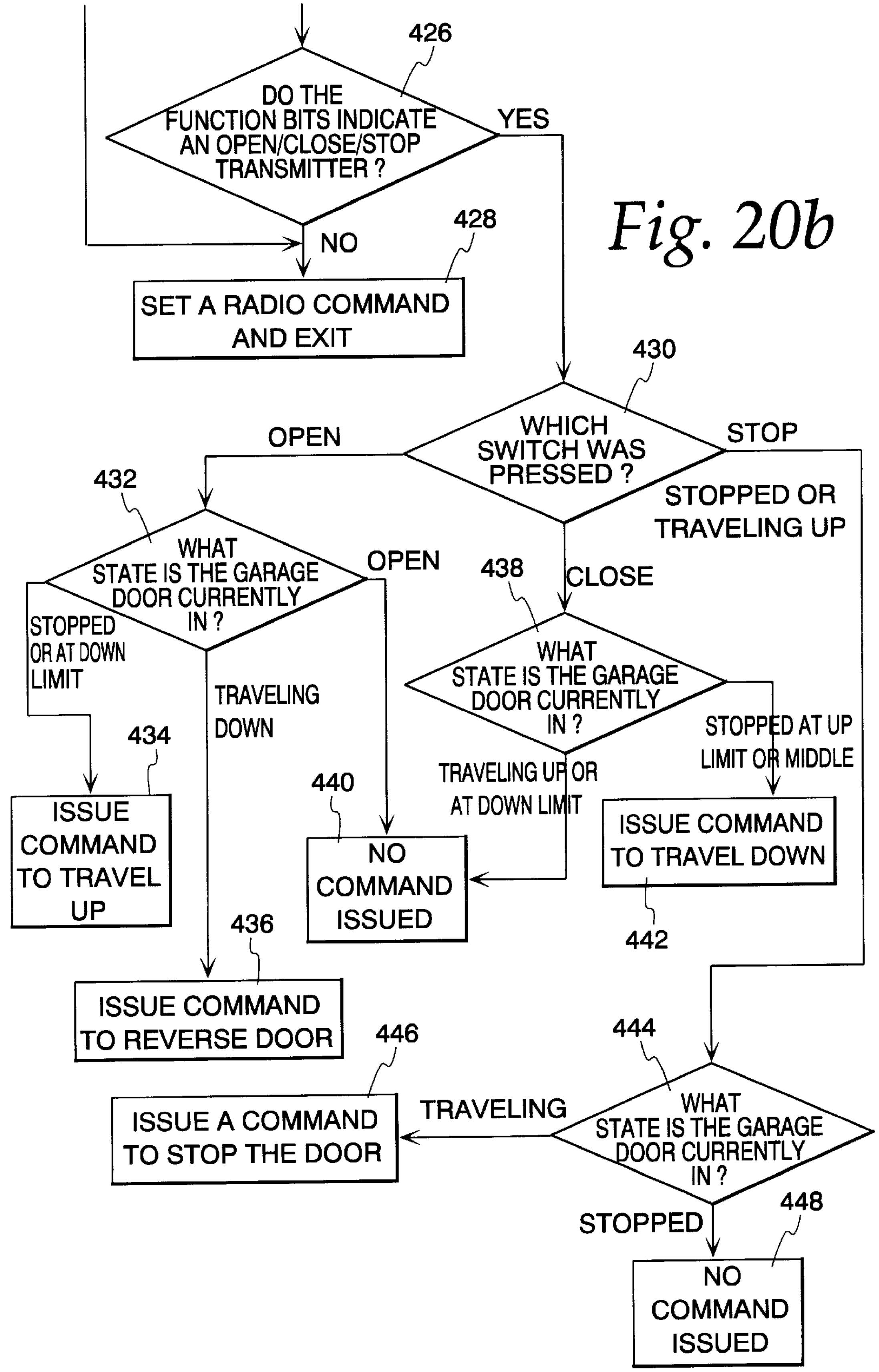

When step 426 identifies an open/close/stop command, flow proceeds to step 430 (FIG. 20*b*) to interpret the command. Step 430 identifies from the function bits of the received code which of the three buttons was pressed. When the open button was pressed, flow proceeds to a step 432 to identify what the present state of the door is. When the door is stopped or at a down limit, step 434 is entered where an up command is issued and exit performed. When step 432 identifies that the door is traveling down, a reverse door command is issued and an exit performed in step 436. In the third case, when step 432 detects the door to be open, step 440 is entered and no command is issued.

When step 430 identifies that the close transmitter button was pressed, flow proceeds to step 438 to identify what state the door is in. When step 436 determines that the door is traveling up or at a down limit, the step 440 is performed where no command is issued and an exit performed. Alternatively, when step 438 identifies that the door is stopped at other than the down limit, a down command is issued in a step 442. When step 430 determines that the stop button was pressed, flow proceeds to step 444 to identify the state of the door. When the door is already stopped, flow proceeds from step 444 to step 448 where no command is issued and an exit performed. When the door is identified in step 444 as traveling, a stop command is issued in step 446 and an exit performed.

It will be remembered that when step 402 (FIG. 20A) identifies that a rolling code keypad code is received, flow proceeds to step 450 (FIG. 21A). In step 450 the serial number portion of the received code is compared with the serial numbers of those codes stored in nonvolatile memory. When no match is detected, flow proceeds to step 452 where the code is rejected and an exit performed. When step 450 detects a match, flow proceeds to step 454 to identify if the rolling code portion is within the forward window. When the code is not within the forward window, flow proceeds to the step 452 where the received code is rejected and an exit is performed.

Figure 21B:
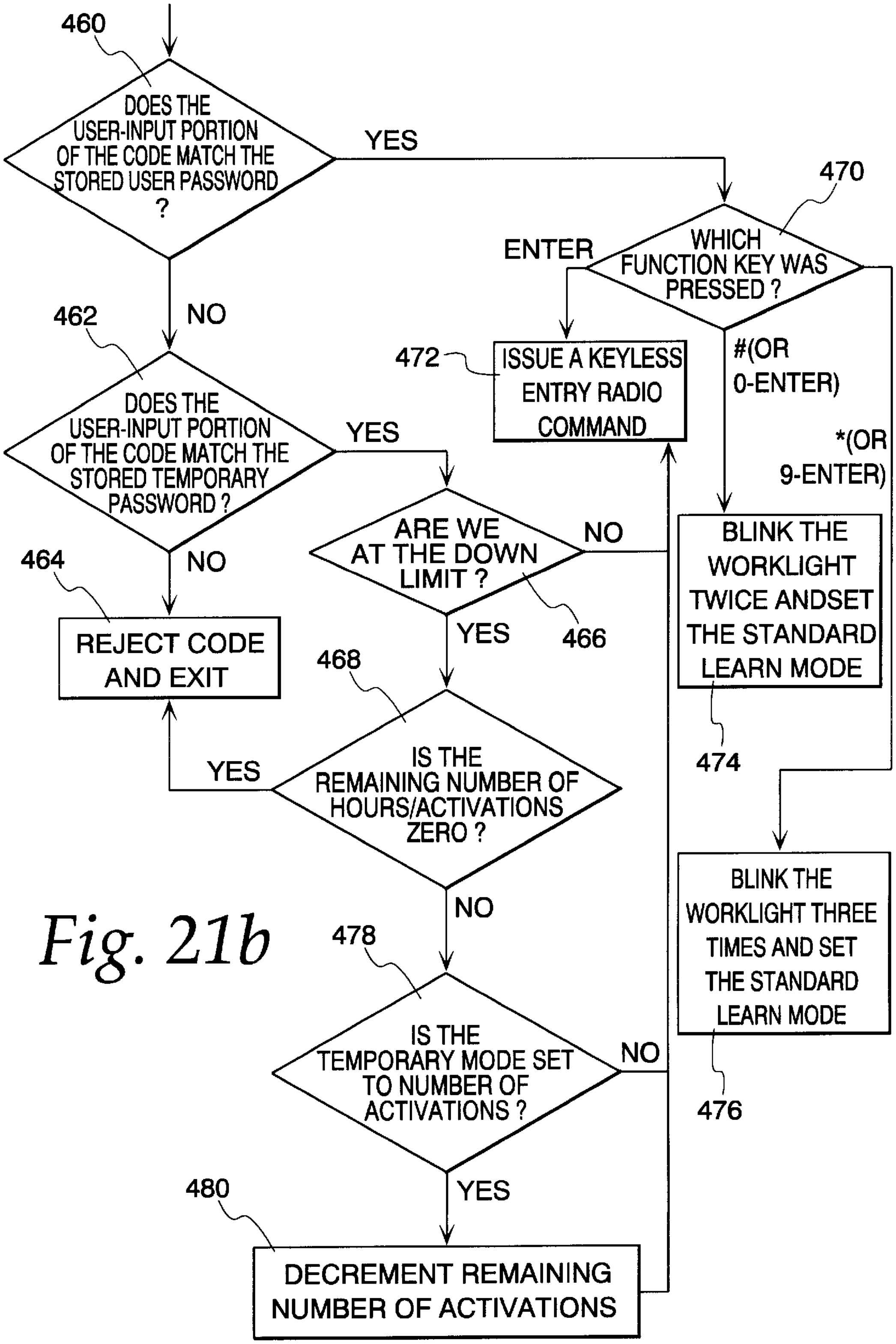

When the received rolling code portion is found to be within the forward window in step 454 a step 456 is performed where the received code is used to update the rolling code counter in memory. This storage keeps the rolling code transmitter and rolling code receiver in synchronism. After step 456, a step 458 is entered to identify which code reception mode has been set. When normal code reception is identified in step 458, a step 460 (FIG. 21B) is performed to identify if the user input portion of the received code matches a stored user password. When a match is detected in step 460, flow proceeds to step 470 to identify which of the keypad input keys, *, # or enter, was pressed. When step 470 identifies the enter key, a step 472 is performed in which a keyless entry command is issued and an exit initiated. When the * key is detected in step 470, flow proceeds to step 476 where the light is blinked and the learn temporary password flag is set to identify the learn temporary password mode. When step 470 identifies that the # key was pressed, flow proceeds to a step 474 to blink the light and to set a standard learn mode.

When the performance of step 460 determines that the received user input portion does not match one stored in memory, flow proceeds to step 462 where the received user input portion is compared to temporary user input codes. When step 462 does not discover a match, a step 464 is performed to reject the code and exit. When step 462 identifies a match between a received user input code and a stored temporary password, flow proceeds to step 466 to identify whether the door is at the down limit. If not, flow proceeds to step 472 for the issue of a keypad entry command. When step 466 identifies that the door is closed, a step 468 is performed to identify whether the previously set time or number of uses for the temporary password has expired. When step 468 identifies expiration, the step 464 is performed to reject the code and exit. When the temporary password has not expired, flow proceeds to step 478 (FIG. 21*b*) where the type of user temporary password, e.g., duration or number of activations, is checked. When step 478 identifies that the received temporary password is limited to a number of activations, a step 480 is executed to decrement the remaining activations and a step 472 is executed to issue an entry command. When step 478 identifies that the received keypad password is not based on the number of activations (but instead on the passage of time) flow proceeds from step 478 to the issuance of an entry command in step 472. No special up date is needed for timed temporary passwords since the microcontroller 85 continuously updates the elapsed time.

Figure 22:
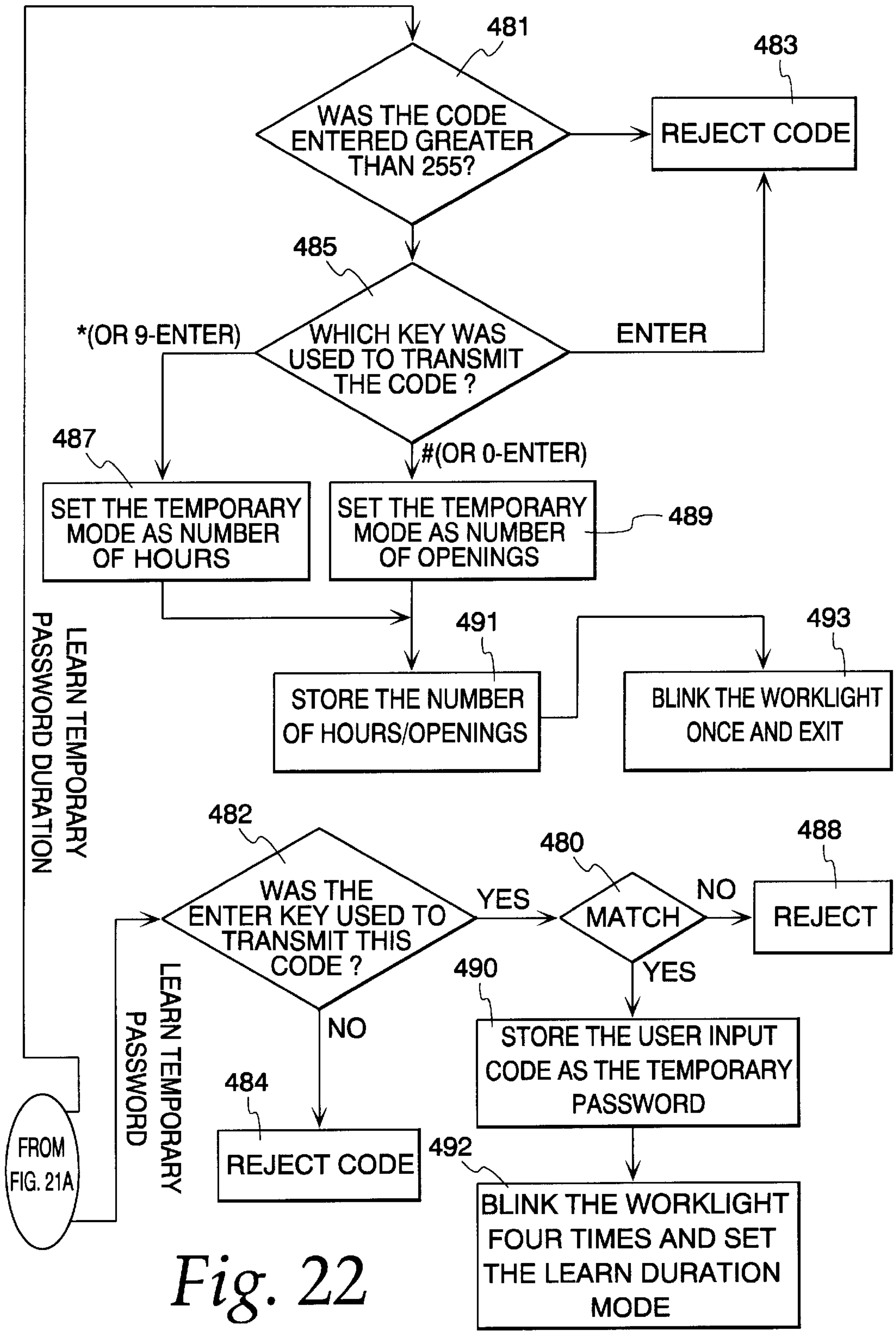

It will be remembered that a step 458 (FIG. 21A) was initiated to identify the reception mode presently enabled. When the learn temporary password mode is detected, flow proceeds from step 458 to step 482 (FIG. 22). In step 482 a query is performed to determine the enter key was used to transmit the received code. When the enter key was not used, a step 484 is performed to reject the code and exit. When the enter key was used, a step 486 is performed to determine whether the received user input code matches a user code already stored in memory. If so, a step 488 is performed to reject the code. When step 486 identifies no matching user input codes, the new user input code is stored as the temporary password in step 490 and flow proceeds to step 492 where the light is blinked and the learn temporary password duration learn mode is set for subsequent use. When the learn temporary password duration mode is later detected in step 458, flow proceeds to a step 481 where the user entered code is checked to see if it exceeds 255. This is an arbitrary limit to either 255 activations or 255 hours of temporary access. When the user entered code exceeds 255 it is rejected in step 483. When the user entered code is less than 255, a step 485 is performed to identify which key was used to transmit the keypad code. When the * key was used, the transmitted code is to indicate a time duration for the temporary password the time duration mode is set in step 487 and a time is started in step 491 using the code as the number of hours in the temporary code duration. When step 485 determines that the # key was used to transmit the code, a flag is set in step 489 indicating that the temporary mode is based on the number of activations and the number of activations is recorded in step 491. After step 491, the light is blinked and an exit is performed.

Figure 23:
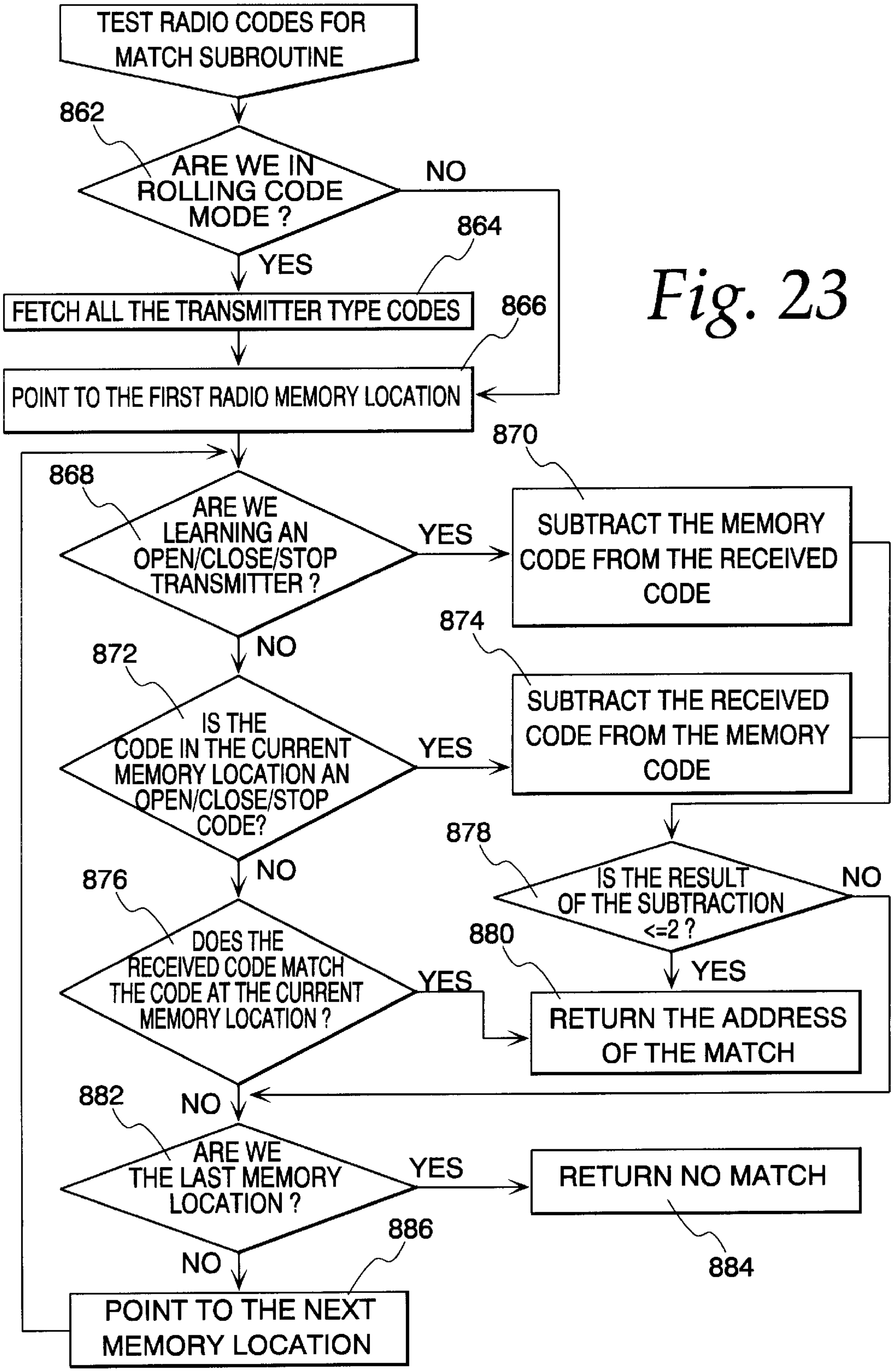
FIG. 23 is a flow diagram of a test radio code subroutine used in the system of FIG. 3.

FIG. 23 is a flow diagram of a radio code match subroutine. The flow begins at a step 862 where it is determined whether a rolling code is expected or not. When a rolling code is not expected, flow proceeds to a step 866 where a pointer identifies the first radio code stored in nonvolatile memory. When step 866 determines that a rolling code is expected, all transmitter type codes are fetched in a step 864 before beginning the pointer step 866. After step 866, a decision step 868 is performed to determine whether an open/close/stop transmitter is being learned. If so, a step 870 is performed in which the memory code is subtracted from the received code and the flow proceeds to a step 878 to evaluate the result. From step 878 the flow proceeds to a step 878 to evaluate the result. From step 878, the flow proceeds to a step 880 to return the address of the match when the result of the subtraction is less than or equal to two. When the result of the subtraction is not less than or equal to two, the flow continues from step 878 to step 882 to determine if the last memory location is being compared. If the last memory was compared, step 884 is performed to return a "no match."

When step 868 indicates that the system is not learning an open/close/stop transmitter, flow continues to step 872 to determine if the memory code is an open/close/stop code. If it is, flow proceeds through steps to step 874 where the received code is subtracted from the memory code. Thereafter, flow proceeds through step 878 to either step 880 or 882 as above described. When step 872 determines that the current memory code is not an open/close/stop code, flow proceeds to step 876 (FIG. 23). In step 876 the received code is compared with the code from memory and, if they match, step 880 is performed to return the address of the matching code. When step 876 determines that the compared codes do not match, flow continues to step 882 to determine if the last memory location has been accessed. When the last memory location is not being accessed, the pointer is adjusted to identify the next memory location and the flow returns to step 868 using the contents of the new location. The process continues until a match is found or the last memory location is detected in step 882.

Figure 24:
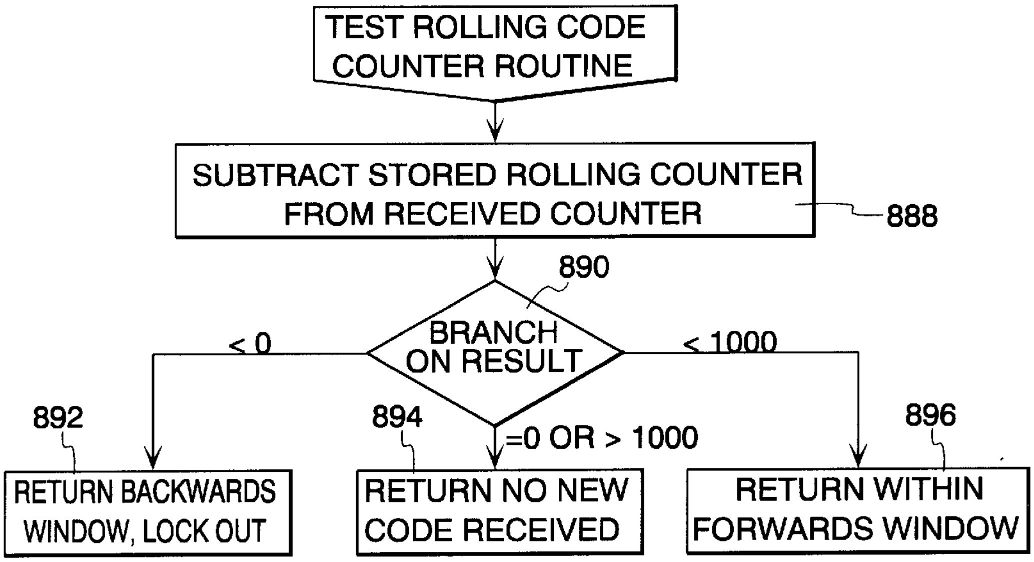
FIG. 24 is a flow diagram of a test rolling code counter subroutine.

FIG. 24 is a flow diagram of a test rolling code counter subroutine which begins at a step 888 in which the stored rolling code counter is subtracted from the received rolling code and the result is analyzed in a step 890. When step 890 determines that the subtraction result is less than "0", flow continues to step 892 where the subroutine returns a backward window lockout. When step 890 determines that the subtraction result is greater than 0 and less than 1000, the subroutine returns a forward window indication in step 892.

Figure 25:
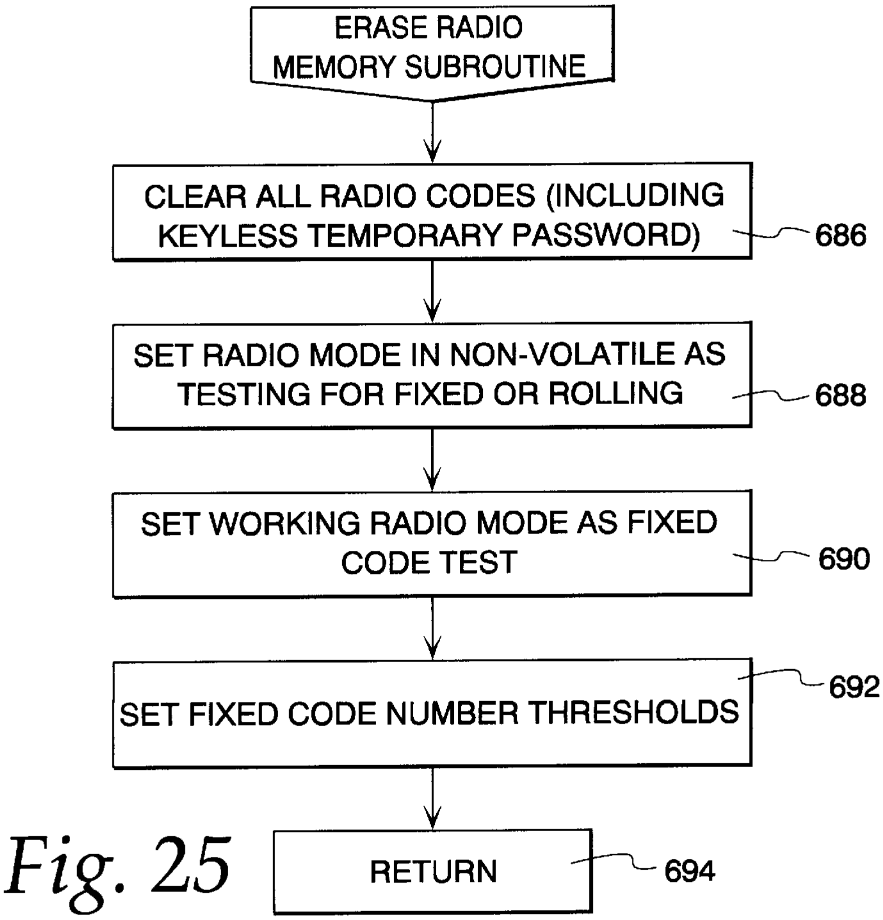
FIG. 25 is a flow diagram of an erase radio memory subroutine.
Figure 26:
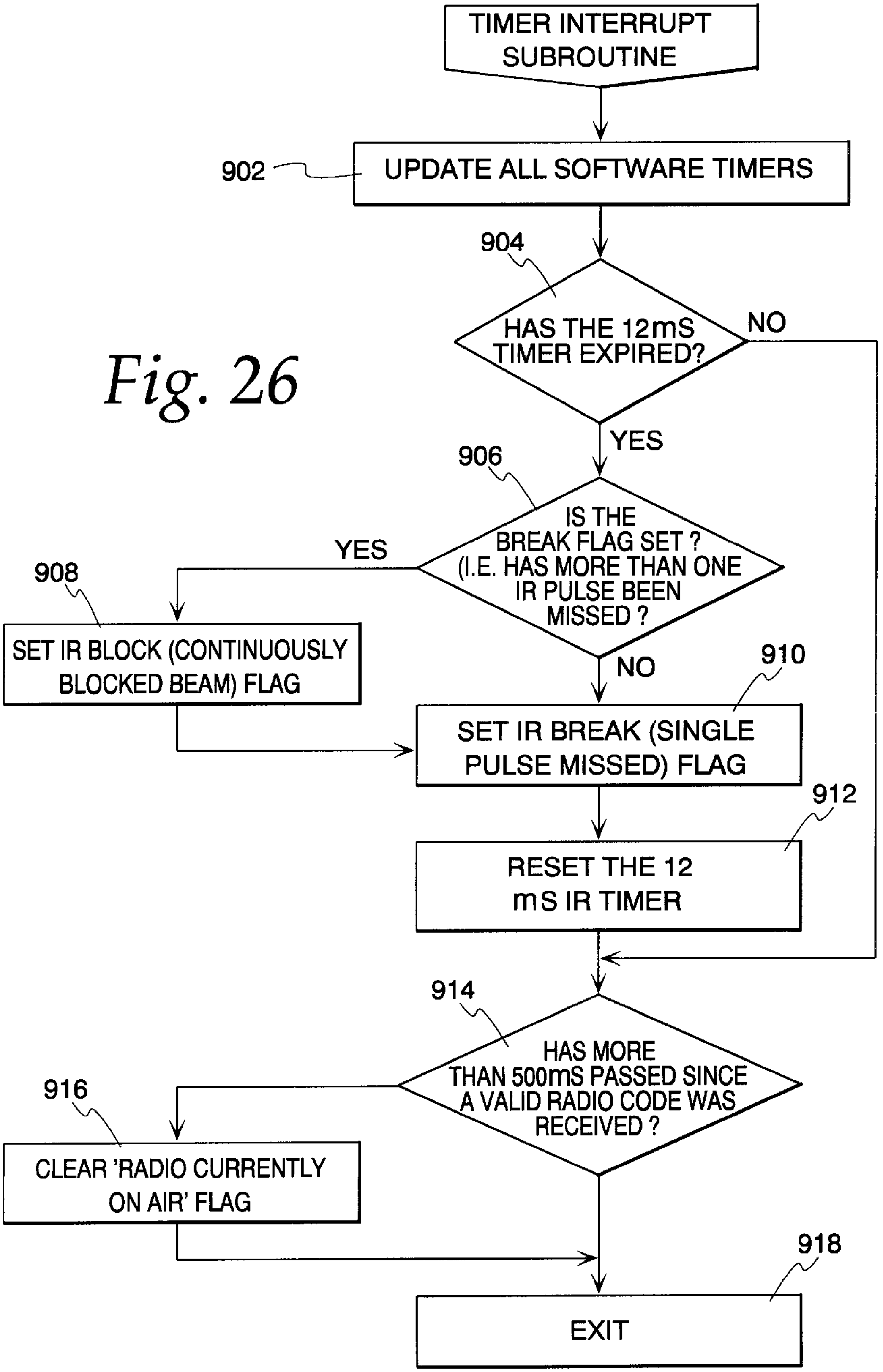
FIG. 26 is a flow diagram of a timer interrupt subroutine.

FIG. 25 is a flow diagram of an erase radio memory routine which begins at a step 686 of clearing all radio codes, including keyless temporary codes. Next, a step 688 is performed to set the radio mode in nonvolatile memory as testing for rolling codes or testing for fixed codes. Step 690 is next performed in which the working radio mode is set as fixed code test and the fixed code number thresholds are set in a step 692. A return step 694 completes the subroutine.

FIG. 23 shows a timer interrupt subroutine which begins at a step 902 when all software times are updated. Next, flow proceeds to a step 904 to determine whether a 12 millisecond timer has expired. The 12 millisecond timer is used to assure that obstructions which block the light beam in protector 90 and cause the absence of a 10 millisecond obstructive pulse, are rapidly detected. When the 12 millisecond timer has not expired, flow proceeds to a step 914 discussed below. Alternatively, when the timer expires, a step 906 is performed to determine if a break flag, which is set at the first missed pulse, is set. If it is not set, flow proceeds to step 910 in which the break flag is set. If the break flag was detected in step 906, flow continues to step 908 in which an IR block flag, indicative of a plurality of missed 10 millisecond obstruction pulses, is set. Flow then proceeds through step 910 to step 912 where the 12 millisecond timer is reset. Decision step 914, which is performed after step 912, determines whether it has been more than 500 milliseconds since a valid radio code has been received. If more than 500 milliseconds has transpired, step 916 is performed to clear a radio currently on air flag and an exit is performed. When step 914 determines that 500 milliseconds has not expired, flow proceeds directly to exit step 918.

Figure 27:
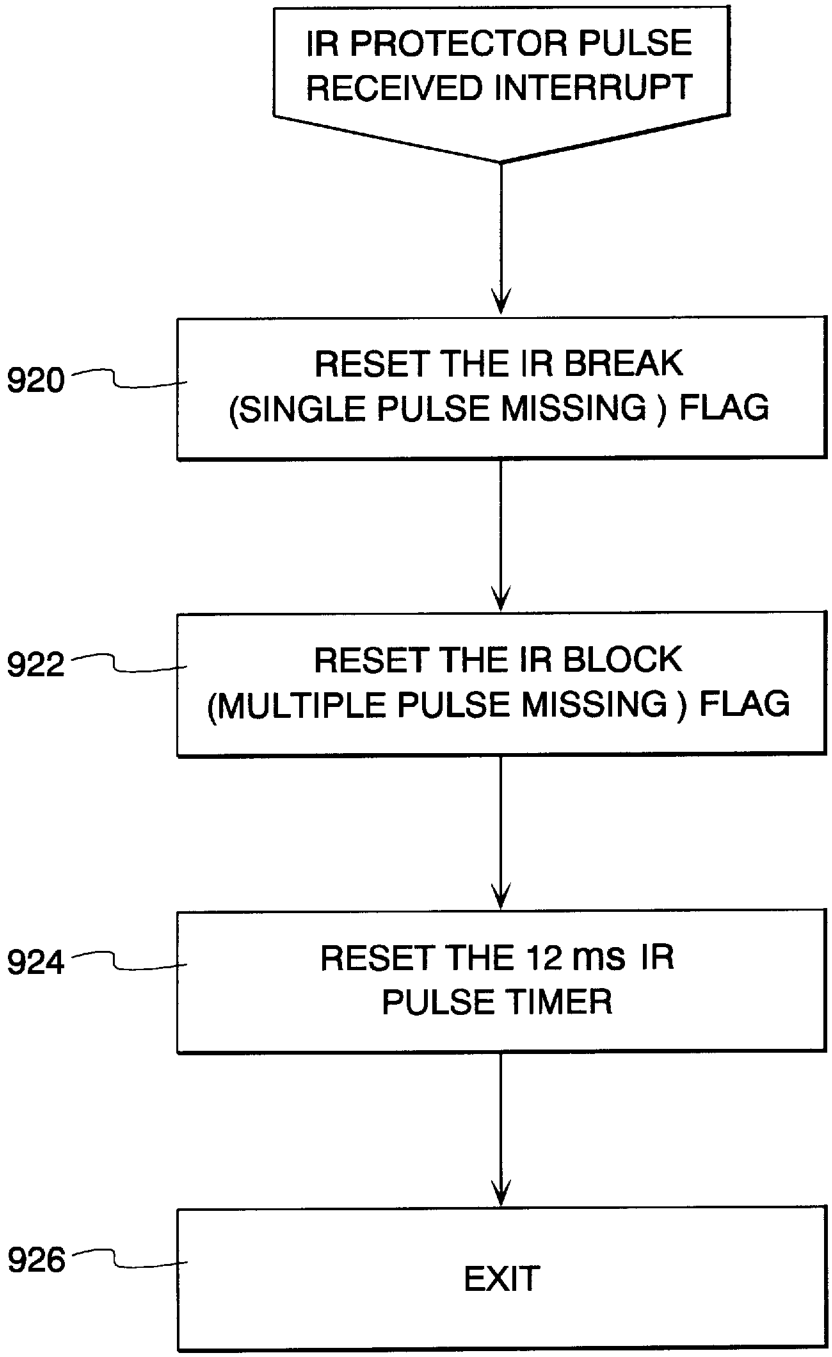
FIG. 27 is a flow diagram of a protector pulse received routine.

FIG. 27 is a flow diagram of an IR pulse received interrupt begun whenever a protection pulse is received by microcontroller 85. Initially, a step 920 is performed in which the IR break flag is reset and the flow proceeds to step 922 where the IR block flag is reset. This routine ends by resetting the 12 millisecond timer in step 924 and exiting in step 926.

Figure 28:
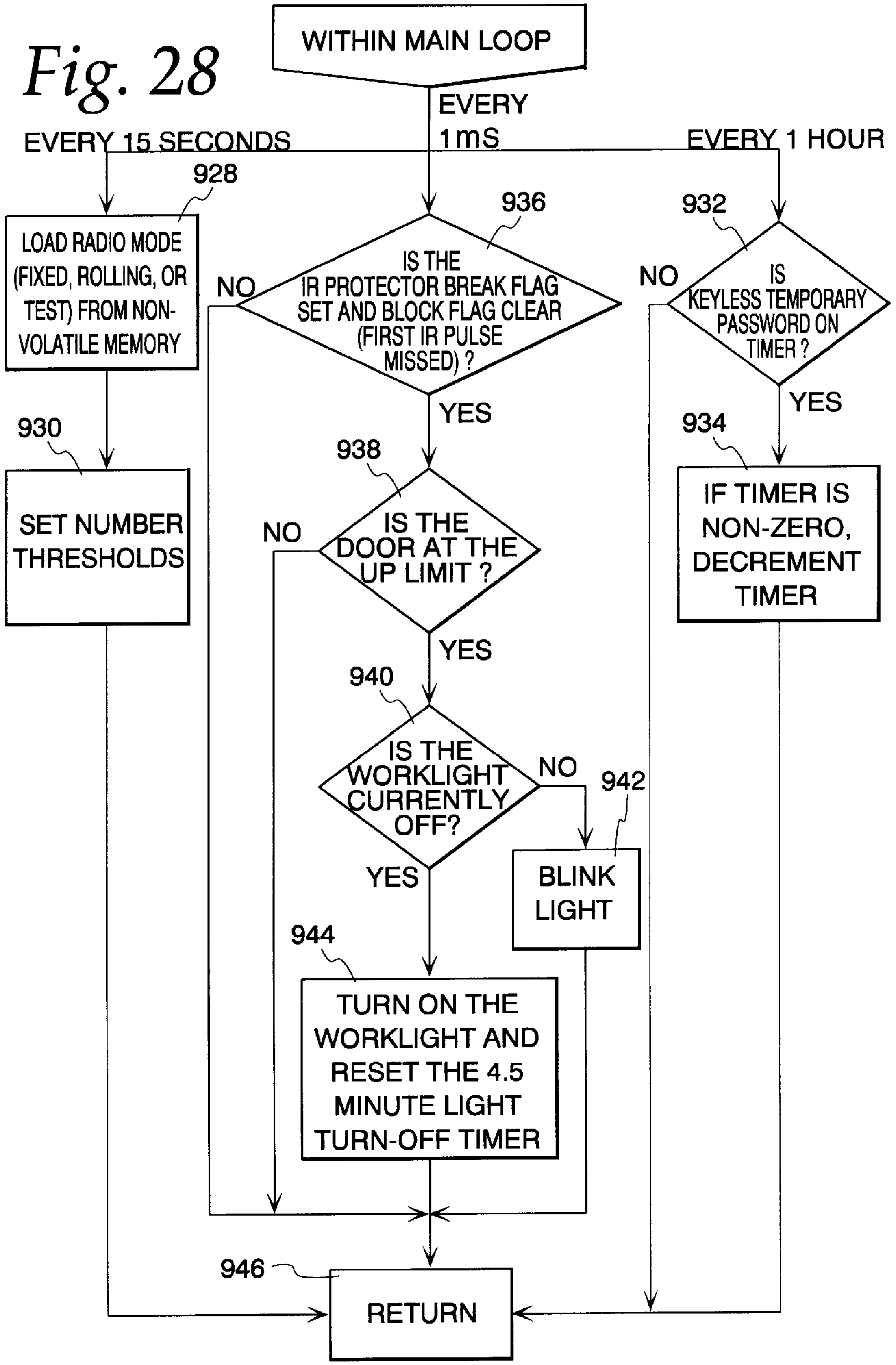
FIG. 28 is a flow diagram of routines periodically performed in the main programmed loop.

The control structure of the present embodiment includes a main loop which is substantially continuously executed. FIG. 28 is a flow diagram showing portions of the loop. Every 15 seconds a step 928 is performed in which the local radio mode is loaded from nonvolatile memory and the number thresholds are set in a step 930. This activity ends with a return step 946. Every hour a step 932 is performed to determine if a keypad temporary timer is currently active. If so, flow proceeds to step 914 where the time is decremented and a return is executed at step 946.

Every 1 millisecond a step 936 is performed to determine if the IR break flag is set and the IR block flag is not set. This condition is indicative of the first missed protector pulse. If the determination in step 936 is negative, a return is performed. If step 936 detects only the IR break flag and not the IR block flag, a step 938 is performed to identify if the door is at the up limit. When the door is not at the up limit, a return is performed. When step 938 detects the door at the up limit, a step 940 is performed to identify if the light is on. If the light is on, it is blinked a predetermined number of times in step 942 and a return is executed. When step 940 determines that the light is off a step 944 is performed to turn the light on and set a 4.5 minute light keep on timer. A return is executed after step 944.

Figure 29:
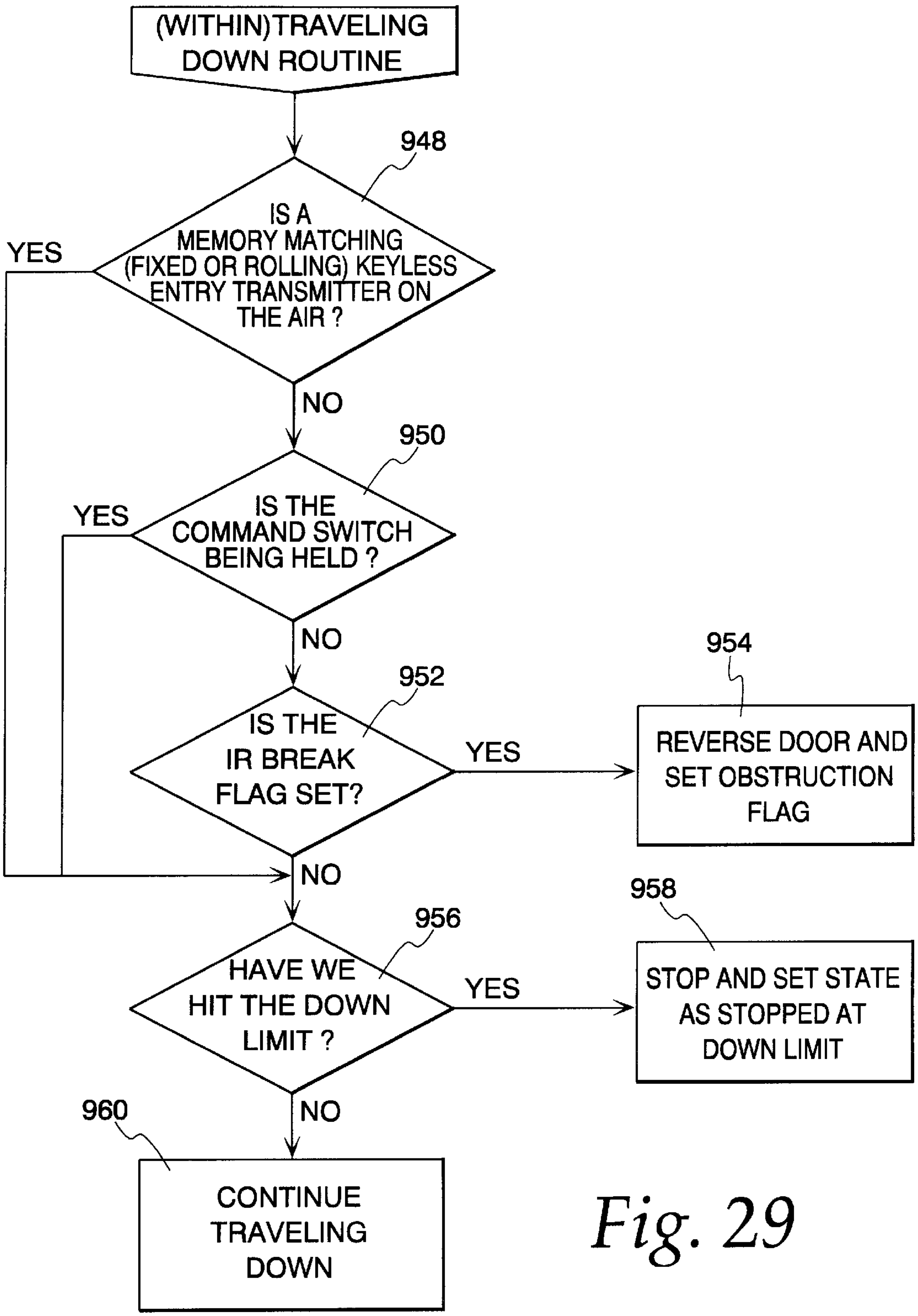
FIG. 29 is a flow diagram of portions of a travelling down routine.

FIG. 29 is a flow diagram illustrating the use of the IR protection circuit in door control. At a step 948 a decision is made whether a memory matching keypad type transmitter is on the air. If so, flow proceeds to step 956 to determine if the down limit of door travel has occurred. If the down limit has been reached, a step 958 is performed to set a stopped at down limit state of the door. When step 956 determines that the down limit has not been reached, a step 960 is performed to continue the downward travel of the door. When step 948 is answered in the negative, a step 950 is performed to determine if the command switch is being held down. If it is, flow proceeds to step 956 and either step 958 or 960 as discussed above. When step 950 is answered in the negative, a step 952 is performed in which the IR break flag is checked. If the break flag is set, signalling an obstruction, a step 954 is performed to reverse the door, set the new state of the door and set an obstruction flag. When step 952 does not detect an IR break flag, flow proceeds to step 956 as above described. It should be mentioned that the conditions established in steps 948 and 950 are intended to allow the operator to override the obstruction detector.

While there has been illustrated and described a particular embodiment of the present invention, it will be appreciated that numerous changes and modifications will occur to those skilled in the art, and it is intended in the appended claims to cover all those changes and modifications which fall within the true spirit and scope of the present invention. By way of example, the transmitter and receivers of the disclosed embodiment are controlled by programmed microcontrollers. The controllers could be implemented as application specific integrated circuits within the scope of the present invention.

APPENDIX

```
;       -- Rejected fixed mode (and fixed mode test) when learning light and
;          open/close/stop transmitters.
;
;       Revision 1.8:
;       -- Changed learn from wall control to work only when both switches are
;          held.  Modified force pot. read routine (moved enabling of blank
;          time and disabling of interrupts).  Fixed mode now learns command
;          with any combination of wall control switches.
;
;       Revision 1.9:
;       -- Changed PWM output to go from 0-50% duty cycle.  This eliminated the
;          problem of PWM interrupts causing problems near 100% duty cycle.
;          THIS REVISION REQUIRES A HARDWARE CHANGE.
;
;       Revision 1.9A:
;       -- Enabled ROM checksum.  Cleaned up documentation.
;
;--------------------------------------------------------------------------
;
;--------------------------------------------------------------------------
;       NON-VOL MEMORY MAP
;--------------------------------------------------------------------------
;
;       00      A0                              D0      Multi-function transmitters
;       01      A0                              D0
;       02      A1                              D0
;       03      A1                              D0
;       04      A2                              D1
;       05      A2                              D1
;       06      A3                              D1
;       07      A3                              D1
;       08      A4                              D2
;       09      A4                              D2
;       0A      A5                              D2
;       0B      A5                              D2
;       0C      A6                              D3
;       0D      A6                              D3
;       0E      A7                              D3
;       0F      A7                              D3
;       10      A8                              D4
;       11      A8                              D4
;       12      A9                              D4
;       13      A9                              D4
;       14      A10                             D5
;       15      A10                             D5
;       16      A11                             D5
;       17      A11                             D5
;       18      B                               D6
;       19      B                               D6
;       1A      unused                  D6
;       1B      unused                  D6
;       1C      unused                  D7
;       1D      unused                  D7
;       1E      unused                  D7
```

-36

```
;       1F      unused          D7
;       20      unused          DTCP        Keyless permanent 4 digit code
;       21      unused          DTCID       Keyless ID code
;       22      unused          DTCR1       Keyless Roll value
;       23      unused          DTCR2
;       24      unused          DTCT        Keyless temporary 4 digit code
;       25      unused          DurationKeyless temporary duration
;                                                      Upper byte = Mode:
hours/activations
;                                                      Lower byte = # of hours/activations
;       26      unused          Radio type
;                                   77665544 33221100
;                                   00 = CMD   01 = LIGHT
;                                   10 = OPEN/CLOSE/STOP
;       27      unused          Fixed / roll
;                                   Upper word = fixed/roll byte
;                                   Lower word = unused
;       28      CYCLE COUNTER 1ST 16 BITS
;       29      CYCLE COUNTER 2ND 16 BITS
;       2A      VACATION FLAG
;
;               Vacation Flag . Last Operation
;               0000            XXXX  in vacation
;               1111            XXXX out of vacation
;
;       2B      A MEMORY ADDRESS LAST WRITTEN
;       2C      Reserved / Flex GDO only
;       2D      Reserved / Flex GDO only
;       2E      Reserved / Flex GDO only
;       2F      Reserved / Flex GDO only
;
;       30-3F   Force Back trace
;
;-------------------------------------------------------------------------
;       RS232 DATA
;-------------------------------------------------------------------------
;
;       INPUT  OUTPUT
;
;       30H     SWITCH STATUS
;               XXXXXXX0    UP LIMIT OPEN
;               XXXXXXX1    UP LIMIT CLOSED
;               XXXXXX0X    DOWN LIMIT OPEN
;               XXXXXX1X    DOWN LIMIT CLOSED
;               XXXXX0XX    COMMAND OPEN
;               XXXXX1XX    COMMAND CLOSED
;               XXXX0XXX    WORKLIGHT OPEN
;               XXXX1XXX    WORKLIGHT CLOSED
;               XXX0XXXX    VACATION OPEN
;               XXX1XXXX    VACATION CLOSED
;
;       31H     SYSTEM STATUS
;               XXXXSSSS    STATE DATA
;               XXX0XXXX    NOT IN LEARN MODE
```

37

```
;          XXX1XXXX    IN LEARN MODE
;          XX0XXXXX    NOT IN VACATION MODE
;          XX1XXXXX    IN VACATION MODE
;          X0XXXXXX    LIGHT OFF
;          X1XXXXXX    LIGHT ON
;          0XXXXXXX    AOBS OK
;          1XXXXXXX    AOBS ERROR
;
;    32H   RPM PERIOD
;          RETURNED HIGH BYTE
;          RETURNED LOW BYTE
;
;    33H   FORCE
;          RETURNED DOWN FORCE
;          RETURNED UP FORCE
;
;    34H   RADIO MEMORY CODES PAGE 00
;          32 BYTES
;
;    35H   RADIO MEMORY CODES PAGE 10
;          32 BYTES
;
;    36H   OPERATION HISTORY PAGE 20
;          32 BYTES
;
;    37H   FORCE HISTORY PAGE 30
;
;    38H   MEMORY TEST AND ERASE ALL!!
;          00 OK
;          FF ERROR
;
;    39H   SET PROGRAM MODE
;
;    56H   GDO LOGIC VERSION NUMBER
;          01 = Flex Logic Version 1.9A
;          (Chamberlain part number 125C0141)
;
;
;    REASON
;    00    COMMAND
;    10    RADIO COMMAND
;    20    FORCE
;    30    AUX OBS
;    40    A REVERSE DELAY
;    50    LIMIT
;    60    EARLY LIMIT
;    70    MOTOR MAX TIME, TIME OUT
;    80    MOTOR COMMANDED OFF RPM CAUSING AREV
;    90    DOWN LIMIT WITH COMMAND HELD
;    A0    DOWN LIMIT WITH THE RADIO HELD
;    B0    RELEASE OF COMMAND OR RADIO AFTER A FORCED
;    UP MOTOR ON DUE TO RPM PULSE WITHG MOTOR OFF
;
;    STATE
```

```
;
;       00      AUTOREVERSE DELAY
;       01      TRAVELING UP DIRECTION
;       02      AT THE UP LIMIT AND STOPED
;       03      ERROR RESET
;       04      TRAVELING DOWN DIRECTION
;       05      AT THE DOWN LIMIT
;       06      STOPPED IN MID TRAVEL
;
;
;---------------------------------------------------------------------------
;       DIAG
;---------------------------------------------------------------------------
;
;       1) AOBS SHORTED
;       2) AOBS OPEN / MISS ALIGNED
;       3) COMMAND SHORTED
;       4) PROTECTOR INTERMITTENENT
;       5) CALL DEALER
;       A) NO RPM IN THE FIRST SECOND
;       B) RPM FORCED A REVERSE
;       C)
;
;
;
;---------------------------------------------------------------------------
;       DOG 2
;---------------------------------------------------------------------------
;
;       DOG 2 IS A SECONDARY WATCHDOG USED TO
;       RESET THE SYSTEM IF THE LOWEST LEVEL "MAINLOOP"
;       IS NOT REACHED WITHIN A 3 SECOND
;
;---------------------------------------------------------------------------
;       Conditional Assembly
;---------------------------------------------------------------------------

Yes                     .equ    1
No                      .equ    0
TwoThirtyThree  .equ    Yes


;
;---------------------------------------------------------------------------
;       EQUATE STATEMENTS
;---------------------------------------------------------------------------

check_sum_value         .equ    04DH
TIMER_0                 .equ    10H
TIMER_0_EN              .equ    03H
TIMER_1_EN              .equ    0CH

MOTOR_HI                .equ    034H
MOTOR_LO                .equ    0BCH
```

```
PWM_CHARGE        .equ   00H
PWM_DISCHARGE     .equ   01H
LIGHT             .equ   0FFH
LIGHT_ON          .equ   02H
MOTOR_UP          .equ   01H
MOTOR_DN          .equ   04H
DN_LIMIT          .equ   02H
UP_LIMIT          .equ   01H
DIS_SW            .equ   10000000B
CDIS_SW           .equ   01111111B
SWITCHES          .equ   01000000B
CHARGE_SW         .equ   00100000B
CCHARGE_SW        .equ   11011111B
PWM_HI            .equ   10H
COMPARATORS       .equ   30H
DOWN_COMP         .equ   20H
UP_COMP           .equ   10H
PWM_DIS           .equ   20H
P01M_INIT         .equ   01000100B          ; set mode p00-p03 out p04-p07in
P2M_INIT          .equ   01100011B

        .IF       TwoThirtyThree
P3M_INIT          .equ   00000011B                ; set port3 p30-p33 input ANALOG
mode
        .ELSE
P3M_INIT          .equ   00000001B                ; Port3 must be digital -- port2
push-pull
        .ENDIF

P01S_INIT         .equ   00000010B
P2S_INIT          .equ   10000011B
P3S_INIT          .equ   00000000B

FLASH             .equ   0FFH
WORKLIGHT         .equ   02H

COM_CHARGE        .equ   2
WORK_CHARGE       .equ   20
VAC_CHARGE        .equ   80

COM_DIS           .equ   01
WORK_DIS          .equ   04
VAC_DIS           .equ   24

CMD_TEST          .equ   00
WL_TEST           .equ   01
VAC_TEST          .equ   02
CHARGE            .equ   03

AUTO_REV          .equ   00H
UP_DIRECTION      .equ   01H
UP_POSITION  .equ 02H
DN_DIRECTION      .equ   04H
DN_POSITION  .equ 05H
```

```
STOP            .equ    06H
CMD_SW          .equ    01H
LIGHT_SW        .equ    02H
VAC_SW          .equ    04H

TRUE            .equ    0FFH
FALSE           .equ    00H

FIXED_MODE      .equ    10101010b       ;Fixed mode radio
ROLL_MODE       .equ    01010101b       ;Rolling mode radio
FIXED_TEST      .equ    00000000b       ;Unsure of mode -- test fixed
ROLL_TEST       .equ    00000001b       ;Unsure of mode -- test roll
FIXED_MASK      .equ    FIXED_TEST      ;Bit mask for fixed mode
ROLL_MASK       .equ    ROLL_TEST       ;Bit mask for rolling mode

FIXTHR          .equ    03H             ;Fixed code decision threshold
DTHR            .equ    02H             ;Rolling code decision threshold
FIXSYNC         .equ    08H             ;Fixed code sync threshold
DSYNC           .equ    04H             ;Rolling code sync threshold
FIXBITS         .equ    11D             ;Fixed code number of bits
DBITS           .equ    21D             ;Rolling code number of bits

EQUAL           .equ    00              ;Counter compare result constants
BACKWIN         .equ    7FH             ;
FWDWIN          .equ    80H             ;
OUTOFWIN        .equ    0FFH            ;

AddressCounter  .equ    27H
AddressAPointer .equ    2BH

CYCCOUNT        .equ    28H

TOUCHID         .equ    21H             ;Touch code ID
TOUCHROLL       .equ    22H             ;Touch code roll value
TOUCHPERM       .equ    20H             ;Touch code permanent password
TOUCHTEMP       .equ    24H             ;Touch code temporary password
DURAT           .equ    25H             ;Touch code temp. duration

VERSIONNUM      .equ    01d             ;Version:  Flex logic V1.0

RTYPEADDR       .equ    26H             ;Radio transmitter type
VACATIONADDR    .equ    2AH
MODEADDR        .equ    27H             ;Rolling/Fixed mode in EEPROM
                                        ;High byte = don't care (now)
                                        ;Low byte = RadioMode flag

NOEECOMM        .equ    01111111b       ;Flag:  skip radio read/write
NOINT           .equ    10000000b       ;Flag:  skip radio interrupts

RDROPTIME       .equ    125d            ;Radio drop-out time:  0.5s

LRNOCS          .equ    0AAH            ;Learn open/close/stop
BRECEIVED       .equ    077H            ;B code received flag
LRNLIGHT        .equ    0BBH            ;Light command trans.
```

```
LRNTEMP              .equ   0CCH               ;Learn touchcode temporary
LRNDURTN             .equ   0DDH               ;Learn t.c. temp. duration
REGLEARN             .equ   0EEH               ;Regular learn mode
NORMAL               .equ   00H                ;Normal command trans.

ENTER                .equ   00H                ;Touch code ENTER key
POUND                .equ   01H                ;Touch code # key
STAR                 .equ   02H                ;Touch code * key

ACTIVATIONS          .equ   0AAH               ;Number of activations mode
HOURS                .equ   055H               ;Number of hours mode

;-------------------------------------------------------------------------------
;       PERIODS
;-------------------------------------------------------------------------------

LIMIT_COUNT .equ     0FH                       ; limit debounce 1 way 32mS
AUTO_HI              .equ   00H                ; auto rev timer .5 sec
AUTO_LO              .equ   0F4H
MIN_COUNT            .equ   02H                ; pwm start point
TOTAL_PWM_COUNT      .equ   03FH               ; pwm end = start + 2*total-1
FLASH_HI             .equ   00H                ; .25 sec flash
FLASH_LO             .equ   07AH
SET_TIME_HI  .equ    02H                       ; 4.5 MIN
SET_TIME_LO  .equ    02H                       ; 4.5 MIN
SET_TIME_PRE         .equ   0FBH               ; 4.5 MIN
ONE_SEC              .equ   0F4H               ; WITH A /2 IN FRONT
CMD_MAKE             .equ   8D                 ; cycle count *10mS
CMD_BREAK            .equ   (255D-8D)
LIGHT_MAKE           .equ   8D                 ; cycle count *11mS
LIGHT_BREAK .equ     (255D-8D)
VAC_MAKE_OUT         .equ   4D                 ; cycle count *100mS
VAC_BREAK_OUT        .equ   (255D-4D)
VAC_MAKE_IN          .equ   2D
VAC_BREAK_IN         .equ   (255D-2D)

VAC_DEL              .equ   8D
CMD_DEL_EX           .equ   4D
VAC_DEL_EX           .equ   50D

;*******************************************************************************
;       PREDEFINED REG
;*******************************************************************************
        .IF     TwoThirtyThree
ALL_ON_IMR           .equ   00111101b          ; turn on int for timers rpm auxobs
radio
RETURN_IMR           .equ   00011100b          ; return on the IMR

RadioImr             .equ   00000001b          ; turn on the radio only

        .ELSE
```

```
ALL_ON_IMR          .equ    00111111b           ; Turn on all ints -- both radio
edges
RETURN_IMR          .equ    00011100b           ; Return on the IMR

RadioImr            .equ    00000011b           ; Turn on the radio only

        .ENDIF

;--------------------------------------------------------------------------
;       GLOBAL REGISTERS
;--------------------------------------------------------------------------

STATUS              .equ    04H                 ; CMD_TEST 00
                                                ; WL_TEST 01
                                                ; VAC_TEST 02
                                                ; CHARGE 03

STATE               .equ    05H                 ; state register
PWM_STATUS          .equ    06H
PWM_OFF             .equ    07H
AUTO_DELAY_HI       .equ    08H
AUTO_DELAY_LO       .equ    09H
AUTO_DELAY          .equ    08H
MOTOR_TIMER_HI      .equ    0AH
MOTOR_TIMER_LO      .equ    0BH
MOTOR_TIMER         .equ    0AH
LIGHT_TIMER_HI      .equ    0CH
LIGHT_TIMER_LO      .equ    0DH
LIGHT_TIMER .equ    0CH

PRE_LIGHT           .equ    0FH


CHECK_GRP           .equ    10H
check_sum           .equ    r0                  ; check sum pointer
rom_data            .equ    r1
test_adr_hi     .equ    r2
test_adr_lo     .equ    r3
test_adr        .equ    rr2
CHECK_SUM           .equ    CHECK_GRP+0         ; check sum reg for por
ROM_DATA            .equ    CHECK_GRP+1     ; data read
AUXLEARNSW          .equ    CHECK_GRP+2         ;
RRTO                .equ    CHECK_GRP+3     ;
RPM_ACOUNT          .equ    CHECK_GRP+4         ; to test for active rpm
RSCCOUNT            .equ    CHECK_GRP+5         ; rs232 byte counter
RSSTART             .equ    CHECK_GRP+6         ; rs232 start flag

RADIO_CMD           .equ    CHECK_GRP+7     ; radio command
R_DEAD_TIME         .equ    CHECK_GRP+8     ;
FAULT               .equ    CHECK_GRP+9         ;
VACFLAG             .equ    CHECK_GRP+10        ; VACATION mode flag
VACFLASH            .equ    CHECK_GRP+11
VACCHANGE           .equ    CHECK_GRP+12
```

```
TASKSWITCH          .equ    CHECK_GRP+13
FORCE_IGNORE        .equ    CHECK_GRP+14
FORCE_PRE           .equ    CHECK_GRP+15


TIMER_GROUP         .equ    20H
sw_address_hi   .equ    r0
sw_address_lo   .equ    r1
sw_address          .equ    rr0
t_address_hi    .equ    r2
t_address_lo    .equ    r3
t_address           .equ    rr2
switch_delay    .equ    r4
limit               .equ    r5
obs_count           .equ    r6
rs232do         .equ    r7
rs232di         .equ    r8
rscommand           .equ    r9
rs232docount    .equ    r10
rs232dicount    .equ    r11
rs232odelay     .equ    r12
rs232idelay     .equ    r13
rs232ccount     .equ    r14
rs232page           .equ    r15

SWITCH_DELAY        .equ    TIMER_GROUP+4
LIMIT               .equ    TIMER_GROUP+5
OBS_COUNT           .equ    TIMER_GROUP+6
RS232DO             .equ    TIMER_GROUP+7
RS232DI             .equ    TIMER_GROUP+8
RSCOMMAND           .equ    TIMER_GROUP+9
RS232DOCOUNT        .equ    TIMER_GROUP+10
RS232DICOUNT        .equ    TIMER_GROUP+11
RS232ODELAY .equ    TIMER_GROUP+12
RS232IDELAY .equ    TIMER_GROUP+13
RS232CCOUNT .equ    TIMER_GROUP+14
RS232PAGE           .equ    TIMER_GROUP+15

;***********************************************************************
; LEARN EE GROUP FOR LOOPS ECT
;***********************************************************************
LEARNEE_GRP         .equ    30H                     ;
TEMPH               .equ    LEARNEE_GRP             ;
TEMPL       .equ    LEARNEE_GRP+1           ;
TEMP                .equ    LEARNEE_GRP+2           ;
LEARNDB             .equ    LEARNEE_GRP+3           ; learn debouncer
LEARNT              .equ    LEARNEE_GRP+4           ; learn timer
ERASET              .equ    LEARNEE_GRP+5           ; erase timer
MTEMPH              .equ    LEARNEE_GRP+6           ; memory temp
MTEMPL              .equ    LEARNEE_GRP+7           ; memory temp
MTEMP               .equ    LEARNEE_GRP+8           ; memory temp
SERIAL              .equ    LEARNEE_GRP+9           ; data to & from nonvol memory
```

```
ADDRESS              .equ    LEARNEE_GRP+10        ; address for the serial nonvol
memory
T0EXT        .equ    LEARNEE_GRP+11        ; t0 extend dec'd every T0 int
T4MS                 .equ    LEARNEE_GRP+12        ; 4 mS counter
T125MS               .equ    LEARNEE_GRP+13        ; 125mS counter
ZZWIN        .equ    LEARNEE_GRP+14        ; radio 00 code window
SKIPRADIO            .equ    LEARNEE_GRP+15        ; flag to skip radio read, write if
                                                   ; learn or vacation talking to it

temph        .equ    r0                    ;
templ        .equ    r1                    ;
temp                 .equ    r2            ;
learndb      .equ    r3                    ; learn debouncer
learnt       .equ    r4                    ; learn timer
eraset       .equ    r5                    ; erase timer
mtemph       .equ    r6                    ; memory temp
mtempl       .equ    r7                    ; memory temp
mtemp        .equ    r8                    ; memory temp
serial       .equ    r9                    ; data to and from nonvol mem
address      .equ    r10                   ; addr for serial nonvol memory
t0ext        .equ    r11                   ; t0 extend dec'd every T0 int
t4ms                 .equ    r12           ; 4 mS counter
t125ms       .equ    r13                   ; 125mS counter
zzwin        .equ    r14                   ;
skipradio            .equ    r15           ; flag to skip radio read, write if
                                           ; learn or vacation talking to it


PWM_GROUP            .equ    40H
dnforce      .equ    r0
upforce      .equ    r1
up_force_hi  .equ    r4
up_force_lo  .equ    r5
up_force             .equ    rr4
dn_force_hi  .equ    r6
dn_force_lo  .equ    r7
dn_force             .equ    rr6
force_add_hi .equ    r8
force_add_lo .equ    r9
force_add            .equ    rr8
up_temp              .equ    r10
dn_temp              .equ    r11
pulsewidth           .equ    r12
pwm_count            .equ    r13

DNFORCE              .equ    40H
UPFORCE              .equ    41H
AOBSTEST             .equ    42H
FAULTTIME            .equ    43H
UP_FORCE_HI  .equ    44H
UP_FORCE_LO  .equ    45H
DN_FORCE_HI  .equ    46H
DN_FORCE_LO          .equ    47H
PULSEWIDTH           .equ    4CH
```

```
PWM_COUNT          .equ    4DH
AOBSF              .equ    4EH
FAULTCODE          .equ    4FH


RPM_GROUP          .equ    50H

rtypes2         .equ    r0
stackflag          .equ    r1
rpm_temp_hi     .equ    r2
rpm_temp_lo     .equ    r3
rpm_past_hi     .equ    r4
rpm_past_lo     .equ    r5
rpm_past           .equ    rr4
rpm_period_hi   .equ    r6
rpm_period_lo   .equ    r7
rpm_period         .equ    rr6
rpm_count          .equ    r8
rpm_diff_hi     .equ    r9
rpm_diff_lo     .equ    r10
rpm_2past_hi    .equ    r11
rpm_2past_lo    .equ    r12
rpm_set_diff_hi .equ    r13
rpm_set_diff_lo .equ    r14
rpm_time_out    .equ    r15

RTypes2            .equ    RPM_GROUP+0
STACKFLAG          .equ    RPM_GROUP+1
RPM_TEMP_HI .equ   RPM_GROUP+2
RPM_TEMP_LO        .equ    RPM_GROUP+3
RPM_PAST_HI  .equ  RPM_GROUP+4
RPM_PAST_LO .equ   RPM_GROUP+5
RPM_PERIOD_HI      .equ    RPM_GROUP+6
RPM_PERIOD_LO      .equ    RPM_GROUP+7
RPM_COUNT          .equ    RPM_GROUP+8
RPM_DIFF_HI  .equ  RPM_GROUP+9
RPM_DIFF_LO  .equ  RPM_GROUP+10
RPM_2PAST_HI       .equ    RPM_GROUP+11
RPM_2PAST_LO       .equ    RPM_GROUP+12
RPM_SET_DIFF_HI    .equ    RPM_GROUP+13
RPM_SET_DIFF_LO    .equ    RPM_GROUP+14
RPM_TIME_OUT       .equ    RPM_GROUP+15


;***************************************************************************
; RADIO GROUP
;***************************************************************************
RadioGroup    .equ    60H                          ;
RTemp              .equ    RadioGroup              ; radio temp storage
RTempH             .equ    RadioGroup+1            ; radio temp storage high
RTempL             .equ    RadioGroup+2            ; radio temp storage low
RTimeAH            .equ    RadioGroup+3            ; radio active time high byte
```

```
RTimeAL           .equ   RadioGroup+4         ; radio active time low byte
RTimeIH           .equ   RadioGroup+5         ; radio inactive time high byte
RTimeIL           .equ   RadioGroup+6         ; radio inactive time low byte
Radio1H           .equ   RadioGroup+7         ; sync 1 code storage
Radio1L     .equ  RadioGroup+8         ; sync 1 code storage
PointerH          .equ   RadioGroup+9         ;
PointerL    .equ  RadioGroup+10        ;
AddValueH         .equ   RadioGroup+11        ;
AddValueL         .equ   RadioGroup+12        ;
RadioC      .equ  RadioGroup+13        ; radio word count
Radio3H           .equ   RadioGroup+14        ; sync 3 code storage
Radio3L     .equ  RadioGroup+15        ; sync 3 code storage
rtemp             .equ   r0                   ; radio temp storage
rtemph      .equ  r1                   ; radio temp storage high
rtempl      .equ  r2                   ; radio temp storage low
rtimeah     .equ  r3                   ; radio active time high byte
rtimeal     .equ  r4                   ; radio active time low byte
rtimeih     .equ  r5                   ; radio inactive time high byte
rtimeil     .equ  r6                   ; radio inactive time low byte
radio1h     .equ  r7                   ; sync 1 code storage
radio1l     .equ  r8                   ; sync 1 code storage
pointerh    .equ  r9                   ;
pointerl    .equ  r10                  ;
addvalueh         .equ   r11                  ;
addvaluel         .equ   r12                  ;
radioc      .equ  r13                  ; radio word count
radio3h     .equ  r14                  ; sync 3 code storage
radio3l     .equ  r15                  ; sync 3 code storage

CounterGroup .equ 070h                 ; counter group
BitMask     .equ  CounterGroup+01      ; Mask for transmitters
LastMatch         .equ   CounterGroup+02      ; last matching code address
LoopCount         .equ   CounterGroup+03      ; loop counter
CounterA          .equ   CounterGroup+04      ; counter translation MSB
CounterB          .equ   CounterGroup+05      ;
CounterC          .equ   CounterGroup+06      ;
CounterD          .equ   CounterGroup+07      ; counter translation LSB
MirrorA     .equ  CounterGroup+08      ; back translation MSB
MirrorB     .equ  CounterGroup+09      ;
MirrorC     .equ  CounterGroup+010     ;
MirrorD     .equ  CounterGroup+011     ; back translation LSB
COUNT1H           .equ   CounterGroup+012     ; received count
COUNT1L           .equ   CounterGroup+013
COUNT3H           .equ   CounterGroup+014
COUNT3L           .equ   CounterGroup+015

loopcount         .equ   r3                   ;
countera    .equ  r4                   ;
counterb    .equ  r5                   ;
counterc    .equ  r6                   ;
counterd    .equ  r7                   ;
mirrora     .equ  r8                   ;
mirrorb     .equ  r9                   ;
```

```
mirrorc         .equ    r10                             ;
mirrord         .equ    r11                             ;

Radio2Group             .equ    080H

PREVFIX                 .equ    Radio2Group + 0
PREVTMP                 .equ    Radio2Group + 1
ROLLBIT                 .equ    Radio2Group + 2
RTimeDH                 .equ    Radio2Group + 3
RTimeDL                 .equ    Radio2Group + 4
RTimePH                 .equ    Radio2Group + 5
RTimePL                 .equ    Radio2Group + 6
ID_B                    .equ    Radio2Group + 7
SW_B                    .equ    Radio2Group + 8
RADIOBIT                .equ    Radio2Group + 9
RadioTimeOut    .equ    Radio2Group + 10
RadioMode               .equ    Radio2Group + 11                ;Fixed or rolling mode
BitThresh               .equ    Radio2Group + 12                ;Bit decision threshold
SyncThresh              .equ    Radio2Group + 13                ;Sync pulse decision threshold
MaxBits         .equ    Radio2Group + 14                ;Maximum number of bits
RFlag                   .equ    Radio2Group + 15                ;Radio flags

prevfix         .equ    r0
prevtmp         .equ    r1
rollbit         .equ    r2
id_b                    .equ    r7
sw_b                    .equ    r8
radiobit        .equ    r9
radiotimeout    .equ    r10
radiomode               .equ    r11
rflag                   .equ    r15


OrginalGroup    .equ    90H
SW_DATA                 .equ    OrginalGroup+0
ONEP2                   .equ    OrginalGroup+1          ; 1.2 SEC TIMER TICK .125
LAST_CMD                .equ    OrginalGroup+2          ; LAST COMMAND FROM
                                                                ; = 55 WALL CONTROL
                                                                ; = 00 RADIO
CodeFlag                .equ    OrginalGroup+3          ; Radio code type flag
                                                                ; FF = Learning open/close/stop
                                                                ; 77 = b code
                                                                ; AA = open/close/stop code
                                                                ; 55 = Light control transmitter
                                                                ; 00 = Command or unknown
RPMONES                 .equ    OrginalGroup+4          ; RPM Pulse One Sec. Disable
RPMCLEAR                .equ    OrginalGroup+5          ; RPM PULSE CLEAR & TEST TIMER
FAREVFLAG               .equ    OrginalGroup+6          ; RPM FORCED AREV FLAG
                                                                ; 88H FOR A FORCED REVERSE

FLASH_FLAG              .equ    OrginalGroup+7
FLASH_DELAY_HI          .equ    OrginalGroup+8
FLASH_DELAY_LO          .equ    OrginalGroup+9
FLASH_DELAY             .equ    OrginalGroup+8
```

```
FLASH_COUNTER     .equ    OrginalGroup+10
RadioTypes        .equ    OrginalGroup+11            ; Types for one page of tx's
LIGHT_FLAG        .equ    OrginalGroup+12
CMD_DEB           .equ    OrginalGroup+13
LIGHT_DEB         .equ    OrginalGroup+14
VAC_DEB           .equ    OrginalGroup+15

NextGroup         .equ    0A0H
SDISABLE          .equ    NextGroup+0       ; system disable timer
PRADIO3H          .equ    NextGroup+1       ; 3 mS code storage high byte
PRADIO3L          .equ    NextGroup+2       ; 3 mS code storage low byte
PRADIO1H          .equ    NextGroup+3       ; 1 mS code storage high byte
PRADIO1L          .equ    NextGroup+4       ; 1 mS code storage low byte
RTO               .equ    NextGroup+5       ; radio time out
;RFlag            .equ    NextGroup+6       ; radio flags
RINFILTER         .equ    NextGroup+7       ; radio input filter

LIGHT1S           .equ    NextGroup+8       ; light timer for 1second flash
DOG2              .equ    NextGroup+9       ; second watchdog
FAULTFLAG         .equ    NextGroup+10      ; flag for fault blink. no rad. blink
MOTDEL            .equ    NextGroup+11      ; motor time delay
LIGHTS            .equ    NextGroup+12      ; light state
DELAYC            .equ    NextGroup+13      ; for the time delay for command
COUNTER           .equ    NextGroup+14      ; delay counter
CMP               .equ    NextGroup+15      ; Counter compare result

BACKUP_GRP        .equ    0B0H
PCounterA         .equ    BACKUP_GRP
PCounterB         .equ    BACKUP_GRP+1
PCounterC         .equ    BACKUP_GRP+2
PCounterD         .equ    BACKUP_GRP+3
HOUR_TIMER        .equ    BACKUP_GRP+4
HOUR_TIMER_HI     .equ    BACKUP_GRP+4
HOUR_TIMER_LO     .equ    BACKUP_GRP+5
ForcedDown        .equ    BACKUP_GRP+6
BRPM_COUNT        .equ    BACKUP_GRP+7
BRPM_TIME_OUT     .equ    BACKUP_GRP+8
BFORCE_IGNORE     .equ    BACKUP_GRP+9
BAUTO_DELAY_HI    .equ    BACKUP_GRP+10
BAUTO_DELAY_LO    .equ    BACKUP_GRP+11
BAUTO_DELAY       .equ    BACKUP_GRP+10
BCMD_DEB          .equ    BACKUP_GRP+12
BSTATE            .equ    BACKUP_GRP+13


STACKTOP          .equ    238                        ; start of the stack
STACKEND          .equ    0BEH                       ; end of the stack

RS232OS           .equ    01000000B                  ; RS232 output bit set
RS232OC           .equ    10111111B                  ; RS232 output bit clear
RS232OP           .equ    P3                         ; RS232 output port
RS232IP           .equ    P2                         ; RS232 input port
RS232IM           .equ    00100000B                  ; RS232 mask
csh               .equ    00010000B                  ; chip select high for the 93c46
```

```
csl             .equ    11101111B       ; chip select low for 93c46
clockh          .equ    00001000B       ; clock high for 93c46
clockl          .equ    11110111B       ; clock low for 93c46
doh             .equ    00000100B       ; data out high for 93c46
dol             .equ    11111011B       ; data out low for 93c46
ledh            .equ    10000000B       ; turn the led pin high "on"
ledl            .equ    01111111B       ; turn the led pin low "off"
psmask          .equ    01000000B       ; mask for the program switch
csport          .equ    P2              ; chip select port
dioport         .equ    P2              ; data i/o port
clkport         .equ    P2              ; clock port
ledport         .equ    P2              ; led port
psport          .equ    P2              ; program switch port

WATCHDOG_GROUP  .equ    0FH
pcon            .equ    r0
smr             .equ    r11
wdtmr           .equ    r15

        .IF     TwoThirtyThree

WDT     .macro
        .byte   5fh
        .endm

        .ELSE

WDT     .macro
        xor     P1, #00000001b          ; Kick external watchdog
        .endm

        .ENDIF

FILL    .macro
        .byte   0FFh
        .endm

FILL10  .macro
        FILL
        FILL
        FILL
        FILL
        FILL
        FILL
        FILL
        FILL
        FILL
        FILL
        .endm

FILL100         .macro
        FILL10
        FILL10
```

```
        FILL10
        FILL10
        FILL10
        FILL10
        FILL10
        FILL10
        FILL10
        FILL10
        .endm

FILL1000        .macro
        FILL100
        FILL100
        FILL100
        FILL100
        FILL100
        FILL100
        FILL100
        FILL100
        FILL100
        FILL100
        .endm

TRAP    .macro
        jp      start
        jp      start
        jp      start
        jp      start
        jp      start
        .endm
TRAP10.macro
        TRAP
        TRAP
        TRAP
        TRAP
        TRAP
        TRAP
        TRAP
        TRAP
        TRAP
        TRAP
        .endm

SetRpToRadio2Group      .macro
        .byte   031H
        .byte   080H
                        .endm

;*************************************************************************
;*
;* Interrupt Vector Table
;*
;*************************************************************************
```

```
        .org    0000H

        .IF     TwoThirtyThree

        .word   RADIO_INT                       ;IRQ0
        .word   000CH                           ;IRQ1, P3.3
        .word   RPM                             ;IRQ2, P3.1
        .word   AUX_OBS                         ;IRQ3, P3.0
        .word   TIMERUD                         ,IRQ4, T0
        .word   PWM                             ;IRQ5, T1

        .ELSE

        .word   RADIO_INT                       ;IRQ0
        .word   RADIO_INT                       ;IRQ1, P3.3
        .word   RPM                             ;IRQ2, P3.1
        .word   AUX_OBS                         ;IRQ3, P3.0
        .word   TIMERUD                         ;IRQ4, T0
        .word   PWM                             ;IRQ5, T1

        .ENDIF

        .page
        .org    000CH
        jp      START                           ;jmps to start at location 0101, 0202 etc

;-----------------------------------------------------------------------------
;       FORCE TABLE
;-----------------------------------------------------------------------------
force_table_50:
F_0:    .word   20FEH
F_1:    .word   20FEH
F_2:    .word   213AH
F_3:    .word   2176H
F_4:    .word   21B2H
F_5:    .word   21F0H
F_6:    .word   222CH
F_7:    .word   2268H
F_8:    .word   22A4H
F_9:    .word   22D0H
F_10:   .word   22FAH
F_11:   .word   2326H
F_12:   .word   233EH
F_13:   .word   2356H
F_14:   .word   236EH
F_15:   .word   2386H
F_16:   .word   239EH
F_17:   .word   23BEH
F_18:   .word   23D0H
F_19:   .word   23E8H
F_20:   .word   2400H
F_21:   .word   2418H
F_22:   .word   2430H
```

```
F_23:  .word  2448H
F_24:  .word  2460H
F_25:  .word  2478H
F_26:  .word  2490H
F_27:  .word  24A8H
F_28:  .word  24C0H
F_29:  .word  24D8H
F_30:  .word  24F0H
F_31:  .word  2508H
F_32:  .word  2522H
F_33:  .word  253AH
F_34:  .word  2576H
F_35:  .word  25B2H
F_36:  .word  25EEH
F_37:  .word  262AH
F_38:  .word  2666H
F_39:  .word  26A4H
F_40:  .word  26E0H
F_41:  .word  271CH
F_42:  .word  2758H
F_43:  .word  2794H
F_44:  .word  280EH
F_45:  .word  2886H
F_46:  .word  28FEH
F_47:  .word  2978H
F_48:  .word  29F0H
F_49:  .word  2A68H
F_50:  .word  2AE2H
F_51:  .word  2BD2H
F_52:  .word  2C4CH
F_53:  .word  2D3CH
F_54:  .word  2E2EH
F_55:  .word  2FAAH
F_56:  .word  32A2H
F_57:  .word  371AH
F_58:  .word  3D0CH
F_59:  .word  447CH
F_60:  .word  4D68H
F_61:  .word  57D2H
F_62:  .word  63BAH
F_63:  .word  711CH
F_64:  .word  711CH

;--------------------------------------------------------------------------------
;       RS232 DATA ROUTINES
;--------------------------------------------------------------------------------
;       enter rs232 start with word to output in rs232do

RS232OSTART:
        push   rp                           ; save the rp
        srp    #TIMER_GROUP                 ; set the group pointer
        clr    RSSTART                      ; one shot
        ld     rs232odelay,#6d              ; set the time delay to 3. mS
        clr    rs232docount                 ; start with the counter at 0
```

```
        and     RS232OP,#RS232OC                ; clear the output
        jr      NORSOUT                         ;


RS232:
        cp      RSSTART,#0FFH                   ; test for the start flag
        jr      z,RS232OSTART
RS232OUTPUT:
        push    rp                              ; save the rp
        srp     #TIMER_GROUP                    ; set the group pointer
        cp      rs232docount,#11d       ; test for last
        jr      nz,RS232R
        or      RS232OP,#RS232OS                ; set the output idle
        JR      NORSOUT
RS232R:
        djnz    rs232odelay,NORSOUT     ; cycle count time delay
        inc     rs232docount            ; set the count for the next cycle
        scf                                     ; set the carry flag for stop bits
        rrc     rs232do                 ; get the data into the carry
        jr      c,RS232SET                      ; if the bit is high then set
        and     RS232OP,#RS232OC                ; clear the output
        jr      SETTIME                         ; find the delay time
RS232SET:
        or      RS232OP,#RS232OS                ; set the output
SETTIME:
        ld      rs232odelay,#6d         ; set the data output delay
        tm      rs232docount,#00000001b ; test for odd words
        jr      z,NORSOUT                       ; if even done
        ld      rs232odelay,#7d         ; set the delay to 7 for odd
                                                ; this gives 6.5 *.512mS


NORSOUT:
RS232INPUT:
        cp      rs232dicount,#0FFH      ; test mode
        jr      nz,RECEIVING            ; if receiving then jump
        tm      RS232IP,#RS232IM                ; test the incoming data
        jr      nz,NORSIN                       ; if the line is still idle then skip
        clr     rs232dicount            ; start at 0
        ld      rs232idelay,#3          ; set the delay to mid
RECEIVING:
        djnz    rs232idelay,NORSIN      ; skip till delay is up
        inc     rs232dicount            ; bit counter
        cp      rs232dicount,#10d       ; test for last timeout
        jr      z,DIEVEN
        tm      RS232IP,#RS232IM                ; test the incoming data
        rcf                                     ; clear the carry
        jr      z,SKIPSETTING                   ; if input bit not set skip setting carry
        scf                                     ; set the carry
SKIPSETTING:
        rrc     rs232di                 ; save the data into the memory
        ld      rs232idelay,#6d         ; set the delay
        tm      rs232dicount,#00000001b ; test for odd
        jr      z,NORSIN                        ; if even skip
        ld      rs232idelay,#7          ; set the delay
```

```
        jr      NORSIN
DIEVEN:
        ld      rs232dicount,#0FFH          ; turn off the input till next start
        ld      rscommand,rs232di           ; save the value
        clr     RSCCOUNT                              ; clear the counter
NORSIN:
        pop     rp                                    ; return the rp
        ret
        FILL
        FILL

;*********************************************************************
; REGISTER INITILIZATION
;*********************************************************************

        .org    0101H                                 ; address has both bytes the same
start:
START: di                                   ; turn off the interrupt for init

        .IF     TwoThirtyThree

        ld      RP,#WATCHDOG_GROUP
        ld      wdtmr,#00001111B                      ; rc dog 100mS

        .ELSE

        clr     P1

        .ENDIF

        WDT                                           ; kick the dog
        clr     RP                                    ; clear the register pointer

;*********************************************************************
; PORT INITILIZATION
;*********************************************************************

        ld      P0,#P01S_INIT               ; RESET all ports
        ld      P2,#P2S_INIT-2              ; Set the up limit high , down limit low
        ld      P3,#P3S_INIT                ;
        ld      P01M,#P01M_INIT                       ; set mode p00-p03 out p04-p07in
        ld      P3M,#P3M_INIT                         ; set port3 p30-p33 input analog mode
                                                      ; p34-p37 outputs
        ld      P2M,#(P2M_INIT-3)           ; set port 2 mode setting the limits as
                                                      ; outputs for fema of open

;*********************************************************************
;* Internal RAM Test and Reset All RAM = mS *
;*********************************************************************
        srp     #0F0h                                 ; point to control group use stack
        ld      r15,#4                      ;r15= pointer (minimum of RAM)
write_again:
```

```
        WDT                                      ; KICK THE DOG
        ld      r14,#1
write_again1:
        ld      @r15,r14                         ;write 1,2,4,8,10,20,40,80
        cp      r14,@r15                         ;then compare
        jr      ne,system_error
        rl      r14
        jr      nc,write_again1
        clr     @r15                             ;write RAM(r5)=0 to memory
        inc     r15
        cp      r15,#240
        jr      ult,write_again


;************************************************************************
;*      Checksum Test                   *
;************************************************************************
CHECKSUMTEST:
        srp     #CHECK_GRP
        ld      test_adr_hi,#01FH
        ld      test_adr_lo,#0FFH               ;maximum address=fffh
add_sum:
        WDT                                      ; KICK THE DOG
        ldc     rom_data,@test_adr              ;read ROM code one by one
        add     check_sum,rom_data              ;add it to checksum register
        decw    test_adr                         ;increment ROM address
        jr      nz,add_sum                      ;address=0 ?
        cp      check_sum,#check_sum_value
        jr      z,system_ok                     ;check final checksum = 00 ?
system_error:
        and     ledport,#ledl                   ; turn on the LED to indicate fault
        jr      system_error

        .byte   256-check_sum_value
system_ok:

        WDT                                      ; kick the dog

        ld      STACKEND,#STACKTOP               ; start at the top of the stack
SETSTACKLOOP:
        ld      @STACKEND,#01H                   ; set the value for the stack vector
        dec     STACKEND                         ; next address
        cp      STACKEND,#STACKEND               ; test for the last address
        jr      nz,SETSTACKLOOP                  ; loop till done

CLEARDONE:


        ld      STATE,#06d                       ; set the state to stop
        ld      BSTATE,#06d                      ;
        ld      STATUS,#CHARGE                   ; set start to charge
        ld      SWITCH_DELAY,#CMD_DEL_EX         ; set the delay time to cmd
```

```
        ld      LIGHT_TIMER_HI,#SET_TIME_HI        ; set the light period
        ld      LIGHT_TIMER_LO,#SET_TIME_LO        ; for the 4.5 min timer
        ld      PRE_LIGHT,#SET_TIME_PRE    ;
        ld      PULSEWIDTH,#MIN_COUNT              ; set init
        ld      PWM_COUNT,#TOTAL_PWM_COUNT  ;
        ld      RPMONES,#244d                      ; set the hold off
        ld      RS232DOCOUNT,#11D          ; turn off the rs232 output
        srp     #LEARNEE_GRP                       ;
        ld      learndb,#0FFH              ; set the learn debouncer
        ld      zzwin,learndb              ; turn off the learning
        ld      CMD_DEB,learndb                    ; in case of shorted switches
        ld      BCMD_DEB,learndb                   ; in case of shorted switches
        ld      VAC_DEB,learndb                    ;
        ld      LIGHT_DEB,learndb          ;
        ld      ERASET,learndb                     ; set the erase timer
        ld      learnt,learndb             ; set the learn timer
        ld      RTO,learndb                        ; set the radio time out
        ld      AUXLEARNSW,learndb         ; turn off the aux learn switch
        ld      RRTO,learndb               ; set the radio timer

;***********************************************************************
; STACK INITILIZATION
;***********************************************************************
        clr     254
        ld      255,#238D                          ; set the start of the stack
        .IF     TwoThirtyThree
        .ELSE
        clr     P1
        .ENDIF


;***********************************************************************
; TIMER INITILIZATION
;***********************************************************************

        ld      PRE0,#00000101B                    ; set the prescaler to / 1 for 8Mhz
        ld      PRE1,#01000010B                    ; one shot mode /16
        ld      T0,#000H                           ; set the counter to count FF through 0
        ld      T1,MIN_COUNT                       ; set init count
        ld      TMR,#00000011B                     ; turn on the timer

;***********************************************************************
; PORT INITILIZATION
;***********************************************************************
        ld      P0,#P01S_INIT              ; RESET all ports
        ld      P2,#P2S_INIT               ;
        ld      P3,#P3S_INIT               ;
        ld      P01M,#P01M_INIT                    ; set mode p00-p03 out p04-p07in
        ld      P3M,#P3M_INIT                      ; set port3 p30-p33 input analog mode
                                                   ; p34-p37 outputs
        ld      P2M,#(P2M_INIT+0)          ; set port 2 mode

        .IF     TwoThirtyThree
        .ELSE
```

```
        clr     P1
        .ENDIF

;***********************************************************************
; READ THE MEMORY 2X AND GET THE VACFLAG
;***********************************************************************

        ld      SKIPRADIO,#NOEECOMM             ;
        ld      ADDRESS,#VACATIONADDR           ; set non vol address to the VAC flag
        call    READMEMORY                              ; read the value 2X 1X INIT 2ND
read
        call    READMEMORY                              ; read the value
        ld      VACFLAG,MTEMPH                  ; save into volital

;***********************************************************************
; SET ROLLING/FIXED MODE FROM NON-VOLATILE MEMORY
;***********************************************************************

        call    SetRadioMode            ; Set the radio mode
        jr      SETINTERRUPTS                   ; Continue on

SetRadioMode:

        ld      SKIPRADIO, #NOEECOMM            ; Set skip radio flag
        ld      ADDRESS, #MODEADDR              ; Point to the radio mode flag
        call    READMEMORY                              ; Read the radio mode
        ld      RadioMode, MTEMPL               ; Set the proper radio mode
        clr     SKIPRADIO                       ; Re-enable the radio
        tm      RadioMode, #ROLL_MASK           ; Do we want rolling numbers
        jr      nz, StartRoll

        call    FixedNums
        ret

StartRoll:

        call    RollNums
        ret

;***********************************************************************
; INITERRUPT INITILIZATION
;***********************************************************************
SETINTERRUPTS:
        ld      IPR,#00011010B                  ; set the priority to timer
        ld      IMR,#ALL_ON_IMR                 ; turn on the interrupt

        .IF     TwoThirtyThree
        ld      IRQ,#01000000B                  ; set the edge clear int
        .ELSE
        ld      IRQ,#00000000b          ; Set the edge, clear ints
        .ENDIF

        ei                                      ; enable interrupt
```

```
;*************************************************************************
; RESET SYSTEM REG
;*************************************************************************

        .IF     TwoThirtyThree

    ld      RP,#WATCHDOG_GROUP
    ld      smr,#00100010B              ; reset the xtal / number
    ld      pcon,#01111110B             ; reset the pcon no comparator output
                                        ; no low emi mode

        .ENDIF

    ld      PRE0,#00000101B             ; set the prescaler to / 2 for 8Mhz
;   ld      RS232DO,#0BBH               ; set the rs232 data
;   jp      VACSWOPEN                   ; start the transmission

;*************************************************************************
; MAIN LOOP
;*************************************************************************
MAINLOOP:


LightOpen:
    cp      LIGHT_TIMER_HI,#0FFH        ; if light timer not done test beam break
    jr      nz,TestBeamBreak
    tm      p0,#LIGHT_ON                ; if the light is off test beam break
    jr      nz,LightSkip

TestBeamBreak:
    tm      AOBSF,#10000000b            ; Test for broken beam
    jr      z,LightSkip                 ; if no pulses Staying blocked
                                        ; else we are intermittent
    cp      STATE,#2                    ; test for the up limit
    jr      nz,LightSkip                ; if not goto output the code
    ld      LIGHT_TIMER_HI,#SET_TIME_HI ; set the light period
    ld      LIGHT_TIMER_LO,#SET_TIME_LO ;
    ld      PRE_LIGHT,#SET_TIME_PRE     ;
    or      p0,#LIGHT_ON                ; turn on the light
LightSkip:

    cp      HOUR_TIMER_HI, #01CH        ; If an hour has passed,
    jr      ult, NoDecrement            ; then decrement the
    cp      HOUR_TIMER_LO, #020H        ; temporary password timer
    jr      ult, NoDecrement            ;

    clr     HOUR_TIMER_HI               ; Reset hour timer
    clr     HOUR_TIMER_LO               ;
    ld      SKIPRADIO, #NOEECOMM        ; Disable radio EE read
    ld      ADDRESS, #DURAT             ; Load the temporary password
    call    READMEMORY                  ; duration from non-volatile
```

```
        cp      MTEMPH, #HOURS                  ; If not in timer mode,
        jr      nz, NoDecrement2                ; then don't update
        cp      MTEMPL, #00                     ; If timer is not done,
        jr      z, NoDecrement2         ; decrement it

        dec     MTEMPL                          ; Update the number of hours
        call    WRITEMEMORY                     ;

NoDecrement:

        tm      AOBSF, #01000000b               ; If the poll radio mode flag is
        jr      z, NoDecrement2         ; set, poll the radio mode

        call    SetRadioMode            ; Set the radio mode
        and     AOBSF, #10111111b               ; Clear the flag

NoDecrement2:

        clr     SKIPRADIO                       ; Re-enable radio reads
        and     AOBSF,#00100011b                ; Clear the single break flag
        clr     DOG2                            ; clear the second watchdog
        ld      P01M,#P01M_INIT                 ; set mode p00-p03 out p04-p07in
        ld      P3M,#P3M_INIT                   ; set port3 p30-p33 input analog mode
                                                ; p34-p37 outputs
        ld      P2M,#(P2M_INIT+0)       ; set port 2 mode
        cp      VACCHANGE,#0AAH                 ; test for the vacation change flag
        jr      nz,NOVACCHG             ; if no change the skip
        cp      VACFLAG,#0FFH                   ; test for in vacation
        jr      z,MCLEARVAC                     ; if in vac clear
        ld      VACFLAG,#0FFH                   ; set vacation
        jr      SETVACCHANGE                    ; set the change
MCLEARVAC:
        clr     VACFLAG                         ; clear vacation mode
SETVACCHANGE:
        clr     VACCHANGE                       ; one shot
        ld      SKIPRADIO,#NOEECOMM             ; set skip flag
        ld      ADDRESS,#VACATIONADDR           ; set the non vol address to the VAC flag
        ld      MTEMPH,VACFLAG                  ; store the vacation flag
        ld      MTEMPL,VACFLAG                  ;
        call    WRITEMEMORY                     ; write the value
        clr     SKIPRADIO                       ; clear skip flag
NOVACCHG:
        cp      STACKFLAG,#0FFH                 ; test for the change flag
        jr      nz,NOCHANGEST                   ; if no change skip updating

        srp     #LEARNEE_GRP                    ; set the register pointer
        clr     STACKFLAG                       ; clear the flag
        ld      SKIPRADIO,#NOEECOMM             ; set skip flag
        ld      address,#CYCCOUNT               ; set the non vol address to the cycle c
        call    READMEMORY                              ; read the value
        inc     mtempl                  ; increase the counter lower byte
        jr      nz,COUNTER1DONE                 ;
        inc     mtemph                  ; increase the counter high byte
        jr      nz,COUNTER2DONE                 ;
```

```
        call    WRITEMEMORY                 ; store the value
        inc     address                     ; get the next bytes
        call    READMEMORY                  ; read the data
        inc     mtempl                      ; increase the counter low byte
        jr      nz,COUNTER2DONE             ;
        inc     mtemph                      ; increase the vounter high byte
COUNTER2DONE:
        call    WRITEMEMORY                 ; save the value
        ld      address,#CYCCOUNT           ;
        call    READMEMORY                  ; read the data

        and     mtemph,#00001111B           ; find the force address
        or      mtemph,#30H                 ;
        ld      ADDRESS,MTEMPH              ; set the address
        ld      mtempl,DNFORCE              ; read the forces
        ld      mtemph,UPFORCE              ;
        call    WRITEMEMORY                 ; write the value
        jr      CDONE                       ; done set the back trace
COUNTER1DONE:
        call    WRITEMEMORY                 ; got the new address
CDONE:
        clr     SKIPRADIO                   ; clear skip flag

NOCHANGEST:
        call    LEARN                       ; do the learn switch
        di
        cp      BRPM_COUNT,RPM_COUNT
        jr      z,TESTRPM
RESET:
        jp      START
TESTRPM:
        cp      BRPM_TIME_OUT,RPM_TIME_OUT
        jr      nz,RESET
        cp      BFORCE_IGNORE,FORCE_IGNORE
        jr      nz,RESET
        ei
        di
        cp      BAUTO_DELAY_HI,AUTO_DELAY_HI
        jr      nz,RESET
        cp      BAUTO_DELAY_LO,AUTO_DELAY_LO
        jr      nz,RESET
        cp      BCMD_DEB,CMD_DEB
        jr      nz,RESET
        cp      BSTATE,STATE
        jr      nz,RESET
        ei
TESTRS232:
        cp      RSSTART,#0FFH               ; test for starting a transmission
        jr      z,skiprs232                 ; if starting a trans skip
        cp      RSCOMMAND,#0FFH             ; test for the off mode
        jr      z,skiprs232
        cp      RS232DOCOUNT,#11d           ; test for output done
        jr      nz,skiprs232                ; if not the skip
        cp      RSCOMMAND,#30H              ; test for switch data
```

```
        jr      nz.TEST31
        clr     RS232DO                 ; clear the data

        tm      p2.#UP_LIMIT            ; test for up limit
        jr      nz.UPLIMOPEN
        or      RS232DO,#00000001B      ; set the marking bit
UPLIMOPEN:
        tm      p2,#DN_LIMIT            ; test for the down limit
        jr      nz.DNLIMOPEN            ;
        or      RS232DO.#00000010B      ; set the marking bit
DNLIMOPEN:
        cp      CMD_DEB.#0FFH           ; test for the command set
        jr      nz.CMDSWOPEN
        or      RS232DO.#00000100B      ; set the marking bit
CMDSWOPEN:
        cp      LIGHT_DEB.#0FFH         ; test for the worklight set
        jr      nz.WLSWOPEN
        or      RS232DO.#00001000B      ; set the marking bit
WLSWOPEN:
        cp      VAC_DEB.#0FFH           ; test fir the vacation set
        jr      nz.VACSWOPEN            ;
        or      RS232DO.#00010000B      ; set the marking bit
VACSWOPEN:
        dec     RSSTART                 ; set the start flag
        ld      RSCOMMAND.#0FFH         ; turn off command
                                        ; return

skiprs232:
        jp      SKIPRS232

TEST31:
        cp      RSCOMMAND.#31H          ; test for status data
        jr      nz.TEST32
        ld      RS232DO.STATE           ; read the state
        cp      CodeFlag.#REGLEARN      ; test for learn mode
        jr      nz.NOTINLEARN
        or      RS232DO.#00010000B      ;
NOTINLEARN:
        cp      VACFLAG.#00H            ; test the vacation flag
        jr      z.NOTINVACATION
        or      RS232DO.#00100000B      ;

NOTINVACATION:
        tm      p0.#WORKLIGHT           ; test for the light on
        jr      z.LIGHTISOFF
        or      RS232DO.#01000000B      ; mark the bit
LIGHTISOFF:
        tm      AOBSF.#00000001B        ; test for aobs error
        jr      z.AOBSFINE
        or      RS232DO.#10000000B      ;
AOBSFINE:
        jr      VACSWOPEN


TEST32:
```

```
        cp      RSCOMMAND,#32H              ; test for rpm data
        jr      nz,TEST33
        ld      RS232DO,RPM_PERIOD_LO       ;
        cp      RSCCOUNT,#01H               ; test for on transmitted last cycle
        jr      z,LASTRPM
        ld      RS232DO,RPM_PERIOD_HI       ;
STARTOUT:
        dec     RSSTART                     ; set the start flag
        inc     RSCCOUNT                    ; increase the count
        jr      skiprs232                   ; return
LASTRPM:        clr     RSCCOUNT            ; reset the counter
        jp      VACSWOPEN                   ; return

TEST33:
        cp      RSCOMMAND,#33H              ; test for force data
        jr      nz,TEST34
        ld      RS232DO,UPFORCE             ;
        cp      RSCCOUNT,#00                ; test for the first byte
        jr      z,STARTOUT                  ; output
        ld      RS232DO,DNFORCE
        jr      LASTRPM                     ; output

TEST34:
        cp      RSCOMMAND,#34H              ; test for radio page
        jr      nz,TEST35
        ld      RS232PAGE,#00H              ;
        jr      RS232PAGEOUT
TEST35:
        cp      RSCOMMAND,#35H              ; test for force page data
        jr      nz,TEST36
        ld      RS232PAGE,#10H              ;
        jr      RS232PAGEOUT
TEST36:
        cp      RSCOMMAND,#36H              ; test for history page 1data
        jr      nz,TEST37
        ld      RS232PAGE,#20H              ;
        jr      RS232PAGEOUT
TEST37:
        cp      RSCOMMAND,#37H              ; test for history page 2 data
        jr      nz,TEST38
        ld      RS232PAGE,#30H              ;

RS232PAGEOUT:
        ld      SKIPRADIO,#NOEECOMM         ; set the skip radio flag
        ld      ADDRESS,RSCCOUNT            ; find the address
        rcf                                 ;
        rrc     ADDRESS                     ;
        or      ADDRESS,RS232PAGE           ;
        call    READMEMORY                  ; read the data
        ld      RS232DO,MTEMPH
        tm      RSCCOUNT,#01H               ; test which byte
        jr      z,RPBYTE
        ld      RS232DO,MTEMPL
RPBYTE:
```

```
        clr     SKIPRADIO               ; turn off the skip radio
        cp      RSCCOUNT,#1FH           ; test for the end
        jp      z,LASTRPM
        jp      STARTOUT

TEST38:
        cp      RSCOMMAND,#38H          ; test memory
        jr      nz,TEST39
        ld      RS232DO,#0FFH           ; flag set to error to start
        ld      SKIPRADIO,#NOEECOMM     ; set the skip radio flag
        ld      MTEMPH,#0FFH            ; set the data to write
        ld      MTEMPL,#0FFH            ;
        ld      ADDRESS,#00             ; start at address 00
WRITELOOP1:
        WDT
        call    WRITEMEMORY             ;
        inc     ADDRESS                 ; do the next address
        cp      ADDRESS,#40H            ; test for the last address
        jr      nz,WRITELOOP1
        ld      ADDRESS,#00             ; start at address 0
READLOOP1:
        WDT
        call    READMEMORY              ; read the data
        inc     MTEMPH                  ; test the high
        jr      nz,MEMORYERROR          ; if error mark
        inc     MTEMPL                  ; test the low
        jr      nz,MEMORYERROR          ; if error mark
        inc     ADDRESS                 ; set the next address
        cp      ADDRESS,#40H            ; test for the last address
        jr      nz,READLOOP1

        ld      MTEMPH,#000H            ; set the data to write
        ld      MTEMPL,#000H            ;
        ld      ADDRESS,#00             ; start at address 00
WRITELOOP2:
        WDT
        call    WRITEMEMORY             ;
        inc     ADDRESS                 ; do the next address
        cp      ADDRESS,#40H            ; test for the last address
        jr      nz,WRITELOOP2
        ld      ADDRESS,#00             ; start at address 0
READLOOP2:
        WDT
        call    READMEMORY              ; read the data
        cp      MTEMPH,#00              ; test the high
        jr      nz,MEMORYERROR          ; if error mark
        cp      MTEMPL,#00              ; test the low
        jr      nz,MEMORYERROR          ; if error mark
        inc     ADDRESS                 ; set the next address
        cp      ADDRESS,#40H            ; test for the last address
        jr      nz,READLOOP2
        call    CLEARCODES
        clr     SKIPRADIO               ; clear the skip radio flag
        clr     RS232DO                 ; flag all ok
```

```
MEMORYERROR:
        jp      VACSWOPEN
TEST39:
        cp      RSCOMMAND,#39H                  ; test memory
        jr      nz,TEST56
        ld      RSCOMMAND,#0FFH                 ; turn off command
        call    SETLEARN
TEST56:
        cp      RSCOMMAND,#56H                  ; Version number ("V" command)
        jr      nz,SKIPRS232
        ld      RS232DO, #VERSIONNUM            ; Output version number
        dec     RSSTART                         ; Start RS232 output
        ld      RSCOMMAND,#0FFH                 ; Clear RS232 command

SKIPRS232:
        cp      R_DEAD_TIME,#25d                ; test for too long dead
        jp      nz,MAINLOOP                     ; if not loop
        clr     RadioC                          ; clear the radio counter
        clr     RFlag                           ; clear the radio flag
        jp      MAINLOOP                        ; loop forever


;***********************************************************************
; Radio interrupt from a edge of the radio signal
;***********************************************************************

RADIO_INT:
        push    RP                              ; save the radio pair
        srp     #RadioGroup                     ; set the register pointer

        ld      rtemph,T0EXT                    ; read the upper byte
        ld      rtempl,T0                       ; read the lower byte
        tm      IRQ,#00010000B                  ; test for pending int
        jr      z,RTIMEOK                       ; if not then ok time
        tm      rtempl,#10000000B               ; test for timer reload
        jr      z,RTIMEOK                       ; if not reloaded then ok
        dec     rtemph                          ; if reloaded then dec high for sync
RTIMEOK:
        clr     R_DEAD_TIME                     ; clear the dead time

        .IF     TwoThirtyThree
        and     IMR,#11111110B                  ; turn off the radio interrupt
        .ELSE
        and     IMR,#11111100B                  ; Turn off the radio interrupt
        .ENDIF

        ld      RTimeDH,RTimePH                 ; find the difference
        ld      RTimeDL,RTimePL                 ;
        sub     RTimeDL,rtempl                  ;
        sbc     RTimeDH,rtemph                  ; in past time and the past time in temp
        tm      RTimeDH,#10000000B              ; test for a negitive number
        jr      z,RTIMEDONE                     ; if the number is not negitive then done
        ld      RTimeDH,rtemph                  ; find the difference
        ld      RTimeDL,rtempl                  ;
```

```
        sub     RTimeDL,RTimePL                 ;
        sbc     RTimeDH,RTimePH                 ; in past time and the past time in temp
RTIMEDONE:
        .IF     TwoThirtyThree
        tm      P3,#00000100B           ; test the port for the edge
        .ELSE
        tcm     P3,#00000100B           ; test the port for the edge
        .ENDIF
        jr      nz,ACTIVETIME                   ; if it was the active time then branch
INACTIVETIME:
        cp      RINFILTER,#0FFH                 ; test for active last time
        jr      z,GOINACTIVE            ; if so continue
        jr      RADIO_EXIT                      ; if not the return
GOINACTIVE:

        .IF     TwoThirtyThree
        or      IRQ,#01000000B                  ; set the bit setting direction to pos edge
        .ENDIF

        clr     RINFILTER                       ; set flag to inactive
        ld      rtimeih,RTimeDH                 ; transfer difference to inactive
        ld      rtimeil,RTimeDL                 ;
        ld      RTimePH,rtemph                  ; transfer temp into the past
        ld      RTimePL,rtempl          ;
        jr      RADIO_EXIT                      ; return
ACTIVETIME:
        cp      RINFILTER,#00H                  ; test for active last time
        jr      z,GOACTIVE                      ; if so continue
        jr      RADIO_EXIT                      ; if not the return
GOACTIVE:

        .IF     TwoThirtyThree
        and     IRQ,#00111111B                  ; clear bit setting direction to neg edge
        .ENDIF

        ld      RINFILTER,#0FFH                 ;
        ld      rtimeah,RTimeDH                 ; transfer difference to active
        ld      rtimeal,RTimeDL                 ;
        ld      RTimePH,rtemph                  ; transfer temp into the past
        ld      RTimePL,rtempl          ;
GotBothEdges:
                ei                              ; enable the interrupts
                cp      radioc,#0               ; test for the blank timing
                jr      nz,INSIG                ; if not then in the middle of signal
                inc     radioc          ; set the counter to the next number
                cp      RadioTimeOut,#20d       ; test for the min 20 ms blank time
                jr      ult,ClearJump   ; if not then clear the radio
                cp      rtimeah,#00h    ; test first the min sync
                jr      z,ClearJump             ; if high oyte 0 then clear the radio
SyncOk:
                cp      rtimeah,#012h   ; test for the max time 4.6mS
                jr      uge,ClearJump   ; if not clear

SET1:
```

```
        clr     PREVFIX                 ;Clear the previous "fixed" bit
        cp      rtimeah, SyncThresh     ; test for 1 or three time units
        jr      uge,SYNC3FLAG           ; set the sync 3 flag
SYNC1FLAG:
        tm      RFlag. #01000000b       ;Was a sync 1 word the last received?
        jr      z. SETADCODE            ;  if not, then this is an A (or D) code

SETBCCODE:

        ld      radio3h, radio1h        ;Store the last sync 1 word
        ld      radio3l, radio1l
        or      RFlag. #00000110b       ;Set the B/C Code flags
        and     RFlag. #11110111b       ;Clear the A/D Code Flag
        jr      BCCODE

SETADCODE:

        or      RFlag. #00001000b

BCCODE:

        or      RFlag.#01000000b        ; set the sync 1 memory flag
        clr     radio1h                 ; clear the memory
        clr     radio1l                 ;
        clr     COUNT1H                 ; clear the memory
        clr     COUNT1L                 ;
        jr      DONESET1                ; do the 2X
SYNC3FLAG:
        and     RFlag.#10111111b        ; set the sync 3 memory flag
        clr     radio3h                 ; clear the memory
        clr     radio3l                 ;
        clr     COUNT3H                 ; clear the memory
        clr     COUNT3L                 ;
        clr     ID_B                    ; Clear the ID bits
DONESET1:
RADIO_EXIT:
        and     SKIPRADIO. # 'LB ^C(NOINT)  ;Re-enable radio ints
        pop     rp
        iret                            ; done return

ClearJump:
;       or      P2,#10000000b           ; turn of the flag bit for clear radio
        jp      ClearRadio              ; clear the radio signal

INSIG:
        cp      rtimeih,#014H           ; test for the max width 5.16
        jr      uge.ClearJump           ; if too wide clear
        cp      rtimeih,#00h            ; test for the min width
        jr      z.ClearJump             ; if high byte is zero. pulse too narrow
ISigOk:
        cp      rtimeah,#014H           ; test for the max width
        jr      uge.ClearJump           ; if too wide clear
        cp      rtimeah,#00h            ; if greater then 0 then signal ok
        jr      z.ClearJump             ; if too narrow clear
```

```
ASigOk:
        sub     rtimeal,rtimeil         ; find the difference
        sbc     rtimeah,rtimeih
        tm      rtimeah,#10000000b      ; find out if neg
        jr      nz,NEGDIFF2                     ; use 1 for ABC or D
        jr      POSDIFF2
POSDIFF2:
        cp      rtimeah, BitThresh      ; test for 3/2
        jr      ult,BITIS2                      ; mark as a 2
        jr      BITIS3

NEGDIFF2:
        com     rtimeah                 ; invert
        cp      rtimeah, BitThresh      ; test for 2/1
        jr      ult,BIT2COMP            ; mark as a 2
        jr      BITIS1
BITIS3:
        ld      RADIOBIT,#2h            ; set the value
        jr      GOTRADBIT
BIT2COMP:
        com     rtimeah                 ; invert
BITIS2:
        ld      RADIOBIT,#1h            ; set the value
        jr      GOTRADBIT
BITIS1:
        com     rtimeah                 ; invert
        ld      RADIOBIT,#0h            ; set the value
GOTRADBIT:
        clr     rtimeah                 ; clear the time
        clr     rtimeal
        clr     rtimeih
        clr     rtimeil
;       ei                                      ; enable interrupts --REDUNDANT
ADDRADBIT:
        SetRpToRadio2Group              ;Macro for assembler error
;       srp     #Radio2Group            ;  -- this is what it does
        tm      rflag,#01000000b                ; test for radio 1 / 3
        jr      nz,RC1INC                       ;

RC3INC:
        tm      radiomode, #ROLL_MASK           ;If in fixed mode,
        jr      z, Radio3F                      ;  no number counter exists
        tm      RadioC,#00000001b               ; test for even odd number
        jr      nz,COUNT3INC            ; if EVEN number counter

Radio3INC:                                      ; else radio

        call    GETTRUEFIX                      ;Get the true fixed bit
        cp      RadioC,#14D                     ; test the radio counter for the specials
        jr      uge,SPECIAL_BITS                ; save the special bits seperate
Radio3R:
Radio3F:
        srp     #RadioGroup
        ld      pointerh,#Radio3H               ; get the pointer
```

```
        ld      pointerl,#Radio3L           ;
        jr      AddAll
SPECIAL_BITS:
        cp      RadioC,#20d                 ; test for the switch id
        jr      z,SWITCHID                  ; if so then branch

        ld      RTempH,id_b                 ; save the special bit
        add     id_b,RTempH                 ; *3
        add     id_b,RTempH                 ; *3
        add     id_b,radiobit       ; add in the new value
        jr      Radio3R
SWITCHID:
        cp      id_b,#18d                   ; If this was a touch code,
        jr      uge, Radio3R        ; then we already have the ID bit
        ld      sw_b,radiobit       ; save the switch ID
        jr      Radio3R

RC1INC:
        tm      radiomode, #ROLL_MASK       ;If in fixed mode, no number counter
        jr      z, Radio1F
        tm      RadioC,#00000001b           ; test for even odd number
        jr      nz,COUNT1INC        ; if odd number counter

Radio1INC:                                  ; else radio
        call    GETTRUEFIX                  ;Get the real fixed code
        cp      RadioC, #02d        ;If this is bit 1 of the 1ms code,
        jr      nz, Radio1F                 ;then see if we need the switch ID bit
        tm      rflag, #00010000b           ;If this is the first word received,
        jr      z, SwitchBit1       ;then save the switch bit regardless
        cp      id_b, #18d                  ;If we have a touch code,
        jr      ult, Radio1F        ;then this is our switch ID bit
SwitchBit1:
        ld      sw_b, radiobit      ;Save touch code ID bit
Radio1F:
        srp     #RadioGroup
        ld      pointerh,#Radio1H           ; get the pointer
        ld      pointerl,#Radio1L           ;
        jr      AddAll

GETTRUEFIX:

        ld      prevtmp, radiobit   ;Store "fixed" bit in temp area
        sub     radiobit, rollbit   ;Subtract the roll from the fixed
        jr      nc, NOADJ1                  ;Check for base 3 correction
        add     radiobit, #03       ;Correct back up to base 3
NOADJ1:
        sub     radiobit, prevfix   ;Subtract the previous fixed bit
        jr      nc, NOADJ2                  ;Check for base 3 correction
        add     radiobit, #03       ;Correct back up to base 3
NOADJ2:
        ld      prevfix, prevtmp    ;Create new previous fix bit
        ret

COUNT3INC:
```

```
        ld      rollbit, radiobit           ;Store the rolling bit
        srp     #RadioGroup
        ld      pointerh,#COUNT3H                   ; get the pointer
        ld      pointerl,#COUNT3L                   ;
        jr      AddAll
COUNT1INC:
        ld      rollbit, radiobit           ;Store the rolling bit
        srp     #RadioGroup
        ld      pointerh,#COUNT1H                   ; get the pointers
        ld      pointerl,#COUNT1L                   ;
        jr      AddAll

AddAll:
        ld      rtemph,@pointerh                    ; get the value
        ld      rtempl,@pointerl            ;
        ld      addvalueh,@pointerh         ; get the value
        ld      addvaluel,@pointerl         ;

        add     addvaluel,rtempl            ; add x2
        adc     addvalueh,rtemph                    ;
        add     addvaluel,rtempl            ; add x3
        adc     addvalueh,rtemph                    ;
        add     addvaluel,RADIOBIT          ; add in new number
        adc     addvalueh,#00h              ;
        ld      @pointerh,addvalueh         ; save the value
        ld      @pointerl,addvaluel         ;
ALLADDED:
        inc     radioc                      ; increase the counter
FULLWORD?:
        cp      radioc, MaxBits             ; test for full (10/20 bit) word
        jp      nz,RRETURN                          ; if not then return

        ;;;;;Disable interrupts until word is handled
        or      SKIPRADIO, #NOINT                   ; Set the flag to disable radio interrupts
        .IF     TwoThirtyThree
        and     IMR,#11111110B                      ; turn off the radio interrupt
        .ELSE
        and     IMR,#11111100B                      ; Turn off the radio interrupt
        .ENDIF

        clr     RadioTimeOut                ; Reset the blank time
        cp      RADIOBIT, #00H                      ; If the last bit is zero,
        jp      z, ISCCODE                          ;   then the code is the obsolete C code
        and     RFlag,#11111101B                    ; Last digit isn't zero, clear B code flag
ISCCODE:
        tm      RFlag,#00010000B                    ; test flag for previous word received
        jr      nz,KNOWCODE                         ; if the second word received
FIRST20:
        or      RFlag,#00010000B                    ; set the flag
        clr     radioc                      ; clear the radio counter
        jp      RRETURN                             ; return
GOT20CODE:
;       cp      ID_B,#07d                           ; test for the don't use ones
;       jp      uge,ClearRadio              ; clear don't use
```

```
;               cp      ID_B,#04d               ; test for the don't add in ones
;               jr      uge,KNOWCODE            ; if so then don't add in
;               add     COUNT3L,SW_B            ; add in switch id
;               adc     COUNT3H,#00h    ;
KNOWCODE:

        tm      RadioMode, #ROLL_MASK   ;If not in rolling mode,
        jr      z, CounterCorrected     ;   forget the number counter

;*****************************************************************************************
*************************
; Translate the counter back to normal
;       start
;       CounterA        CounterB        CounterC        CounterD
;       00              00              Count3H         Count3L
;       MirrorA         MirrorB                 MirrorC         MirrorD
;       00              00              Count1H         Count1L
;*****************************************************************************************
*************************

        srp     #CounterGroup                   ; set the group
        clr     countera                        ; clear the counter Msb value
        clr     counterb                        ;
        ld      counterc.COUNT3H                        ; Set the value to count3
        ld      counterd.COUNT3L                        ;
        clr     mirrora                         ; Set the mirror (temp reg for now)
        clr     mirrorb                         ; to count1
        ld      mirrorc.COUNT1H                         ;
        ld      mirrord.COUNT1L                         ;
        call    AddMirrorToCounter              ; find count1 * 3^10 + count3
        ld      loopcount.#3                    ;
        call    RotateMirrorAdd                 ;
        ld      loopcount.#2                    ;
        call    RotateMirrorAdd                 ;
        ld      loopcount.#2                    ;
        call    RotateMirrorAdd                 ;
        ld      loopcount.#2                    ;
        call    RotateMirrorAdd                 ;
        ld      loopcount.#1                    ;
        call    RotateMirrorAdd                 ;
        ld      loopcount.#3                    ;
        call    RotateMirrorAdd                 ;
        ld      loopcount.#1                    ;
        call    RotateMirrorAdd                 ;
        ld      loopcount.#1                            ;
        call    RotateMirrorAdd                 ;

MirrorTheCounter:
        call    MirrorCounter                           ; mirror the counter
CounterCorrected:

                srp     #RadioGroup                     ;
                clr     RRTO                            ; clear the got a radio flag
                tm      SKIPRADIO.#NOEECOMM             ; test for the skip flag
```

```
                jp      nz,CLEARRADIO           ; if skip flag is active then donot look at EE
mem
                tm      RFlag, #00000010B       ; If the flag for the obsolete C code is set,
                jp      nz, CLEARRADIO          ;   then reject the C Code

                cp      ID_B, #18d              ;If the ID bits total more than 18,
                jr      ult, NoTCode            ;
                or      RFlag, #00000100b       ;then indicate a touch code
NoTCode:
                ld      ADDRESS,#VACATIONADDR   ; set the non vol address to the VAC flag
                call    READMEMORY              ; read the value
                ld      VACFLAG,MTEMPH          ; save into volital
                cp      CodeFlag,#REGLEARN      ; test for in learn mode
                jp      nz,TESTCODE             ; if out of learn mode then test for matching
STORECODE:
                tm      RadioMode, #ROLL_MASK   ;If we are in fixed mode,
                jr      z, FixedOnly            ;then don't compare the counters

CompareCounters:

                cp      PCounterA, MirrorA      ; Test for counter match to previous
                jp      nz, STORENOTMATCH       ; if no match, try again
                cp      PCounterA, MirrorA      ; Test for counter match to previous
                jp      nz, STORENOTMATCH       ; if no match, try again
                cp      PCounterA, MirrorA      ; Test for counter match to previous
                jp      nz, STORENOTMATCH       ; if no match, try again
                cp      PCounterA, MirrorA      ; Test for counter match to previous
                jp      nz, STORENOTMATCH       ; if no match, try again

FixedOnly:
                cp      PRADIO1H,radio1h        ; test for the match
                jp      nz,STORENOTMATCH        ; if not a match then loop again
                cp      PRADIO1L,radio1l        ; test for the match
                jp      nz,STORENOTMATCH        ; if not a match then loop again
                cp      PRADIO3H,radio3h        ; test for the match
                jp      nz,STORENOTMATCH        ; if not a match then loop again
                cp      PRADIO3L,radio3l        ; test for the match
                jp      nz,STORENOTMATCH        ; if not a match then loop again

                cp      AUXLEARNSW, #116d       ; If learn was not from wall control,
                jr      ugt, CMDONLY            ; then learn a command only

CmdNotOpen:

                tm      CMD_DEB, #10000000b     ; If the command switch is held,
                jr      nz, CmdOrOCS            ;   then we are learning command or o/c/s

CheckLight:

                tm      LIGHT_DEB, #10000000b   ; If the light switch and the lock
                jp      z, CLEARRADIO2          ;   switch are being held,
                tm      VAC_DEB, #10000000b     ;   then learn a light trans.
                jp      z, CLEARRADIO2          ;
LearningLight:
```

```
        tm      RadioMode, #ROLL_MASK      ; Only learn a light trans. if we are in
        jr      z, CMDONLY                 ;   the rolling mode.
        ld      CodeFlag, #LRNLIGHT   ;
        ld      BitMask, #01010101b   ;
        jr      CMDONLY

CmdOrOCS:

        tm      LIGHT_DEB, #10000000b      ; If the light switch isn't being held,
        jr      nz, CMDONLY                ; then see if we are learning o/c/s

CheckOCS:
        tm      VAC_DEB, #10000000b  ; If the vacation switch isn't held,
        jp      z, CLEARRADIO2             ; then it must be a normal command
        tm      RadioMode, #ROLL_MASK      ; Only learn an o/c/s if we are in
        jr      z, CMDONLY                 ;   the rolling mode.
        ld      CodeFlag, #LRNOCS          ; Set flag to learn o/c/s
        ld      BitMask, #10101010b   ;

CMDONLY:
        call    TESTCODES                  ; test the code to see if in memory now
        cp      ADDRESS, #0FFH             ; If the code isn't in memory
        jr      z, STOREMATCH              ;
WriteOverOCS:
        dec     ADDRESS                    ;
        jp      READYTOWRITE               ;

STOREMATCH:
        cp      RadioMode, #ROLL_TEST      ; If we are not testing a new mode,
        jr      ugt, SameRadioMode    ; then don't switch

        ld      ADDRESS, #MODEADDR         ; Fetch the old radio mode,
        call    READMEMORY                       ; change only the low order
        tm      RadioMode, #ROLL_MASK      ; byte, and write in its new value.
        jr      nz, SetAsRoll         ;
SetAsFixed:
        ld      RadioMode, #FIXED_MODE     ;
        call    FixedNums                  ; Set the fixed thresholds permanently
        jr      WriteMode                  ;
SetAsRoll:
        ld      RadioMode, #ROLL_MODE      ;
        call    RollNums                   ; Set the rolling thresholds permanently
WriteMode:
        ld      MTEMPL, RadioMode          ;
        call    WRITEMEMORY                      ;

SameRadioMode:

        tm      RFlag,#00000100B           ; test for the b code
        jr      nz,BCODE                   ; if a B code jump
ACODE:
        ld      ADDRESS,#2BH          ; set the address to read the last written
        call    READMEMORY                       ; read the memory
        inc     MTEMPH                     ; add 2 to the last written
```

```
        inc     MTEMPH                    ;
        tm      RadioMode, #ROLL_MASK     ; If the radio is in fixed mode,
        jr      z, FixedMem               ; then handle the fixed mode memory

RollMem:
        inc     MTEMPH                    ; Add another 2 to the last written
        inc     MTEMPH
        and     MTEMPH,#11111100B         ; Set to a multiple of four
        cp      MTEMPH,#1FH               ; test for the last address
        jr      ult, GOTAADDRESS          ; If not the last address jump
        jr      AddressZero               ; Address is now zero

FixedMem:
        and     MTEMPH,#11111110B         ; set the address on a even number
        cp      MTEMPH,#17H               ; test for the last address
        jr      ult,GOTAADDRESS           ; if not the last address jump

AddressZero:
        ld      MTEMPH,#00D               ; set the address to 0
GOTAADDRESS:
        ld      ADDRESS,#2BH        ; set the address to write the last written
        ld      RTemp,MTEMPH              ; save the address
        LD      MTEMPL,MTEMPH             ; both bytes same
        call    WRITEMEMORY                     ; write it
        ld      ADDRESS,rtemp       ; set the address
        jr      READYTOWRITE              ;
BCODE:
        tm      RadioMode, #ROLL_MASK     ; If in fixed mode,
        jr      z, BFixed                 ; handle normal touch code
BRoll:
        cp      SW_B, #ENTER        ; If the user is trying to learn a key
        jp      nz, CLEARRADIO            ; other than enter, THROW IT OUT
        ld      ADDRESS, #20H             ; Set the address for the rolling touch code
        jr      READYTOWRITE
BFixed:
        cp      radio3h,#90H        ; test for the 00 code
        jr      nz,BCODEOK                ;
        cp      radio3l,#29H        ; test for the 00 code
        jr      nz,BCODEOK                ;
        jp      CLEARRADIO                ; SKIP MAGIC NUMBER
BCODEOK:
        ld      ADDRESS,#18H        ; set the address for the B code
READYTOWRITE:
        call    WRITECODE                 ; write the code in radio1 and radio3
NOFIXSTORE:
        tm      RadioMode, #ROLL_MASK     ; If we are in fixed mode,
        jr      z, NOWRITESTORE           ; then we are done
        inc     ADDRESS                   ; Point to the counter address
        ld      Radio1H, MirrorA          ; Store the counter into the radio
        ld      Radio1L, MirrorB          ; for the writecode routine
        ld      Radio3H, MirrorC          ;
        ld      Radio3L, MirrorD          ;
        call    WRITECODE
```

```
          call    SetMask
          com     BitMask
          ld      ADDRESS, #RTYPEADDR       ; Fetch the radio types
          call    READMEMORY                ;

          tm      RFlag, #10000000b         ; Find the proper byte of the type
          jr      nz, UpByte                ;
LowByte:
          and     MTEMPL, BitMask           ; Wipe out the proper bits
          jr      MaskDone                  ;
UpByte:
          and     MTEMPH, BitMask           ;
MaskDone:
          com     BitMask                   ;

          cp      CodeFlag, #LRNLIGHT       ; If we are learning a light
          jr      z, LearnLight             ; set the appropriate bits
          cp      CodeFlag, #LRNOCS         ; If we are learning an o/c/s,
          jr      z, LearnOCS               ; set the appropriate bits

Normal:
          clr     BitMask                   ; Set the proper bits as command
          jr      BMReady

LearnLight:
          and     BitMask, #01010101b       ; Set the proper bits as worklight
          jr      BMReady                   ; Bit mask is ready
LearnOCS:
          cp      SW_B, #02H                ; If 'open' switch is not being held,
          jp      nz, CLEARRADIO2           ; then don't accept the transmitter
          and     BitMask,#10101010b        ; Set the proper bits as open/close/stop

BMReady:
          tm      RFlag, #10000000b         ; Find the proper byte of the type
          jr      nz, UpByt2                ;
LowByt2:
          or      MTEMPL, BitMask           ; Write the transmitter type in
          jr      MaskDon2                  ;
UpByt2:
          or      MTEMPH, BitMask           ; Write the transmitter type in
MaskDon2:
          call    WRITEMEMORY               ; Store the transmitter types

NOWRITESTORE:
          xor     p0,#WORKLIGHT             ; toggle light
          or      ledport,#ledh             ; turn off the LED for program mode
          ld      LIGHT1S,#244D             ; turn on the 1 second blink
          ld      LEARNT,#0FFH              ; set learnmode timer
          clr     RTO                       ; disallow cmd from learn
          clr     CodeFlag                  ; Clear any learning flags
          jp      CLEARRADIO                ; return
STORENOTMATCH:
          ld      PRADIO1H,radio1h          ; transfer radio into past
          ld      PRADIO1L,radio1l          ;
```

```
        ld      PRADIO3H,radio3h        ;
        ld      PRADIO3L,radio3l        ;
        tm      RadioMode, #ROLL_MASK   ; If we are in fixed mode,
        jp      z, CLEARRADIO           ; get the next code
        ld      PCounterA, MirrorA      ; transfer counter into past
        ld      PCounterB, MirrorB      ;
        ld      PCounterC, MirrorC      ;
        ld      PCounterD, MirrorD      ;
        jp      CLEARRADIO
TESTCODE:
        cp      ID_B, #18d              ; If this was a touch code,
        jp      uge, TCReceived         ; handle appropriately

        tm      RFlag, #00000100b       ; If we have received a B code,
        jr      z, AorDCode             ; then check for the learn mode

        cp      ZZWIN, #64d             ; Test 0000 learn window
        jr      ugt, AorDCode           ; if out of window no learn

        cp      Radio1H, #90H           ;
        jr      nz, AorDCode            ;
        cp      Radio1L, #29H           ;
        jr      nz, AorDCode            ;

ZZLearn:

        push    RP
        srp     #LEARNEE_GRP
        call    SETLEARN
        pop     RP
        jp      CLEARRADIO

AorDCode:

        cp      FAULTFLAG,#0FFH         ; test for a active fault
        jr      z,FS1                   ; if a avtive fault skip led set and reset
        and     ledport,#led!           ; turn on the LED for flashing from signal
FS1:
        call    TESTCODES               ; test the codes
        cp      FAULTFLAG,#0FFH         ; test for a active fault
        jr      z,FS2                   ; if a avtive fault skip led set and reset
        or      ledport,#ledh           ; turn off the LED for flashing from signal
FS2:
        cp      ADDRESS,#0FFH           ; test for the not matching state
        jr      nz,GOTMATCH             ; if matching the send a command if needed
        jp      CLEARRADIO              ; clear the radio
GOTMATCH:
        tm      RadioMode, #ROLL_MASK   ; If we are in fixed mode,
        jr      z, MatchGood2           ; then the match is already valid

        tm      BitMask, #10101010b     ; If this was NOT an open/close/stop trans,
        jr      z, RollCheckB           ; then we must check the rolling value

        cp      SW_B, #02d              ; If the o/c/s had a key other than '2'
```

```
        jr      nz, MatchGoodOCS          ; then don't check / update the roll

RollCheckB:
        call    TestCounter               ; Rolling mode -- compare the counter
values
        cp      CMP, #EQUAL               ; If the code is equal,
        jp      z, NOTNEWMATCH            ; then just keep it
        cp      CMP, #FWDWIN              ; If we are not in forward window,
        jp      nz, CheckPast         ; then forget the code
MatchGood:
        ld      Radio1H, MirrorA          ; Store the counter into memory
        ld      Radio1L, MirrorB          ; to keep the roll current
        ld      Radio3H, MirrorC          ;
        ld      Radio3L, MirrorD          ;
        dec     ADDRESS                   ; Line up the address for writing
        call    WRITECODE                 ;

MatchGoodOCS:
        or      RFlag,#00000001B          ; set the flag for recieving without error
        cp      RTO,#RDROPTIME            ; test for the timer time out
        jp      ult,NOTNEWMATCH           ; if the timer is active then donot reissue
cmd
        cp      ADDRESS, #23H             ; If the code was the rolling touch code,
        jr      z, MatchGood2         ; then we already know the transmitter type

        call    SetMask               ; Set the mask bits properly
        ld      ADDRESS, #RTYPEADDR       ; Fetch the transmitter config. bits
        call    READMEMORY                ;
        tm      RFlag, #10000000b         ; If we are in the upper word,
        jr      nz, UpperD                ; check the upper transmitters
LowerD:
        and     BitMask, MTEMPL           ; Isolate our transmitter
        jr      TransType                 ; Check out transmitter type
UpperD:
        and     BitMask, MTEMPH           ; Isolate our transmitter
TransType:
        tm      BitMask, #01010101b   ; Test for light transmitter
        jr      nz, LightTrans        ; Execute light transmitter
        tm      BitMask, #10101010b   ; Test for Open/Close/Stop Transmitter
        jr      nz, OCSTrans          ; Execute open/close/stop transmitter
                                          ; Otherwise, standard command transmitter

MatchGood2:
        or      RFlag,#00000001B          ; set the flag for recieving without error
        cp      RTO,#RDROPTIME            ; test for the timer time out
        jp      ult,NOTNEWMATCH           ; if the timer is active then donot reissue
cmd
TESTVAC:
        cp      VACFLAG,#00B          ; test for the vacation mode
        jp      z,TSTSDISABLE             ; if not in vacation mode test the system
disable
```

```
        tm      RadioMode, #ROLL_MASK        ;
        jr      z, FixedB

        cp      ADDRESS,#23H         ; If this was a touch code,
        jp      nz, NOTNEWMATCH              ; then do a command
        jp      TSTSDISABLE                  ;

FixedB:

        cp      ADDRESS,#19H         ; test for the B code
        jp      nz,NOTNEWMATCH               ; if not a B not a match

TSTSDISABLE:
        cp      SDISABLE,#32D                ; test for 4 second
        jp      ult,NOTNEWMATCH              ; if 6 s not up not a new code
        clr     RTO                          ; clear the radio timeout
        cp      ONEP2,#00                    ; test for the 1.2 second time out
        jp      nz,NOTNEWMATCH               ; if the timer is active then skip the
command
RADIOCOMMAND:
        clr     RTO                          ; clear the radio timeout
        tm      RFlag,#00000100b             ; test for a B code
        jr      z,BDONTSET                   ; if not a b code donot set flag
zzwinclr:
        clr     ZZWIN                        ; flag got matching B code

        ld      CodeFlag,#BRECEIVED  ; flag for aobs bypass
BDONTSET:

        clr     LAST_CMD                     ; mark the last command as radio
        ld      RADIO_CMD,#0AAH              ; set the radio command
        jp      CLEARRADIO                   ; return

LightTrans:
        clr     RTO                          ; Clear the radio timeout
        cp      ONEP2,#00                    ; Test for the 1.2 sec. time out
        jp      nz, NOTNEWMATCH              ; If it isn't timed out, leave
        ld      SW_DATA, #LIGHT_SW; Set a light command
        jp      CLEARRADIO                   ; return

OCSTrans:
        cp      SDISABLE, #32d               ; Test for 4 second system disable
        jp      ult, NOTNEWMATCH             ; if not done not a new code
        cp      VACFLAG, #00H                ; If we are in vacation mode,
        jp      nz, NOTNEWMATCH              ; don't obey the transmitter
        clr     RTO                          ; Clear the radio timeout
        cp      ONEP2, #00                   ; test for the 1.2 second timeout
        jp      nz, NOTNEWMATCH              ; If the timer is active the skip command

        cp      SW_B, #02d                   ; If the open button is pressed,
        jr      nz, CloseOrStop      ; then process it

OpenButton:
```

```
        cp      STATE, #STOP            ; If we are stopped or
        jr      z, OpenUp               ; at the down limit, then
        cp      STATE, #DN_POSITION     ; begin to move up
        jr      z, OpenUp               ;
        cp      STATE, #DN_DIRECTION    ; If we are moving down,
        jr      nz, OCSExit             ; then autoreverse
        call    SET_AREV_STATE          ;
        jr      OCSExit                 ;

OpenUp:
        call    SET_UP_DIR_STATE        ;
OCSExit:
        jp      CLEARRADIO              ;

CloseOrStop:

        cp      SW_B, #01d              ; If the stop button is pressed,
        jr      nz, CloseButton         ; then process it

StopButton:

        cp      STATE, #UP_DIRECTION    ; If we are moving or in
        jr      z, StopIt               ; the autoreverse state,
        cp      STATE, #DN_DIRECTION    ; then stop the door
        jr      z, StopIt               ;
        cp      STATE, #AUTO_REV        ;
        jr      z, StopIt
        jr      OCSExit

StopIt:

        call    SET_STOP_STATE
        jr      OCSExit

CloseButton:

        cp      STATE, #UP_POSITION     ; If we are at the up limit
        jr      z, CloseIt              ; or stopped in travel,
        cp      STATE, #STOP            ; then send the door down
        jr      z, CloseIt              ;
        jr      OCSExit

CloseIt:

        call    SET_DN_DIR_STATE
        jr      OCSExit

SetMask:

        and     RFlag, #01111111b       ; Reset the page 1 bit
        tm      ADDRESS, #11110000b     ; If our address is on page 1,
        jr      z, InLowerByte          ; then set the proper flag
        or      RFlag, #10000000b       ;
InLowerByte:
```

```
        tm      ADDRESS, #00001000b ; Binary search to set the
        jr      z, ZeroOrFour       ; proper bits in the bit mask
EightOrTwelve:
        ld      BitMask, #11110000b
        jr      LSNybble
ZeroOrFour:
        ld      BitMask, #00001111b     ;
LSNybble:
        tm      ADDRESS, #00000100b
        jr      z, ZeroOrEight
FourOrTwelve:
        and     BitMask, #11001100b     ;
        ret
ZeroOrEight:
        and     BitMask, #00110011b     ;
        ret

TESTCODES:
        ld      ADDRESS, #RTYPEADDR         ; Get the radio types
        call    READMEMORY                  ;
        ld      RadioTypes, MTEMPL   ;
        ld      RTypes2, MTEMPH              ;
        tm      RadioMode, #ROLL_MASK        ;
        jr      nz, RollCheck        ;
        clr     RadioTypes                   ;
        clr     RTypes2
RollCheck:
        clr     ADDRESS                     ; start address is 0
NEXTCODE:
        call    SetMask             ; Get the approprite bit mask
        and     BitMask, RadioTypes ; Isolate the current transmitter types
HAVEMASK:
        call    READMEMORY                  ; read the word at this address
        cp      MTEMPH,radio1h              ; test for the match
        jr      nz,NOMATCH                  ; if not matching then do next address
        cp      MTEMPL,radio1l              ; test for the match
        jr      nz,NOMATCH                  ; if not matching then do next address
        inc     ADDRESS                     ; set the second half of the code
        call    READMEMORY                  ; read the word at this address
        tm      BitMask, #10101010b ; If this is an Open/Close/Stop trans.,
        jr      nz, CheckOCS1       ; then do the different check
        cp      CodeFlag, #LRNOCS           ; If we are in open/close/stop learn mode,
        jr      z, CheckOCS1        ; then do the different check
        cp      MTEMPH,radio3h              ; test for the match
        jr      nz,NOMATCH2                 ; if not matching then do the next address
        cp      MTEMPL,radio3l              ; test for the match
        jr      nz,NOMATCH2                 ; if not matching then do the next address

        ret                                 ; return with the address of the match

CheckOCS1:

        sub     MTEMPL, radio3l             ; Subtract the radio from the memory
        sbc     MTEMPH, radio3h             ;
```

```
        cp      CodeFlag, #LRNOCS         ; If we are trying to learn open/close/stop,
        jr      nz, Positive              ; then we must complement to be positive
        com     MTEMPL                    ;
        com     MTEMPH                    ;
        add     MTEMPL, #01d              ; Switch from ones complement to 2's
        adc     MTEMPH, #00d              ; complement
Positive:
        cp      MTEMPH, #00               ; We must be within 2 to match properly
        jr      nz, NOMATCH2              ;
        cp      MTEMPL, #02               ;
        jr      ugt, NOMATCH2             ;

        ret                               ; Return with the address of the match

NOMATCH:
        inc     ADDRESS                   ; set the address to the next code
NOMATCH2:
        inc     ADDRESS                   ; set the address to the next code
        tm      RadioMode, #ROLL_MASK     ; If we are in fixed mode,
        jr      z, AtNextAdd              ; then we are at the next address
        inc     ADDRESS                   ; Roll mode -- advance past the counter
        inc     ADDRESS                   ;
        cp      ADDRESS,#10H              ; If we are on the second page
        jr      nz, AtNextAdd             ; then get the other tx. types
        ld      RadioTypes, RTypes2       ;
AtNextAdd:
        cp      ADDRESS,#22H              ; test for the last address
        jr      ult,NEXTCODE              ; if not the last address then try again

GOTNOMATCH:
        ld      ADDRESS,#0FFH             ; set the no match flag
        ret                               ; and return


NOTNEWMATCH:
        clr     RTO                       ; reset the radio time out
        and     RFlag,#00000001B          ; clear radio flags leaving recieving w/o
error
        clr     radioc                    ; clear the radio bit counter
;       ld      LEARNT,#0FFH              ; set the learn timer "turn off" and backup
        jp      RADIO_EXIT                ; return

CheckPast:

        cp      CMP, #BACKWIN             ; If we were in the backwards window,
        jr      z, CLEARRADIO             ; then don't attempt to resync
        cp      LastMatch, ADDRESS        ; If current & previous fixed don't match,
        jr      nz, UpdatePast            ; then don't resync
        sub     PCounterD, MirrorD        ; Compare the two counters
        sbc     PCounterC, MirrorC        ;
        sbc     PCounterB, MirrorB        ;
        sbc     PCounterA, MirrorA        ;
        cp      PCounterA, #0FFH          ; If the counters differ by more than four
        jr      nz, UpdatePast            ; (i.e. if the past counter minus the current
```

```
        cp      PCounterB, #0FFH        ; counter is < -4), then don't resync
        jr      nz, UpdatePast
        cp      PCounterC, #0FFH
        jr      nz, UpdatePast
        cp      PCounterD, #0FCH
        jr      ult, UpdatePast

ReSync:

        jp      MatchGood               ; Set radio as command received

UpdatePast:

        ld      LastMatch, ADDRESS      ; Store the last fixed code received
        ld      PCounterA, MirrorA      ; Store the last counter received
        ld      PCounterB, MirrorB      ;
        ld      PCounterC, MirrorC      ;
        ld      PCounterD, MirrorD      ;
CLEARRADIO2:
        ld      LEARNT, #0FFH           ; Turn off the learn mode timer
        clr     CodeFlag

CLEARRADIO:

        .IF     TwoThirtyThree
        and     IRQ,#00111111B          ; clear the bit setting direction to neg edge
        .ENDIF

        ld      RINFILTER,#0FFH         ; set flag to active
CLEARRADIOA:
        tm      RFlag,#00000001B        ; test for receiving without error
        jr      z,SKIPRTO               ; if flag not set then donot clear timer
        clr     RTO                     ; clear radio timer
SKIPRTO:
        clr     radioc                  ; clear the radio counter
        clr     RFlag                   ; clear the radio flag
;       clr     ID_B                    ; Clear the ID bits
        jp      RADIO_EXIT              ; return

TCReceived:

        cp      FAULTFLAG, #0FFH        ; If no fault
        jr      z, TestTruncate         ; turn on the led
        and     ledport, #ledl          ;
        jr      TestTruncate            ; Truncate off most significant digit

TruncTC:

        sub     Radio1L, #0E3h          ; Subtract out 3^9 to truncate
        sbc     Radio1H, #04Ch          ;

TestTruncate:

        cp      Radio1H, #04Ch          ; If we are greater than 3^9,
```

```
        jr      ugt, TruncTC            ; truncate down
        jr      ult, GotTC              ;
        cp      Radio1L, #0E3h          ;
        jr      uge, TruncTC            ;

GotTC:

        ld      ADDRESS, #TOUCHID       ; Check to make sure the ID code is good
        call    READMEMORY              ;
        cp      FAULTFLAG, #0FFH        ; If no fault,
        jr      z, CheckID              ; turn off the LED
        or      ledport, #ledh          ;
CheckID:
        cp      MTEMPH, Radio3H         ;
        jr      nz, CLEARRADIO          ;
        cp      MTEMPL, Radio3L         ;
        jr      nz, CLEARRADIO          ;

        call    TestCounter             ; Test the rolling code counter
        cp      CMP, #EQUAL             ; If the counter is equal,
        jp      z, NOTNEWMATCH          ; then call it the same code
        cp      CMP, #FWDWIN            ;
        jr      nz, CLEARRADIO          ;

        ; Counter good -- update it

        ld      COUNT1H, Radio1H        ; Back up radio code
        ld      COUNT1L, Radio1L        ;

        ld      Radio1H, MirrorA        ;Write the counter
        ld      Radio1L, MirrorB        ;
        ld      Radio3H, MirrorC        ;
        ld      Radio3L, MirrorD        ;
        dec     ADDRESS
        call    WRITECODE               ;

        ld      Radio1H, COUNT1H        ; Restore the radio code
        ld      Radio1L, COUNT1L        ;

        cp      CodeFlag, #NORMAL       ; Find and jump to current mode
        jr      z, NormTC               ;
        cp      CodeFlag, #LRNTEMP      ;
        jp      z, LearnTMP             ;
        cp      CodeFlag, #LRNDURTN     ;
        jp      z, LearnDur             ;
        jp      CLEARRADIO              ;

NormTC:

        ld      ADDRESS, #TOUCHPERM     ; Compare the four-digit touch
        call    READMEMORY                      ; code to our permanent password
        cp      Radio1H, MTEMPH         ;
        jr      nz, CheckTCTemp         ;
        cp      Radio1L, MTEMPL         ;
```

```
        jr      nz, CheckTCTemp              ;

        cp      SW_B, #ENTER          ; If the ENTER key was pressed,
        jp      z, RADIOCOMMAND              ; issue a B code radio command
        cp      SW_B, #POUND          ; If the user pressed the pound key,
        jr      z, TCLearn                   ; enter the learn mode
        ; Star key pressed -- start 30 s timer

        clr     LEARNT                       ;
        ld      FLASH_COUNTER, #06h          ; Blink the worklight .hree
        ld      FLASH_DELAY_HI,#FLASH_HI; times quickly
        ld      FLASH_DELAY_LO,#FLASH_LO;
        ld      FLASH_FLAG, #0FFH            ;
        ld      CodeFlag, #LRNTEMP    ; Enter learn temporary mode
        jp      CLEARRADIO                   ;

TCLearn:

        ld      FLASH_COUNTER, #04h          ; Blink the worklight two
        ld      FLASH_DELAY_HI,#FLASH_HI; times quickly
        ld      FLASH_DELAY_LO,#FLASH_LO;
        ld      FLASH_FLAG, #0FFH            ;

        push    RP                           ; Enter learn mode
        srp     #LEARNEE_GRP
        call    SETLEARN
        pop     RP

        jp      CLEARRADIO

CheckTCTemp:

        ld      ADDRESS, #TOUCHTEMP          ; Compare the four-digit touch
        call    READMEMORY                          ; code to our temporary password
        cp      Radio1H, MTEMPH              ;
        jp      nz, CLEARRADIO               ;
        cp      Radio1L, MTEMPL              ;
        jp      nz, CLEARRADIO               ;

        cp      STATE, #DN_POSITION ; If we are not at the down limit,
        jp      nz, RADIOCOMMAND             ; issue a command regardless

        ld      ADDRESS, #DURAT              ; If the duration is at zero,
        call    READMEMORY                          ; then don't issue a command
        cp      MTEMPL, #00                  ;
        jp      z, CLEARRADIO                ;

        cp      MTEMPH, #ACTIVATIONS         ; If we are in number of activations
        jp      nz, RADIOCOMMAND             ; mode, then decrement the
        dec     MTEMPL                       ; number of activations left
        call    WRITEMEMORY                         ;
        jp      RADIOCOMMAND

LearnTMP:
```

```
        cp      SW_B, #ENTER            ; If the user pressed a key other
        jp      nz, CLEARRADIO          ; then enter, reject the code

        ld      ADDRESS, #TOUCHPERM     ; If the code entered matches the
        call    READMEMORY              ; permanent touch code,
        cp      Radio1H, MTEMPH         ; then reject the code as a
        jp      nz, TempGood            ; temporary code
        cp      Radio1L, MTEMPL         ;
        jp      z, CLEARRADIO           ;

TempGood:

        ld      ADDRESS, #TOUCHTEMP     ; Write the code into temp.
        ld      MTEMPH, Radio1H         ; code memory
        ld      MTEMPL, Radio1L         ;
        call    WRITEMEMORY             ;

        ld      FLASH_COUNTER, #08h     ; Blink the worklight four
        ld      FLASH_DELAY_HI,#FLASH_HI; times quickly
        ld      FLASH_DELAY_LO,#FLASH_LO;
        ld      FLASH_FLAG, #0FFH       ;

; Start 30 s timer

        clr     LEARNT
        ld      CodeFlag, #LRNDURTN     ; Enter learn duration mode
        jp      CLEARRADIO              ;

LearnDur:

        cp      Radio1H, #00            ; If the duration was > 255,
        jp      nz, CLEARRADIO          ; reject the duration entered

        cp      SW_B, #POUND            ; If the user pressed the pound
        jr      z, NumDuration          ; key, number of activations mode
        cp      SW_B, #STAR             ; If the star key was pressed,
        jr      z, HoursDur             ; enter the timer mode
        jp      CLEARRADIO              ; Enter pressed -- reject code

NumDuration:

        ld      MTEMPH, #ACTIVATIONS    ; Flag number of activations mode
        jr      DurationIn              ;

HoursDur:

        ld      MTEMPH, #HOURS          ; Flag number of hours mode

DurationIn:

        ld      MTEMPL, Radio1L         ; Load in duration
        ld      ADDRESS, #DURAT         ; Write duration and mode
        call    WRITEMEMORY             ; into nonvolatile memory
```

```
; Give worklight one long blink
xor     P0, #WORKLIGHT          ; Give the light one blink
ld      LIGHT1S, #244d          ; lasting one second
clr     CodeFlag                ; Clear the learn flag
jp      CLEARRADIO

;-----------------------------------------------------------------------
;       Test Rolling Code Counter Subroutine
;       Note: CounterA-D will be used as temp registers
;
;-----------------------------------------------------------------------

TestCounter:
        push    RP
        srp     #CounterGroup
        inc     ADDRESS                 ; Point to the rolling code counter
        call    READMEMORY              ; Fetch lower word of counter
        ld      countera, MTEMPH
        ld      counterb, MTEMPL
        inc     ADDRESS                 ; Point to rest of the counter
        call    READMEMORY              ; Fetch upper word of counter
        ld      counterc, MTEMPH
        ld      counterd, MTEMPL

        ;-----------------------------------------------------------
        ;       Subtract old counter (countera-d) from current
        ;       counter (mirrora-d) and store in countera-d
        ;-----------------------------------------------------------

        com     countera                ; Obtain twos complement of counter
        com     counterb
        com     counterc
        com     counterd
        add     counterd, #01H
        adc     counterc, #00H
        adc     counterb, #00H
        adc     countera, #00H

        add     counterd, mirrord       ; Subtract
        adc     counterc, mirrorc
        adc     counterb, mirrorb
        adc     countera, mirrora

        ;-----------------------------------------------------------
        ;       If the msb of counterd is negative, check to see
        ;       if we are inside the negative window
        ;-----------------------------------------------------------

        tm      counterd, #10000000B
        jr      z, CheckFwdWin

CheckBackWin:

        cp      countera, #0FFH         ; Check to see if we are
```

```
            jr      nz, OutOfWindow            ; less than -0400H
            cp      counterb, #0FFH        ; (i.e. are we greater than
            jr      nz, OutOfWindow            ; 0xFFFFFC00H)
            cp      counterc, #0FCH        ;
            jr      ult, OutOfWindow           ;

InBackWin:

            ld      CMP, #BACKWIN              ; Return in back window
            jr      CompDone

CheckFwdWin:

            cp      countera, #00H         ; Check to see if we are less
            jr      nz, OutOfWindow            ; than 0C00 (3072 = 1024
            cp      counterb, #00H         ; activations)
            jr      nz. OutOfWindow            ;
            cp      counterc, #0CH         ;
            jr      uge. OutOfWindow

            cp      counterc, #00H
            jr      nz, InFwdWin
            cp      counterd, #00H
            jr      nz, InFwdWin

CountersEqual:

            ld      CMP, #EQUAL                ;Return equal counters
            jr      CompDone

InFwdWin:

            ld      CMP. #FWDWIN               ;Return in forward window
            jr      CompDone

OutOfWindow:

            ld      CMP. #OUTOFWIN             ;Return out of any window

CompDone:

            pop     RP
            ret

;***********************************************************************
; Clear interrupt
;***********************************************************************
ClearRadio:

        cp      RadioMode. #ROLL_TEST          ;If in fixed or rolling mode.
        jr      ugt. MODEDONE                  ;  then we cannot switch

        tm      T125MS, #00000001b         ;If our 'coin toss' was a zero.
        jr      z, SETROLL                     ;  set as the rolling mode
```

```
SETFIXED:

        ld      RadioMode, #FIXED_TEST
        call    FixedNums
        jp      MODEDONE

SETROLL:

        ld      RadioMode, #ROLL_TEST
        call    RollNums

MODEDONE:

        clr     RadioTimeOut                    ; clear radio timer
        clr     RadioC                          ; clear the radio counter
        clr     RFlag                                   ; clear the radio flags

RRETURN:
        pop     RP                              ; reset the RP
        iret                                    ; return

FixedNums:

        ld      BitThresh. #FIXTHR
        ld      SyncThresh. #FIXSYNC
        ld      MaxBits. #FIXBITS
        ret

RollNums:

        ld      BitThresh. #DTHR
        ld      SyncThresh. #DSYNC
        ld      MaxBits. #DBITS
        ret

;***********************************************************************************
;************************
; rotate mirror LoopCount * 2 then add
;***********************************************************************************
;************************
RotateMirrorAdd:

        rcf                                     ; clear the carry
        rlc     mirrord                         ;
        rlc     mirrorc                         ;
        rlc     mirrorb                         ;
        rlc     mirrora                         ;
        djnz    loopcount.RotateMirrorAdd       ; loop till done
;***********************************************************************************
;************************
; Add mirror to counter
;***********************************************************************************
;************************
```

```
AddMirrorToCounter:
        add     counterd,mirrord                ;
        adc     counterc,mirrorc                ;
        adc     counterb,mirrorb                ;
        adc     countera,mirrora                ;
        ret
;*************************************************************************************
*************************
; Add mirror to counter
;*************************************************************************************
*************************
MirrorCounter:
        ld      loopcount,#32d                          ; set the number of bits
MirrorLoop:
        rrc     countera                        ; move the bits
        rrc     counterb                        ;
        rrc     counterc                        ;
        rrc     counterd                        ;
        rlc     mirrord                                 ;
        rlc     mirrorc                                 ;
        rlc     mirrorb                                 ;
        rlc     mirrora                                 ;
        djnz    loopcount,MirrorLoop                    ; loop for all the bits
        ret


;***********************************************************************
; LEARN DEBOUNCES THE LEARN SWITCH 80mS
; TIMES OUT THE LEARN MODE 30 SECONDS
; DEBOUNCES THE LEARN SWITCH FOR ERASE 6 SECONDS
;***********************************************************************
LEARN:
        srp     #LEARNEE_GRP                            ; set the register pointer
        cp      STATE,#DN_POSITION              ; test for motor stoped
        jr      z,TESTLEARN                             ;
        cp      STATE,#UP_POSITION              ; test for motor stoped
        jr      z,TESTLEARN                             ;
        cp      STATE,#STOP                             ; test for motor stoped
        jr      z,TESTLEARN                             ;
;       ld      learnt,#0FFH                            ; set the learn timer
        cp      learnt,#240D                            ; test for the learn 30 second timeout
        jr      nz,ERASETEST                    ; if not then test erase
        jr      learnoff                                ; if 30 seconds then turn off the learn mode
TESTLEARN:
        cp      learndb,#236D                           ; test for the debounced release
        jr      nz,LEARNNOTRELEASED                     ; if debouncer not released then jump

        clr     learndb                                 ; clear the debouncer

        ret                                             ; return

LEARNNOTRELEASED:
        cp      CodeFlag,#LRNTEMP                       ;test for learn mode
        jr      uge,INLEARN                             ; if in learn jump
```

```
        cp      learndb,#20D                    ; test for debounce period
        jr      nz,ERASETEST                    ; if not then test the erase period
SETLEARN:
        clr     learnt                          ; clear the learn timer
        ld      CodeFlag, #REGLEARN             ; Set the learn flag
        ld      learndb,#0FFH                   ; set the debouncer
        and     ledport,#ledl                   ; turn on the led
        clr     VACFLAG                         ; clear vacation mode
        ld      address,#VACATIONADDR                   ; set the non vol address for
vacation
        clr     mtemph                          ; clear the data for cleared vacation
        clr     mtempl                          ;
        ld      skipradio,#NOEECOMM             ; set the flag
        call    WRITEMEMORY                     ; write the memory
        clr     skipradio                       ; clear the flag
ERASETEST:
        cp      learndb,#0FFH                   ; test for learn button active
        jr      nz,ERASERELEASE                 ; if button released set the erase timer
        cp      eraset,#0FFH                    ; test for timer active
        jr      nz,ERASETIMING                  ; if the timer active jump
        clr     eraset                          ; clear the erase timer
ERASETIMING:
        cp      eraset,#48D                     ; test for the erase period
        jr      z,ERASETIME                     ; if timed out the erase
        ret                                     ; else we return
ERASETIME:
        or      ledport,#ledh                   ; turn off the led
        ld      skipradio,#NOEECOMM             ; set the flag to skip the radio read
        call    CLEARCODES                      ; clear all codes in memory
        clr     skipradio                       ; reset the flag to skip radio

        ld      learnt,#0FFH                    ; set the learn timer
        clr     CodeFlag
        ret                                     ; return


ERASERELEASE:
        ld      eraset,#0FFH                    ; turn off the erase timer
        ret                                     ; return

INLEARN:
        cp      learndb,#20D                    ; test for the debounce period
        jr      nz,TESTLEARNTIMER               ; if not then test the learn timer for time out
        ld      learndb,#0FFH                   ; set the learn db
TESTLEARNTIMER:
        cp      learnt,#240D                    ; test for the learn 30 second timeout
        jr      nz,ERASETEST                    ; if not then test erase
learnoff:
        or      ledport,#ledh                   ; turn off the led
        ld      learnt,#0FFH                    ; set the learn timer
        ld      learndb,#0FFH                   ; set the learn debounce
        clr     CodeFlag                        ; Clear ANY code types
        jr      ERASETEST                       ; test the erase timer
```

```
;************************************************************************
; WRITE WORD TO MEMORY
; ADDRESS IS SET IN REG ADDRESS
; DATA IS IN REG MTEMPH AND MTEMPL
; RETURN ADDRESS IS UNCHANGED
;************************************************************************
WRITEMEMORY:
        push    RP                          ; SAVE THE RP
        srp     #LEARNEE_GRP                ; set the register pointer

        call    STARTB                      ; output the start bit
        ld      serial.#00110000B           ; set byte to enable write
        call    SERIALOUT                   ; output the byte
        and     csport.#csl                 ; reset the chip select
        call    STARTB                      ; output the start bit
        ld      serial.#01000000B           ; set the byte for write
        or      serial.address              ; or in the address
        call    SERIALOUT                   ; output the byte
        ld      serial.mtemph               ; set the first byte to write
        call    SERIALOUT                   ; output the byte
        ld      serial.mtempl               ; set the second byte to write
        call    SERIALOUT                   ; output the byte
        call    ENDWRITE                    ; wait for the ready status
        call    STARTB                      ; output the start bit
        ld      serial.#00000000B           ; set byte to disable write
        call    SERIALOUT                   ; output the byte
        and     csport.#csl                 ; reset the chip select
        pop     RP                          ; reset the RP
        ret

;************************************************************************
; READ WORD FROM MEMORY
; ADDRESS IS SET IN REG ADDRESS
; DATA IS RETURNED IN REG MTEMPH AND MTEMPL
; ADDRESS IS UNCHANGED
;************************************************************************
READMEMORY:
        push    RP                          ;
        srp     #LEARNEE_GRP                ; set the register pointer

        call    STARTB                      ; output the start bit
        ld      serial.#10000000B           ; preamble for read
        or      serial.address              ; or in the address
        call    SERIALOUT                   ; output the byte
        call    SERIALIN                    ; read the first byte
        ld      mtemph.serial               ; save the value in mtemph
        call    SERIALIN                    ; read teh second byte
        ld      mtempl.serial               ; save the value in mtempl
        and     csport.#csl                 ; reset the chip select
        pop     RP                          ;
        ret
```

```
;**********************************************************************
; WRITE CODE TO 2 MEMORY ADDRESS
; CODE IS IN RADIO1H RADIO1L RADIO3H RADIO3L
;**********************************************************************
WRITECODE:
        push    RP                      ;
        srp     #LEARNEE_GRP            ; set the register pointer
        ld      mtemph,Radio1H; transfer the data from radio 1 to the temps
        ld      mtempl,Radio1L ;
        call    WRITEMEMORY                     ; write the temp bits
        inc     address         ; next address
        ld      mtemph,Radio3H; transfer the data from radio 3 to the temps
        ld      mtempl,Radio3L ;
        call    WRITEMEMORY                     ; write the temps
        pop     RP                      ;
        ret                             ; return

;**********************************************************************
; CLEAR ALL RADIO CODES IN THE MEMORY
;**********************************************************************

CLEARCODES:
        push    RP                              ;
        srp     #LEARNEE_GRP                    ; set the register pointer
        ld      MTEMPH,#0FFH                    ; set the codes to illegal codes
        ld      MTEMPL,#0FFH                    ;
        ld      address,#00H                    ; clear address 0
CLEARC:
        call    WRITEMEMORY                     ; "A0"
        inc     address                         ; set the next address
        cp      address,#(AddressCounter - 1)   ; test for the last address of radio
        jr      ult,CLEARC
        clr     mtemph                          ; clear data
        clr     mtempl
        call    WRITEMEMORY                             ; Clear radio types
        ld      address,#AddressAPointer        ; clear address F
        call    WRITEMEMORY                     ;

        ld      address,#MODEADDR               ;Set EEPROM memory as fixed test
        call    WRITEMEMORY                     ;

        ld      RadioMode, #FIXED_TEST          ;Revert to fixed mode testing
        ld      BitThresh, #FIXTHR
        ld      SyncThresh, #FIXSYNC
        ld      MaxBits, #FIXBITS

CodesCleared:

        pop     RP                              ;
        ret                                     ; return
;**********************************************************************
```

```
; START BIT FOR SERIAL NONVOL
; ALSO SETS DATA DIRECTION AND AND CS
;***********************************************************************
STARTB:
        and     csport,#csl                     ;
        and     clkport,#clockl                 ; start by clearing the bits
        and     dioport,#dol                    ;
        ld      P2M,#(P2M_INIT+0)               ; set port 2 mode forcing output mode data
        or      csport,#csh                     ; set the chip select
        or      dioport,#doh                    ; set the data out high
        or      clkport,#clockh                 ; set the clock
        and     clkport,#clockl                 ; reset the clock low
        and     dioport,#dol                    ; set the data low
        ret                                     ; return

;***********************************************************************
; END OF CODE WRITE
;***********************************************************************
ENDWRITE:
        and     csport,#csl                     ; reset the chip select
        nop                                     ; delay
        or      csport,#csh                     ; set the chip select
        ld      P2M,#(P2M_INIT+4)               ; set port 2 mode forcing input mode data
ENDWRITELOOP:
        ld      temph,dioport                   ; read the port
        and     temph,#doh                      ; mask
        jr      z,ENDWRITELOOP                  ; if the bit is low then loop until done
        and     csport,#csl                     ; reset the chip select
        ld      P2M,#(P2M_INIT+0)               ; set port 2 mode forcing output mode
        ret


;***********************************************************************
; SERIAL OUT
; OUTPUT THE BYTE IN SERIAL
;***********************************************************************
SERIALOUT:
        ld      P2M,#(P2M_INIT+0)               ; set port 2 mode forcing output mode data
        ld      templ,#8H                       ; set the count for eight bits
SERIALOUTLOOP:
        rlc     serial                          ; get the bit to output into the carry
        jr      nc,ZEROOUT                      ; output a zero if no carry
ONEOUT:
        or      dioport,#doh                    ; set the data out high
        or      clkport,#clockh                 ; set the clock high
        and     clkport,#clockl                 ; reset the clock low
        and     dioport,#dol                    ; reset the data out low
        djnz    templ,SERIALOUTLOOP
                                                ; loop till done
        ret                                     ; return
ZEROOUT:
        and     dioport,#dol                    ; reset the data out low
        or      clkport,#clockh                 ; set the clock high
        and     clkport,#clockl                 ; reset the clock low
```

```
        and     dioport,#dol                    ; reset the data out low
        djnz    templ,SERIALOUTLOOP
                                                ; loop till done
        ret                                     ; return

;************************************************************************
; SERIAL IN
; INPUTS A BYTE TO SERIAL
;************************************************************************
SERIALIN:
        ld      P2M,#(P2M_INIT+4)               ; set port 2 mode forcing input mode data
        ld      templ,#8H                       ; set the count for eight bits
SERIALINLOOP:
        or      clkport,#clockh                 ; set the clock high
        rcf                                     ; reset the carry flag
        ld      temph,dioport                   ; read the port
        and     temph,#doh                      ; mask out the bits
        jr      z,DONTSET
        scf                                     ; set the carry flag
DONTSET:
        rlc     serial                          ; get the bit into the byte
        and     clkport,#clockl                 ; reset the clock low
        djnz    templ,SERIALINLOOP
                                                ; loop till done
        ret                                     ; return

;************************************************************************
; TIMER UPDATE FROM INTERUPT EVERY 1mS
;************************************************************************
SkipPulse:
;       tm      SKIPRADIO, #NOINT               ;If the 'no radio interrupt'
;       jr      nz, NoPulse                     ;flag is set, just leave
;       or      IMR,#RadioImr                   ; turn on the radio
;NoPulse:
        iret



TIMERUD:

        tm      SKIPRADIO, #NOINT               ;If the 'no radio interrupt'
        jr      nz, NoEnable                    ;flag is set, just leave
        or      IMR,#RadioImr                   ; turn on the radio
NoEnable:
        dec     T0EXT                           ; decrement the T0 extension
        tm      T0EXT,#00000001b                ; skip everyother pulse
        jr      nz,SkipPulse
        inc     TASKSWITCH                      ; set to the next switch
        and     TASKSWITCH,#00000111B           ; 0-7
        tm      TASKSWITCH,#00000001B           ; test for odd
        jr      nz,TK1357                       ; if so then jump
        cp      TASKSWITCH,#2d                  ; test for 2
```

```
        jr      z,TASK2
        cp      TASKSWITCH,#4d              ; test for 4
        jr      z,TASK4
        cp      TASKSWITCH,#6d              ; test for 6
        jr      z,TASK6
TASK0:
        or      IMR,#RETURN_IMR             ; turn on the interrupt
        ei
        push    rp                          ; save the rp
        srp     #TIMER_GROUP                ; set the rp for the switches
        call    switches                    ; test the switches
        pop     rp
        iret


TASK2:
        or      IMR,#RETURN_IMR             ; turn on the interrupt
        ei
        push    rp                          ; save the rp
        srp     #TIMER_GROUP                ;
        call    STATEMACHINE                ; do the motor function
        pop     rp                          ; return the rp
        iret


TASK4:
        or      IMR,#RETURN_IMR             ; turn on the interrupt
        ei
        push    rp                          ; save the rp
        srp     #TIMER_GROUP                ; set the rp for the switches
        call    switches                    ; test the switches
        pop     rp
        iret


TK1357:
        cp      TASKSWITCH,#05D             ; test for task 5
        jp      nz,TASK1357EXIT             ;

TASK5:
        cp      PWM_STATUS,#0FFH
        jr      ne,enable_t1                ;
        dec     PWM_OFF                     ; discharge for at least 2x
        jr      nz,continue                 ;
        ld      PWM_STATUS,#00H
enable_t1:
        ld      PWM_OFF,#14H                ;
        or      p3,#PWM_HI                  ; take pwm pin high
        or      tmr,#TIMER_1_EN             ; enable t1
continue:
        jp      TASK1357EXIT        ; EXIT UPDATING TIMERS

TASK6:
```

```
        or      IMR,#RETURN_IMR           ; turn on the interrupt
        ei
        push    rp                        ; save the rp
        srp     #TIMER_GROUP              ;
        call    STATEMACHINE              ; do the motor function
        pop     rp                        ; return the rp
        iret


TASK1357EXIT
        push    RP
        or      IMR,#RETURN_IMR           ; turn on the interrupt
        ei
        call    RS232                     ; do the rs232 buss
        tm      TASKSWITCH,#00000001B     ; test for state a 1 in b0
        jr      z,ONEMS
        tm      TASKSWITCH,#00000010B     ; test for state a 1 in b1
        jr      z,ONEMS
        srp     #TIMER_GROUP              ; if a 3 or 7 then do the auxlight
        call    AUXLIGHT                  ;

ONEMS:
        srp     #LEARNEE_GRP              ; set the register pointer
        dec     AOBSTEST                  ; decrease the aobs test timer
        jr      nz,NOFAIL                 ; if the timer not at 0 then it didnot fail
        ld      AOBSTEST,#11d             ; if it failed reset the timer
        tm      AOBSF,#00100000b          ; If the aobs was blocked before,
        jr      nz, BlockedBeam       ;   don't turn on the light
        or      AOBSF,#10000000b          ; Set the break edge flag
BlockedBeam:
        or      AOBSF,#00100001b          ; Set the single break flag
NOFAIL:
        inc     RadioTimeOut
        inc     t4ms                      ; increment the 4mS timer
        inc     t125ms                    ; increment the 125 mS timer
        cp      t4ms,#4D                  ; test for the time out
        jp      nz,TEST125                ; if not true then jump
FOURMS:
        clr     t4ms                      ; reset the timer
        cp      RPMONES,#00H              ; test for the end of the one sec timer
        jr      z,TESTPERIOD          ; if one sec over then test the pulses
                                          ; over the period
        dec     RPMONES                   ; else decrease the timer
        di
        clr     RPM_COUNT                 ; start with a count of 0
        clr     BRPM_COUNT            ; start with a count of 0
        ei
        jr      RPMTDONE
TESTPERIOD:
        cp      RPMCLEAR,#00H             ; test the clear test timer for 0
        jr      nz,RPMTDONE           ; if not timed out then skip
        ld      RPMCLEAR,#122d            ; set the clear test time for next cycle .5
        cp      RPM_COUNT,#50d            ; test the count for too many pulses
        jr      ugt,FAREV                 ; if too man pulses then reverse
```

```
                di
                clr     RPM_COUNT               ; clear the counter
                clr     BRPM_COUNT              ; clear the counter
                ei
;               clr     FAREVFLAG               ; clear the flag    temp test
                jr      RPMTDONE                ; continue
FAREV:
                ld      FAULTCODE,#06h          ; set the fault flag
                ld      FAREVFLAG,#088H         ; set the forced up flag
                and     p0,#^LB ^C WORKLIGHT    ; turn off light
;**             ld      REASON,#80H             ; rpm forcing up motion
                call    SET_AREV_STATE          ; set the autorev state
RPMTDONE:
                dec     RPMCLEAR                ; decrement the timer
                cp      LIGHT1S,#00             ; test for the end
                jr      z,SKIPLIGHTE
                dec     LIGHT1S                 ; down count the light time
SKIPLIGHTE:
                inc     R_DEAD_TIME
                cp      RTO,#RDROPTIME          ; test for the radio time out
                jr      ult.DONOTCB             ; if not timed out donot clear b
                cp      CodeFlag, #LRNOCS       ; If we are in a special learn mode.
                jr      uge, DONOTCB        ; then don't clear the code flag
                clr     CodeFlag                ; else clear the b code flag
DONOTCB:
                inc     RTO                     ; increment the radio time out
                jr      nz.RTOOK                ; if the radio timeout ok then skip
                dec     RTO                     ; back turn
RTOOK:
                cp      RRTO.#0FFH              ; test for roll
                jr      z.SKIPRRTO              ; if so then skip
                inc     RRTO
SKIPRRTO:                                       ;
                ld      temp.psport             ; read the program switch
                and     temp.#psmask            ; mask for switch
                jr      z.PRSWCLOSED            ; if the switch is closed count up
                cp      learndb.#00             ; test for the non decrement point
                jr      z.LEARNDBOK             ; if at end skip dec
                dec     learndb                 ;
                jr      LEARNDBOK               ;

PRSWCLOSED:
                inc     learndb                 ; increase the learn debounce timer
                cp      learndb,#0H             ; test for overflow
                jr      nz.LEARNDBOK            ; if not 0 skip back turning
                dec     learndb                 ;
LEARNDBOK:

TEST125:
                cp      t125ms.#125D            ; test for the time out
                jr      z.ONE25MS               ; if true the jump
                cp      t125ms.#63D             ; test for the other timeout
                jr      nz.N125
                call    FAULTB
```

```
N125:
        pop     RP
        iret
ONE25MS:
        cp      AUXLEARNSW,#0FFh        ; test for the rollover position
        jr      z,SKIPAUXLEARNSW        ; if so then skip
        inc     AUXLEARNSW              ; increase
SKIPAUXLEARNSW:
        cp      ZZWIN,#0FFH             ; test for the roll position
        jr      z,TESTFA                ; if so skip
        inc     ZZWIN                   ; if not increase the counter
TESTFA:
        call    FAULTB                  ; call the fault blinker
        clr     t125ms                  ; reset the timer
        inc     DOG2                    ; incrwease the second watch dog
        di
        inc     SDISABLE                ; count off the system disable timer
        jr      nz.DO12                 ; if not rolled over then do the 1.2 sec
        dec     SDISABLE                ; else reset to FF
DO12:
        cp      ONEP2,#00               ; test for 0
        jr      z.INCLEARN              ; if counted down then increment learn
        dec     ONEP2                   ; else down count
INCLEARN:
        inc     learnt                  ; increase the learn timer
        cp      learnt,#0H              ; test for overflow
        jr      nz.LEARNTOK             ; if not 0 skip back turning
        dec     learnt                  ;
LEARNTOK:
        ei
        inc     eraset                  ; increase the erase timer
        cp      eraset,#0H              ; test for overflow
        jr      nz.ERASETOK             ; if not 0 skip back turning
        dec     eraset                  ;
ERASETOK:
        pop     RP
        iret

;       fault blinker

FAULTB:
        inc     FAULTTIME               ; increase the fault timer
        cp      FAULTTIME,#80h          ; test for the end
        jr      nz.FIRSTFAULT           ; if not timed out
        clr     FAULTTIME               ; reset the clock
        clr     FAULT                   ; clear the last
        cp      FAULTCODE,#05h          ; test for call dealer code
        jr      UGE,GOTFAULT            ; set the fault
        cp      CMD_DEB.#0FFH           ; test the debouncer
        jr      nz.TESTAOBSM            ; if not set test aobs
        cp      FAULTCODE,#03h          ; test for command shorted
        jr      z.GOTFAULT              ; set the error
        ld      FAULTCODE,#03h          ; set the code
        jr      FIRSTFAULT              ;
```

```
TESTAOBSM:
        tm      AOBSF,#00000001b            ; test for the skiped aobs pulse
        jr      z,NOAOBSFAULT               ; if no skips then no faults
        tm      AOBSF,#00000010b            ; test for any pulses
        jr      z,NOPULSE                   ; if no pulses find if hi or low
                                            ; else we are intermittent
        ld      FAULTCODE,#04h              ; set the fault
        jr      GOTFAULT                    ; if same got fault
;       cp      FAULTCODE,#04h              ; test the last fault
;       jr      z,GOTFAULT                  ; if same got fault
;       ld      FAULTCODE,#04h              ; set the fault
;       jr      FIRSTFC                     ;
NOPULSE: tm     P3,#00000001b       ; test the input pin
        jr      z,AOBSSH                    ; jump if aobs is stuck hi
        cp      FAULTCODE,#01h              ; test for stuck low in the past
        jr      z,GOTFAULT                  ; set the fault
        ld      FAULTCODE,#01h              ; set the fault code
        jr      FIRSTFC                     ;
AOBSSH: cp      FAULTCODE,#02h              ; test for stuck high in past
        jr      z,GOTFAULT                  ; set the fault
        ld      FAULTCODE,#02h              ; set the code
        jr      FIRSTFC                     ;

GOTFAULT: ld    FAULT,FAULTCODE             ; set the code
        swap    FAULT                       ;
        jr      FIRSTFC                     ;
NOAOBSFAULT:
        clr     FAULTCODE                   ; clear the fault code
FIRSTFC: and    AOBSF, #11111100b           ; clear flags

FIRSTFAULT:
        tm      FAULTTIME, #00000111b       ; If one second has passed,
        jr      nz, RegularFault      ; increment the 60min

        incw    HOUR_TIMER                  ; Increment the 1 hour timer
        tcm     HOUR_TIMER_LO, #00011111b   ; If 32 seconds have passed
        jr      nz, RegularFault            ; poll the radio mode

        or      AOBSF, #01000000b           ; Set the 'poll radio' flag

RegularFault:

        cp      FAULT,#00                   ; test for no fault
        jr      z,NOFAULT
        ld      FAULTFLAG,#0FFH             ; set the fault flag
        cp      CodeFlag,#REGLEARN  ; test for not in learn mode
        jr      z,TESTSDI                   ; if in learn then skip setting
        cp      FAULT,FAULTTIME             ;
        jr      ULE,TESTSDI

        tm      FAULTTIME,#00001000b        ; test the 1 sec bit
        jr      nz,BITONE
        and     ledport,#ledl               ; turn on the led
        ret
```

```
BITONE:
            or      ledport,#ledh               ; turn off the led
TESTSDI:
            ret

NOFAULT:    clr     FAULTFLAG                   ; clear the flag
            ret

;-----------------------------------------------------------------------------
; MOTOR STATE MACHINE
;-----------------------------------------------------------------------------

STATEMACHINE:
        call    RS232
        xor     p0,#00001000b               ; toggle aux output
        cp      DOG2,#8d                    ; test the 2nd watchdog for problem
        jp      ugt,START                   ; if problem reset
        cp      STATE,#06d                  ; test for legal number
        jp      ugt,start               ; if not the reset
        jp      z,stop                      ; stop motor 6
        cp      STATE,#03d                  ; test for legal number
        jp      z,start                     ; if not the reset
        cp      STATE,#00d                  ; test for autorev
        jp      z,auto_rev                  ; auto reversing 0
        cp      STATE,#01d                  ; test for up
        jp      z,up_direction              ; door is going up 1
        cp      STATE,#02d                  ; test for autorev
        jp      z,up_position               ; door is up 2
        cp      STATE,#04d                  ; test for autorev
        jp      z,dn_direction              ; door is going down 4
        jp      dn_position                 ; door is down      5

;-----------------------------------------------------------------------------
; AUX OBSTRUCTION OUTPUT AND LIGHT FUNCTION
;-----------------------------------------------------------------------------

AUXLIGHT:
test_light_on:
        cp      LIGHT_FLAG,#LIGHT           ;
        jr      z,dec_pre_light             ;
        cp      LIGHT1S,#00                 ; test for no flash
        jr      z,NO1S                      ; if not skip
        cp      LIGHT1S,#01d                ; test for timeout
        jr      nz,NO1S                     ; if not skip
        xor     p0,#WORKLIGHT               ; toggle light
        clr     LIGHT1S                     ; oneshoted
NO1S:
        cp      FLASH_FLAG,#FLASH
        jr      nz,dec_pre_light        ;
        decw    FLASH_DELAY                 ; 250 ms period
        jr      nz,dec_pre_light        ;
        xor     p0,#WORKLIGHT               ; toggle light
```

```
        ld      FLASH_DELAY_HI,#FLASH_HI
        ld      FLASH_DELAY_LO,#FLASH_LO
        dec     FLASH_COUNTER                   ;
        jr      nz,dec_pre_light
        clr     FLASH_FLAG                      ;
dec_pre_light:
        cp      LIGHT_TIMER_HI,#0FFH            ; test for the timer ignore
        jr      z,exit_light                    ; if set then ignore
        dec     PRE_LIGHT                       ; dec 3 byte light timer
        jr      nz,exit_light                   ;
        decw    LIGHT_TIMER                     ;
        jr      nz,exit_light                   ; if timer 0 turn off the light
        and     p0,#^C LIGHT_ON                 ; turn off the light
exit_light:
        ret                                     ; return
;-----------------------------------------------------------------------------
;       AUTO_REV ROUTINE
;-----------------------------------------------------------------------------

auto_rev:
        cp      FAREVFLAG,#088H                 ; test for the forced up flag
        jr      nz.LEAVEREV
        and     p0.#^LB ^C WORKLIGHT            ; turn off light
;       clr     FAREVFLAG                       ; one shot temp test
LEAVEREV:
        WDT                                     ; kick the dog
        call    HOLDFREV                        ; hold off the force reverse
        ld      LIGHT_FLAG.#LIGHT               ; force the light on no blink
        and     p0.#^LB ^C MOTOR_UP ^& #^C MOTOR_DN     ; disable motor
        di
        decw    AUTO_DELAY                      ; wait for .5 second
        decw    BAUTO_DELAY                     ; wait for .5 second
        ei
        jr      nz.arswitch                     ; test switches


        or      p0.#00001000b                   ; set aux output    for FEMA


        tm      p2.#UP_LIMIT                    ; test the limit
        jr      nz.NOUPLIM                      ; if limit set stop
;**     LD      REASON.#60H                     ; set the reason as early limit
        jp      SET_STOP_STATE                  ; set stop
NOUPLIM:
;**     ld      REASON.#40H                     ; set the reason for the change
        jp      SET_UP_DIR_STATE                ; set the state
arswitch:
;**     ld      REASON.#00H                     ; set the reason to command
        di
        cp      SW_DATA.#CMD_SW                 ; test for a command
        clr     SW_DATA
        ei
        jp      z.SET_STOP_STATE                ; if so then stop
;**     ld      REASON.#10H                     ; set the reason as radio command
```

```
        cp      RADIO_CMD,#0AAH                 ; test for a radio command
        jp      z,SET_STOP_STATE                ; if so the stop
exit_auto_rev:
        ret                                     ; return


HOLDFREV:
        ld      RPMONES,#244d                   ; set the hold off
        ld      RPMCLEAR,#122d                  ; clear rpm reverse .5 sec
        di
        clr     RPM_COUNT                       ; start with a count of 0
        clr     BRPM_COUNT                      ; start with a count of 0
        ei
        ret


;-----------------------------------------------------------------------------
;       DOOR GOING UP
;-----------------------------------------------------------------------------

up_direction:
        WDT                                     ; kick the dog
        call    HOLDFREV                        ; hold off the force reverse
        ld      LIGHT_FLAG,#LIGHT               ; force the light on no blink
        and     p0,#^LB ^C MOTOR_DN             ; disable down relay

        cp      MOTDEL,#0FFH                    ; test for done
        jr      z,UPON                          ; if done skip delay
        inc     MOTDEL                          ; increase the delay timer
        or      p0,#LIGHT_ON                    ; turn on the light
        cp      MOTDEL,#20d                     ; test for 40 seconds
        jr      ule,UPOFF                       ; if not timed
UPON:
        or      p0,#MOTOR_UP ^| #LIGHT_ON       ; turn on the motor and light
UPOFF:
        cp      FORCE_IGNORE,#01                ; test fro the end of the force ignore
        jr      nz,SKIPUPRPM                    ; if not donot test rpmcount
        cp      RPM_ACOUNT,#02H                 ; test for less the 2 pulses
        jr      ugt,SKIPUPRPM                   ;
        ld      FAULTCODE,#05h
SKIPUPRPM:
        cp      FORCE_IGNORE,#00                ; test timer for done
        jr      nz,test_up_sw_pre               ; if timer not up do not test force
TEST_UP_FORCE:
        di
        dec     RPM_TIME_OUT                    ; decrease the timeout
        dec     BRPM_TIME_OUT                   ; decrease the timeout
        ei
        jr      z,failed_up_rpm
        di                                      ; turn off the interrupt
        ld      RPM_SET_DIFF_LO,UP_FORCE_LO
        ld      RPM_SET_DIFF_HI,UP_FORCE_HI
        sub     RPM_SET_DIFF_LO,RPM_PERIOD_LO
        sbc     RPM_SET_DIFF_HI,RPM_PERIOD_HI
```

```
        tm      RPM_SET_DIFF_HI,#10000000B ; test high bit for sign
        jr      z,test_up_sw                    ; if the rpm period is ok then switch
failed_up_rpm:
;**      ld      REASON,#20H                     ; set the reason as force
        jp      SET_STOP_STATE
test_up_sw_pre:
        dec     FORCE_PRE                       ; dec the prescaler
        tm      FORCE_PRE,#00000001B            ; test for odd /2
        jr      nz.test_up_sw                   ; if odd skip
        di
        dec     FORCE_IGNORE
        dec     BFORCE_IGNORE
test_up_sw:
        ei                                      ; enable interrupt
        tm      p2,#UP_LIMIT                    ; have we reached the limit?
        jr      z,up_limit_dec                  ;
        ld      limit,#LIMIT_COUNT              ;
        jr      get_sw                          ;
up_limit_dec:
        djnz    limit,get_sw                    ; dec debounce count
;**      ld      REASON,#50H                     ; set the reason as limit
        jp      SET_UP_POS_STATE                ;
get_sw:
;**      ld      REASON,#10H                     ; set the radio command reason
        cp      RADIO_CMD,#0AAH                 ; test for a radio command
        jp      z,SET_STOP_STATE                ; if so stop
;**      ld      REASON,#00H                     ; set the reason as a command
        di
        cp      SW_DATA,#CMD_SW                 ; test for a command condition
        clr     SW_DATA
        ei
        jr      ne,test_up_time                 ;
        jp      SET_STOP_STATE                  ;
test_up_time:
;**      ld      REASON,#70H                     ; set the reason as a time out
        decw    MOTOR_TIMER                     ; decrement motor timer
        jp      z,SET_STOP_STATE                ;
exit_up_dir:
        ret                                     ; return to caller
;-----------------------------------------------------------------------------
;       DOOR UP
;-----------------------------------------------------------------------------

up_position:
        WDT                                     ; kick the dog
        cp      FAREVFLAG,#088H                 ; test for the forced up flag
        jr      nz,LEAVELIGHT
        and     p0,#^LB ^C WORKLIGHT            ; turn off light
        jr      UPNOFLASH                       ; skip clearing the flash flag
LEAVELIGHT:
        ld      LIGHT_FLAG,#00H                 ; allow blink
UPNOFLASH:
        ld      limit,#LIMIT_COUNT              ;
        and     p0,#^LB ^C MOTOR_UP ^& #^C MOTOR_DN     ; disable motor
```

```
        cp      SW_DATA,#LIGHT_SW           ; light sw debounced?
        jr      z,work_up                   ;
;**     ld      REASON,#10H                 ; set the reason as a radio command
        cp      RADIO_CMD,#0AAH             ; test for a radio cmd
        jr      z,SETDNDIRSTATE             ; if so start down
;**     ld      REASON,#00H                 ; set the reason as a command
        di
        cp      SW_DATA,#CMD_SW             ; command sw debounced?
        clr     SW_DATA
        ei
        jr      z,SETDNDIRSTATE             ; if command
        ret
SETDNDIRSTATE:
        ld      ONEP2,#10D                  ; set the 1.2 sec timer
        jp      SET_DN_DIR_STATE

work_up:
        xor     p0,#WORKLIGHT               ; toggle work light
        ld      LIGHT_TIMER_HI,#0FFH        ; set the timer ignore
        and     SW_DATA, # ^LB ^C (LIGHT_SW) ; Clear the worklight bit
up_pos_ret:
        ret                                 ; return
;--------------------------------------------------------------------------
;       DOOR GOING DOWN
;--------------------------------------------------------------------------

dn_direction:
        WDT                                 ; kick the dog
        call    HOLDFREV                    ; hold off the force reverse
        clr     FLASH_FLAG                  ; turn off the flash
        ld      LIGHT_FLAG,#LIGHT           ; force the light on no blink
        and     p0,#^LB ^C MOTOR_UP         ; turn off motor up
        cp      MOTDEL,#0FFH                ; test for done
        jr      z,DNON                      ; if done skip delay
        inc     MOTDEL                      ; increase the delay timer
        or      p0,#LIGHT_ON                ; turn on the light
        cp      MOTDEL,#20d                 ; test for 40 seconds
        jr      ule,DNOFF                   ; if not timed
DNON:

        or      p0,#MOTOR_DN ^| #LIGHT_ON   ; turn on the motor and light
DNOFF:
        cp      FORCE_IGNORE,#01            ; test fro the end of the force ignore
        jr      nz,SKIPDNRPM                ; if not donot test rpmcount
        cp      RPM_ACOUNT,#02H             ; test for less the 2 pulses
        jr      ugt,SKIPDNRPM               ;
        ld      FAULTCODE,#05h
SKIPDNRPM:
        cp      FORCE_IGNORE,#00            ; test timer for done
        jr      nz,test_dn_sw_pre           ; if timer not up do not test force
        cp      ForcedDown,#1h              ; test the flag to skip rpm if forcing down
        jr      z,test_dn_sw_pre

TEST_DOWN_FORCE:
```

```
        di
        dec     RPM_TIME_OUT                    ; decrease the timeout
        dec     BRPM_TIME_OUT                   ; decrease the timeout
        ei
        jr      z,failed_dn_rpm
        di                                      ; turn off the interrupt
        ld      RPM_SET_DIFF_LO,DN_FORCE_LO
        ld      RPM_SET_DIFF_HI,DN_FORCE_HI
        sub     RPM_SET_DIFF_LO,RPM_PERIOD_LO
        sbc     RPM_SET_DIFF_HI,RPM_PERIOD_HI
        tm      RPM_SET_DIFF_HI,#10000000B ; test high bit for sign
        jr      z,test_dn_sw                    ; if the rpm period is ok then switch

failed_dn_rpm:
;**     ld      REASON,#20H                     ; set the reason as force
        jp      SET_AREV_STATE                  ; set the state
test_dn_sw_pre:
        dec     FORCE_PRE                       ; dec the prescaler
        tm      FORCE_PRE,#00000001B            ; test for odd /2
        jr      nz,test_dn_sw                   ; if odd skip
        di
        dec     FORCE_IGNORE
        dec     BFORCE_IGNORE
test_dn_sw:
        ei                                      ; turn on the interrupt
        tm      p2,#DN_LIMIT                    ; are we at down limit?
        jr      z,dn_limit_dec                  ;
        ld      limit,#LIMIT_COUNT              ; reset the limit
        jr      call_sw_dn                      ;
dn_limit_dec:
        djnz    limit,call_sw_dn                ; dec debounce counter
;**     ld      REASON,#50H                     ; set the reason as a limit
        cp      CMD_DEB,#0FFH                   ; test for the switch still held
        jr      nz,TESTRADIO                    ;
;**     ld      REASON,#90H                     ; closed with the control held
        jr      TESTFORCEIG
TESTRADIO:
        cp      LAST_CMD,#00                    ; test for the last command being radio
        jr      nz,TESTFORCEIG                  ; if not test force
        cp      CodeFlag,#BRECEIVED             ; test for the b code flag
        jr      nz,TESTFORCEIG                  ;
;**     ld      REASON,#0A0H                    ; set the reason as b code to limit
TESTFORCEIG:
        cp      ForcedDown,#00          ; test for force down action
        jr      nz,NOAREVDN                     ; if set skip early limits
        cp      FORCE_IGNORE,#00H       ; test the force ignore for done
        jr      z,NOAREVDN                      ; a rev if limit before force enabled
;**     ld      REASON,#60h                     ; early limit
        jp      SET_AREV_STATE                  ; set autoreverse
NOAREVDN:
        and     p0,#^LB ^C MOTOR_DN             ;
        jp      SET_DN_POS_STATE                ; set the state
call_sw_dn:
;**     ld      REASON,#10H                     ; set the reason as radio command
```

```
        cp      RADIO_CMD,#0AAH              ; test for a radio command
        jp      z,SET_AREV_STATE             ; if so arev
;**     ld      REASON,#00H                  ; set the reason as command
        di
        cp      SW_DATA,#CMD_SW              ; test for command
        clr     SW_DATA
        ei
        jp      z,SET_AREV_STATE             ;
test_dn_time:
;**     ld      REASON,#70H                  ; set the reason as timeout
        decw    MOTOR_TIMER                  ; decrement motor timer
        jp      z,SET_AREV_STATE             ;
dec_obs_count:
        djnz    obs_count,exit_dn_dir        ; dec aux obs count
        cp      LAST_CMD,#00                 ; test for the last command from radio
        jr      z,OBSTESTB                   ; if last command was a radio test b
        cp      CMD_DEB,#0FFH                ; test for the command switch holding
        jr      nz,OBSAREV                   ; if the command switch is not holding
                                             ; do the autorev
        jr      exit_dn_dir                  ; otherwise skip
OBSAREV:
        ld      FLASH_FLAG,#0FFH             ; set flag
        ld      FLASH_COUNTER,#20            ; set for 10 flashes
        ld      FLASH_DELAY_HI,#FLASH_HI ; set for .5 Hz period
        ld      FLASH_DELAY_LO,#FLASH_LO
;**     ld      REASON,#30H                  ; set the reason as autoreverse
        jp      SET_AREV_STATE               ;
OBSTESTB:
        cp      CodeFlag,#BRECEIVED          ; test for the b code flag
        jr      nz,OBSAREV                   ; if not b code then arev
exit_dn_dir:
;       ld      REASON,#0B0H                 ; set the reason as command not held
;       cp      FAREVFLAG,#088H              ; test forced up flag
;       jr      nz,exit_2_dn                 ; if the forced up flag clear skip
;       cp      CMD_DEB,#0FFH                ; test for a held command
;       jr      z,exit_2_dn                  ; if the command is held keep going
;       cp      LAST_CMD,#00                 ; test for the last command being radio
;       jr      nz,do_reverse                ; if not do reverse
;       cp      CodeFlag,#BRECEIVED          ; test for the b code flag
;       jr      z,exit_2_dn                  ; if set skip till either is released
;do_reverse:
;       jp      SET_AREV_STATE               ; set the autoreverse state
;exit_2_dn:
        ret                                  ; return

;-----------------------------------------------------------------------------
;       DOOR DOWN
;-----------------------------------------------------------------------------

dn_position:
        WDT                                  ; kick the dog
;       cp      FAREVFLAG,#088H              ; test for the forced up flag
;       jr      nz,DNLEAVEL                  ;
;       and     p0,#^LB ^C WORKLIGHT         ; turn off light
```

```
;       jr      DNNOFLASH                       ; skip clearing the flash flag

        cp      ForcedDown.#01d                 ; test for force in past
        jr      z.TestMotorRev                  ; if so the test motor motion
        cp      MOTOR_TIMER.#00d                ; test for timed out
        jr      z.TestMotorRev                  ; if timed out then test rev.
        decw    MOTOR_TIMER                     ; decrement motor timer
        clr     RPM_ACOUNT                      ; clear the rpm counter
        jr      SkipLock                        ; skip the lock till 27 sec timeout
TestMotorRev:
        tm      p2.#DN_LIMIT                    ; is the down limit still set
        jr      z.SkipLock                      ; then skip the lock down
        cp      RPM_ACOUNT.#10d                 ; test for 2 rev
        jr      ule.SkipLock                    ; if less skip the lock down
        ld      ForcedDown.#1h              ; set the flag to skip early limits
        jp      SET_DN_DIR_STATE                ; force the door down to lim
SkipLock:
DNLEAVEL:
        ld      LIGHT_FLAG.#00H                 ; allow blink
DNNOFLASH:
        ld      limit.#LIMIT_COUNT              ;
        and     p0.#^LB ^C MOTOR_UP ^& #^C MOTOR_DN     ; disable motor
        cp      SW_DATA.#LIGHT_SW           ; debounced? light
        jr      z.work_dn                       ;
;**     ld      REASON.#10H                     ; set the reason as a radio command
        cp      RADIO_CMD.#0AAH                 ; test for a radio command
        jr      z.SETUPDIRSTATE                 ; if so go up
;**     ld      REASON.#00H                     ; set the reason as a command
        di
        cp      SW_DATA.#CMD_SW                 ; command sw pressed?
        clr     SW_DATA
        ei
        jr      z.SETUPDIRSTATE                 ; if so go up
        ret

SETUPDIRSTATE:
        ld      ONEP2.#10D                      ; set the 1.2 sec timer
        jp      SET_UP_DIR_STATE

work_dn:
        xor     p0.#WORKLIGHT                   ; toggle work light
        ld      LIGHT_TIMER_HI.#0FFH            ; set the timer ignore
        and     SW_DATA. # ^LB ^C (LIGHT_SW)    ; Clear the worklight bit
dn_pos_ret.
        ret                                     ; return
;-----------------------------------------------------------------------------
;       STOP
;-----------------------------------------------------------------------------

stop:
        WDT                                     ; kick the dog
        cp      FAREVFLAG.#088H                 ; test for the forced up flag
        jr      nz.LEAVESTOP
```

```
        and     p0,#^LB ^C WORKLIGHT                ; turn off light
LEAVESTOP:
        ld      LIGHT_FLAG,#00H                     ; allow blink
        and     p0,#^LB ^C MOTOR_UP ^& #^C MOTOR_DN ; disable motor
        cp      SW_DATA,#LIGHT_SW           ; debounced? light
        jr      z,work_stop                         ;
;**     ld      REASON,#10H                         ; set the reason as radio command
        cp      RADIO_CMD,#0AAH                     ; test for a radio command
        jp      z,SET_DN_DIR_STATE          ; if so go down
;**     ld      REASON,#00H                         ; set the reason as a command
        di
        cp      SW_DATA,#CMD_SW                     ; command sw pressed?
        clr     SW_DATA
        ei
        jp      z,SET_DN_DIR_STATE          ; if so go down
        ret
work_stop:
        xor     p0,#WORKLIGHT                       ; toggle work light
        ld      LIGHT_TIMER_HI,#0FFH                ; set the timer ignore
        and     SW_DATA, # ^LB ^C (LIGHT_SW)        ; Clear the worklight bit
stop_ret:
        ret                                         ; return

;-----------------------------------------------------------------------------
;       SET THE AUTOREV STATE
;-----------------------------------------------------------------------------
SET_AREV_STATE:
        di                                          ;
        ld      STATE,#AUTO_REV                     ; if we got here, then reverse motor
        jr      SET_ANY

;-----------------------------------------------------------------------------
;       SET THE STOPPED STATE
;-----------------------------------------------------------------------------
SET_STOP_STATE:
        di
        ld      STATE,#STOP                         ;
        jr      SET_ANY

;-----------------------------------------------------------------------------
;       SET THE DOWN DIRECTION STATE
;-----------------------------------------------------------------------------
SET_DN_DIR_STATE:
        di
        ld      STATE,#DN_DIRECTION                 ; energize door
        clr     FAREVFLAG                           ; one shot the forced reverse
        tm      p2,#DN_LIMIT                        ; are we at down limit?
        jr      nz,SET_ANY                          ; if not at limit set dn
                                                    ; else set the dn position
;-----------------------------------------------------------------------------
;       SET THE DOWN POSITION STATE
;-----------------------------------------------------------------------------
SET_DN_POS_STATE:
        di
```

```
        ld      STATE,#DN_POSITION          ; load new state
        jr      SET_ANY

;-----------------------------------------------------------------------
;       SET THE UP DIRECTION STATE
;-----------------------------------------------------------------------
SET_UP_DIR_STATE:
        di
        clr     ForcedDown                  ; clear the flag for skiping early limit
        ld      STATE,#UP_DIRECTION         ;
        tm      p2,#UP_LIMIT                ; have we reached the limit?
        jr      nz,SET_ANY                  ; if not set the state
                                            ; else fall throught and set pos state
;-----------------------------------------------------------------------
;       SET THE UP POSITION STATE
;-----------------------------------------------------------------------
SET_UP_POS_STATE:
        di
        ld      STATE,#UP_POSITION          ;

;-----------------------------------------------------------------------
;       SET ANY STATE
;-----------------------------------------------------------------------
SET_ANY:
        ld      BSTATE,STATE                ; set the backup state
        di
        clr     RPM_COUNT                   ; clear the rpm counter
        clr     BRPM_COUNT                  ;
        ld      AUTO_DELAY_HI,#AUTO_HI      ; set the .5 second auto rev timer
        ld      AUTO_DELAY_LO,#AUTO_LO      ;
        ld      BAUTO_DELAY_HI,#AUTO_HI     ; set the .5 second auto rev timer
        ld      BAUTO_DELAY_LO,#AUTO_LO     ;
        ld      FORCE_IGNORE,#ONE_SEC       ; set the force ignore timer to one sec
        ld      BFORCE_IGNORE,#ONE_SEC      ; set the force ignore timer to one sec
        ei
        clr     RADIO_CMD                   ; one shot
        clr     RPM_ACOUNT                  ; clear the rpm active counter
        ld      LIMIT,#LIMIT_COUNT          ;
        ld      MOTOR_TIMER_HI,#MOTOR_HI
        ld      MOTOR_TIMER_LO,#MOTOR_LO
;**     ld      STACKREASON,REASON          ; save the temp reason
        ld      STACKFLAG,#0FFH             ; set the flag
TURN_ON_LIGHT:
        ld      LIGHT_TIMER_HI,#SET_TIME_HI ; set the light period
        ld      LIGHT_TIMER_LO,#SET_TIME_LO ;
        ld      PRE_LIGHT,#SET_TIME_PRE     ;
        ld      LIGHTS,P0                   ; read the light state
        and     LIGHTS,#WORKLIGHT           ;
        jr      nz,lighton                  ; if the light is on skip clearing
lightoff:
        clr     MOTDEL                      ; clear the motor delay
lighton:
        ret
```

```
;-----------------------------------------------------------------------------
;       THIS THE AUXILARY OBSTRUCTION INTERRUPT ROUTINE
;-----------------------------------------------------------------------------

AUX_OBS:
        ld      OBS_COUNT,#6D           ; reset pulse counter (no obstruction)
        and     imr,#11110111b          ; turn off the interupt for up to 500uS
        ld      AOBSTEST,#11D           ; reset the test timer
        or      AOBSF,#00000010B        ; set the flag for got a aobs
        and     AOBSF,#11011111B        ; Clear the bad aobs flag
        iret                            ; return from int

;-----------------------------------------------------------------------------
;       THIS IS THE MOTOR RPM INTERRUPT ROUTINE
;-----------------------------------------------------------------------------
RPM:
        push    rp                      ; save current pointer
        srp     #RPM_GROUP              ;point to these reg
        ld      rpm_temp_hi,T0EXT       ; read the timer extension
        ld      rpm_temp_lo,T0          ; read the timer
        tm      IRQ,#00010000B          ; test for a pending interrupt
        jr      z,RPMTIMEOK             ; if not then time ok
RPMTIMEERROR:
        tm      rpm_temp_lo,#10000000B  ; test for timer reload
        jr      z,RPMTIMEOK             ; if no reload time is ok
        dec     rpm_temp_hi             ; if reloaded then dec the hi to resync
RPMTIMEOK:
        and     imr,#11111011b          ; turn off the interupt for up to 500uS

        ld      rpm_2past_hi,rpm_past_hi        ; save the past for testing
        ld      rpm_2past_lo,rpm_past_lo        ;
        ld      rpm_past_hi,rpm_temp_hi         ; transfer the present into the past
        ld      rpm_past_lo,rpm_temp_lo         ;
        ld      rpm_diff_hi,rpm_2past_hi        ; transfer the past into the difference
        ld      rpm_diff_lo,rpm_2past_lo        ;
        sub     rpm_diff_lo,rpm_past_lo         ; find the difference
        sbc     rpm_diff_hi,rpm_past_hi         ;
        tm      rpm_diff_hi,#10000000b          ; test for neg number
        jr      z,RPM_TIME_FOUND                ; if the time is correct then jump
        ld      rpm_diff_hi,rpm_past_hi         ; transfer the temp into the difference
        ld      rpm_diff_lo,rpm_past_lo         ;
        sub     rpm_diff_lo,rpm_2past_lo        ; find the difference
        sbc     rpm_diff_hi,rpm_2past_hi        ;
RPM_TIME_FOUND:
        ld      rpm_period_hi,rpm_diff_hi       ; transfer the difference to the period
        ld      rpm_period_lo,rpm_diff_lo       ;
        ei
        di
        cp      rpm_period_hi,#12D      ; test for a period of at least 6.144mS
        jr      ult,SKIPC               ; if the period is less then skip counting
        cp      STATE,#05h              ; test for the down limit state
        jr      z,CLRC                  ; if set clear the counter
TULS:
```

```
        cp      STATE,#02H                  ; test for the up limit state
        jr      nz,INCRPM                   ; if not then increment the rpm state
        tm      P2,#UP_LIMIT                ; test for the up limit still set
        jr      nz,INCRPM                   ; if not then set
CLRC:
        clr     RPM_COUNT                   ; clear the rpm counter
        clr     BRPM_COUNT                  ;
        ei
        jr      SKIPC                       ;
INCRPM:
        inc     RPM_COUNT                   ; increase the rpm count
        inc     BRPM_COUNT                  ; increase the rpm count
;       inc     RPM_ACOUNT                  ; increase the rpm count
SKIPC:
        inc     RPM_ACOUNT                  ; increase the rpm count
        di
        ld      rpm_time_out,#15D           ; set the rpm max period as 30mS
        ld      BRPM_TIME_OUT,#15D          ; set the rpm max period as 30mS
                                            ; if rpm not updated by then reverse
        ei
SKIPPEDGE:
        pop     rp                          ; return the rp
        iret                                ; return


;-----------------------------------------------------------------------------
;       THIS IS THE SWITCH TEST SUBROUTINE
;
;       STATUS
;       0 => COMMAND TEST
;       1 => WORKLIGHT TEST
;       2 => VACATION TEST
;       3 => CHARGE
;
;       SWITCH DATA
;       0 => OPEN
;       1 => COMMAND        CMD_SW
;       2 => WORKLIGHT      LIGHT_SW
;       4 => VACATION       VAC_SW
;-----------------------------------------------------------------------------


switches:
        call    RS232
        ei
;       and     SW_DATA, #LIGHT_SW       ; Clear all switches except for worklight
        cp      STATUS,#03d                       ; test for illegal number
        jp      ugt,start                ; if so reset
        jp      z,charge                 ; if it is 3 then goto charge
        cp      STATUS,#02d                       ; test for vacation
        jp      z,VACATION_TEST                   ; if so then jump
        cp      STATUS,#01d                       ; test for worklight
        jp      z,WORKLIGHT_TEST                  ; if so then jump
```

```
                                            ; else it id command
COMMAND_TEST:
        cp      VACFLAG,#00H                ; test for vacation mode
        jr      z,COMMAND_TEST1             ; if not vacation skip flash

        inc     VACFLASH                    ; increase the vacation flash timer
        cp      VACFLASH,#10                ; test the vacation flash period
        jr      ult,COMMAND_TEST1           ; if lower period skip flash
        and     p3,#CCHARGE_SW              ; turn off wall switch
        or      p3,#DIS_SW                  ; enable discharge
        cp      VACFLASH,#60d               ; test the time delay for max
        jr      nz,NOTFLASHED               ; if the flash is not done jump and ret
        clr     VACFLASH                    ; restart the timer
NOTFLASHED:
        ret                                 ; return


COMMAND_TEST1:
        tm      p0,#SWITCHES            ; command sw pressed?
        jr      nz,CMDOPEN                  ; open command
        tm      P0,#10000000B               ; test the second command input
        jr      nz,CMDOPEN
CMDCLOSED:                                  ; closed command
;       call    DECVAC                      ; decrease vacation debounce
;       call    DECLIGHT                    ; decrease light debounce
        cp      CMD_DEB,#0FFH               ; test for the max number
        jr      z,SKIPCMDINC                ; if at the max skip inc
        di
        inc     CMD_DEB                     ; increase the debouncer
        inc     BCMD_DEB                    ; increase the debouncer
        ei
SKIPCMDINC:
        cp      CMD_DEB,#CMD_MAKE           ;
        jr      nz,CMDEXIT                  ; if not made then exit
GOT_A_CMD:
        di
        ld      LAST_CMD,#055H              ; set the last command as command
cmd:    ld      SW_DATA,#CMD_SW             ; set the switch data as command
        cp      AUXLEARNSW,#100d            ; test the time
        jr      ugt,SKIP_LEARN
        push    RP
        srp     #LEARNEE_GRP
        call    SETLEARN                    ; set the learn mode
        clr     SW_DATA                     ; clear the cmd
        pop     RP
        or      p0,#LIGHT_ON                ; turn on the light
        call    TURN_ON_LIGHT               ; turn on the light
SKIP_LEARN:
        ld      CMD_DEB,#0FFH               ; set the debouncer to ff one shot
        ld      BCMD_DEB,#0FFH              ; set the debouncer to ff one shot
CMDEXIT:
        ei
```

```
        or      p3,#CHARGE_SW                   ; turn on the charge system
        and     p3,#CDIS_SW                     ;
        ld      SWITCH_DELAY,#CMD_DEL_EX        ; set the delay time to 8mS
        ld      STATUS,#CHARGE                  ; charge time
CMDDELEXIT:
        ret                                     ;


CMDOPEN:                                        ; command switch open
        and     p3,#^LB ^C CHARGE_SW            ; turn off charging sw
        or      p3,#DIS_SW                      ; enable discharge
        ld      DELAYC,#16d                     ; set the time delay
DELLOOP:
        dec     DELAYC
        jr      nz,DELLOOP                      ; loop till delay is up
        tm      p0,#SWITCHES                 ; command line still high
        jr      nz,TESTWL                       ; if so return later
        call    DECVAC                          ; if not open line dec all debouncers
        call    DECLIGHT                        ;
        call    DECCMD                          ;
        ld      AUXLEARNSW,#0FFH                ; turn off the aux learn switch
        jr      CMDEXIT                         ; and exit

TESTWL:
        ld      STATUS,#WL_TEST                 ; set to test for a worklight
        ret                                     ; return


WORKLIGHT_TEST:
        tm      p0,#SWITCHES                 ; command line still high
        jr      nz,TESTVAC2                     ; exit setting to test for vacation
        call    DECVAC                          ; decrease the vacation debouncer
        call    DECCMD                          ; and the command debouncer
        cp      LIGHT_DEB,#0FFH                 ; test for the max
        jr      z,SKIPLIGHTINC                  ; if at the max skip inc
        inc     LIGHT_DEB                       ; inc debouncer
SKIPLIGHTINC:
        cp      LIGHT_DEB,#LIGHT_MAKE           ; test for the light make
        jr      nz,CMDEXIT                      ; if not then recharge delay
GOT_A_LIGHT:
        ld      LIGHT_DEB,#0FFH                 ; set the debouncer to max
        ld      SW_DATA,#LIGHT_SW            ; set the data as worklight
        cp      RRTO,#RDROPTIME                 ; test for code reception
        jr      ugt,CMDEXIT                     ; if not then skip the seting of flag
        clr     AUXLEARNSW                      ; start the learn timer
        jr      CMDEXIT                         ; then recharge

TESTVAC2:
        ld      STATUS,#VAC_TEST                ; set the next test as vacation
        ld      switch_delay,#VAC_DEL           ; set the delay
LIGHTDELEXIT:
        ret                                     ; return

VACATION_TEST:
```

1[illegible]

```
        djnz    switch_delay,VACDELEXIT              ;

        tm      p0,#SWITCHES                  ; command line still high
        jr      nz,EXIT_ERROR                 ; exit with a error setting open state
;       call    DECLIGHT                      ; decrease the light debouncer
        call    DECCMD                        ; decrease the command debouncer
        cp      VAC_DEB,#0FFH                 ; test for the max
        jr      z,VACINCSKIP                  ; skip the incrementing
        inc     VAC_DEB                       ; inc vacation debouncer
VACINCSKIP:
        cp      VACFLAG,#00H                  ; test for vacation mode
        jr      z,VACOUT                      ; if not vacation use out time
VACIN:
        cp      VAC_DEB,#VAC_MAKE_IN          ; test for the vacation make point
        jr      nz,VACATION_EXIT              ; exit if not made
        jr      GOT_A_VAC                     ;

VACOUT:
        cp      VAC_DEB,#VAC_MAKE_OUT         ; test for the vacation make point
        jr      nz,VACATION_EXIT              ; exit if not made
GOT_A_VAC:
        ld      VAC_DEB,#0FFH                 ; set vacation debouncer to max
        cp      AUXLEARNSW,#100d              ; test the time
        jr      ugt,SKIP_LEARNV
        push    RP
        srp     #LEARNEE_GRP
        call    SETLEARN                      ; set the learn mode
        pop     RP
        or      p0, #LIGHT_ON                 ; Turn on the worklight
        call    TURN_ON_LIGHT                 ;
        jr      VACATION_EXIT                 ; Forget vacation mode
SKIP_LEARNV:
        ld      VACCHANGE,#0AAH               ; set the toggle data
        cp      RRTO,#RDROPTIME               ; test for code reception
        jr      ugt,VACATION_EXIT             ; if not then skip the seting of flag
        clr     AUXLEARNSW                    ; start the learn timer
VACATION_EXIT:
        ld      SWITCH_DELAY,#VAC_DEL_EX      ; set the delay
        ld      STATUS,#CHARGE                ; set the next test as charge
VACDELEXIT:
        ret

EXIT_ERROR:
        call    DECCMD                        ; decrement the debouncers
        call    DECVAC                        ;
        call    DECLIGHT                      ;
        ld      SWITCH_DELAY,#VAC_DEL_EX      ; set the delay
        ld      STATUS,#CHARGE                ; set the next test as charge
        ret


charge:
        or      p3,#CHARGE_SW                 ;
        and     p3,#CDIS_SW                   ;
```

```
        dec     SWITCH_DELAY                    ;
        jr      nz,charge_ret                   ;
        ld      STATUS,#CMD_TEST                ;
charge_ret:
        ret


DECCMD:
        cp      CMD_DEB,#00H                    ; test for the min number
        jr      z,SKIPCMDDEC                    ; if at the min skip dec
        di
        dec     CMD_DEB                         ; decrement debouncer
        dec     BCMD_DEB                        ; decrement debouncer
        ei
SKIPCMDDEC:
        cp      CMD_DEB,#CMD_BREAK              ; if not at break then exit
        jr      nz,DECCMDEXIT                   ; if not break then exit
        di
        clr     CMD_DEB                         ; reset the debouncer
        clr     BCMD_DEB                        ; reset the debouncer
        ei
DECCMDEXIT:
        ret                                     ; and exit


DECLIGHT:
        cp      LIGHT_DEB,#00H                  ; test for the min number
        jr      z,SKIPLIGHTDEC                  ; if at the min skip dec
        dec     LIGHT_DEB                       ; decrement debouncer
SKIPLIGHTDEC:
        cp      LIGHT_DEB,#LIGHT_BREAK          ; if not at break then exit
        jr      nz,DECLIGHTEXIT                 ; if not break then exit
        clr     LIGHT_DEB                       ; reset the debouncer
DECLIGHTEXIT:
        ret                                     ; and exit


DECVAC:
        cp      VAC_DEB,#00H                    ; test for the min number
        jr      z,SKIPVACDEC                    ; if at the min skip dec
        dec     VAC_DEB                         ; decrement debouncer
SKIPVACDEC:
        cp      VACFLAG,#00H                    ; test for vacation mode
        jr      z,DECVACOUT                     ; if not vacation use out time
DECVACIN:
        cp      VAC_DEB,#VAC_BREAK_IN           ; test for the vacation break point
        jr      nz,DECVACEXIT                   ; exit if not
        jr      CLEARVACDEB                     ;

DECVACOUT:
        cp      VAC_DEB,#VAC_BREAK_OUT          ; test for the vacation break point
        jr      nz,DECVACEXIT                   ; exit if not
CLEARVACDEB:
```

```
        clr     VAC_DEB                             ; reset the debouncer
DECVACEXIT:
        ret                                         ; and exit


;------------------------------------------------------------------------------
;       THIS ROUTINE GENERATES THE RAMP FOR THE COMPARATORS
;------------------------------------------------------------------------------

PWM:
        push    rp                                  ; save current pointer
        srp     #PWM_GROUP                  ;
        and     p3,#^C PWM_HI                       ; take pwm output low
        tm      p0,#DOWN_COMP                       ; was it down force?
        jr      nz,test_up                          ; no, test up force
        ld      dn_temp,pulsewidth                  ; save setting
test_up:
        tm      p0,#UP_COMP                         ; up force trip?
        jr      nz,update_pwm                       ; should be high
        ld      up_temp,pulsewidth                  ; save setting
update_pwm:
        add     pulsewidth,#2               ; increase pulsewidth
        djnz    pwm_count,pwm_exit                  ;

GOT_FORCE_ADDRESS:
        ld      PWM_STATUS,#0FFH                    ; Set PWM status as blank time
        ei                                          ; turn on stacked interrupts
        rcf                                         ;
        rrc     dn_temp                     ; /2
        rcf                                         ;
        rrc     up_temp                     ; /2
        ld      DNFORCE,dn_temp                     ; save the values
        ld      UPFORCE,up_temp

        cp      dn_temp,#064d                       ; test the last address
        jr      ult,DN_ADDRESS_OK                   ; if in the range ok
        ld      dn_temp,#064d                       ; if out of the range set to the top
DN_ADDRESS_OK:

        ld      force_add_hi,dn_temp                ; REVERSE THE ROTATION
        ld      dn_temp,#64d                        ;
        sub     dn_temp,force_add_hi

        ld      force_add_hi,#^hb force_table_60
        ld      force_add_lo,#^lb force_table_60
        tm      p2,#00100000b                       ; test the 50/60 bit
        jr      nz,DN60
        ld      force_add_hi,#^hb force_table_50
        ld      force_add_lo,#^lb force_table_50
DN60:
        add     force_add_lo,dn_temp                ; calculate the address add 2X temp
        adc     force_add_hi,#00h                   ;
        add     force_add_lo,dn_temp                ; calculate the address add 2X temp
```

```
        adc     force_add_hi,#00h                   ;

        di
        ldc     dn_force_hi,@force_add          ; get hi byte
        incw    force_add                           ; get low byte
        ldc     dn_force_lo,@force_add          ;
        ei

        cp      up_temp,#064d                       ; test the last address
        jr      ult,UP_ADDRESS_OK                   ; if in the range ok
        ld      up_temp,#064d                       ; if out of the range set to the top

UP_ADDRESS_OK:

        ld      force_add_hi,up_temp                ; REVERSE THE ROTATION
        ld      up_temp,#64d                        ;
        sub     up_temp,force_add_hi

        ld      force_add_hi,#^hb force_table_60
        ld      force_add_lo,#^lb force_table_60
        tm      p2,#00100000b                       ; test the 50/60 bit
        jr      nz,UP60
        ld      force_add_hi,#^hb force_table_50
        ld      force_add_lo,#^lb force_table_50
UP60:

        add     force_add_lo,up_temp                ; calculate the address add 2X temp
        adc     force_add_hi,#00h                   ;
        add     force_add_lo,up_temp                ; calculate the address add 2X temp
        adc     force_add_hi,#00h                   ;

        di
        ldc     up_force_hi,@force_add          ; get hi byte
        incw    force_add                           ; get low byte
        ldc     up_force_lo,@force_add          ;
        ei

GOT_FORCE:

        ld      pwm_count,#TOTAL_PWM_COUNT          ; max count
        ld      pulsewidth,#MIN_COUNT               ; set initial pulsewidth
        ld      dn_temp,#MIN_COUNT              ; start initial pw
        ld      up_temp,#MIN_COUNT              ;
pwm_exit:
        ld      t1,pulsewidth                       ; load timer with pulse
        pop     rp                                  ; restore pointer
        iret                                                ; return from int


;-----------------------------------------------------------------------------
; 66    FORCE TABLE
;-----------------------------------------------------------------------------
force_table_60:
```

```
S_0:    .word   1B58H
S_1:    .word   1B58H
S_2:    .word   1B8AH
S_3:    .word   1BBCH
S_4:    .word   1BEEH
S_5:    .word   1C20H
S_6:    .word   1C52H
S_7:    .word   1C84H
S_8:    .word   1CB6H
S_9:    .word   1CDAH
S_10:   .word   1CFEH
S_11:   .word   1D22H
S_12:   .word   1D36H
S_13:   .word   1D4AH
S_14:   .word   1D5EH
S_15:   .word   1D72H
S_16:   .word   1D86H
S_17:   .word   1D9AH
S_18:   .word   1DAEH
S_19:   .word   1DC2H
S_20:   .word   1DD6H
S_21:   .word   1DEAH
S_22:   .word   1DFEH
S_23:   .word   1E12H
S_24:   .word   1E26H
S_25:   .word   1E3AH
S_26:   .word   1E4EH
S_27:   .word   1E62H
S_28:   .word   1E76H
S_29:   .word   1E8AH
S_30:   .word   1E9EH
S_31:   .word   1EB2H
S_32:   .word   1EC6H
S_33:   .word   1EDAH
S_34:   .word   1F0CH
S_35:   .word   1F3EH
S_36:   .word   1F70H
S_37:   .word   1FA0H
S_38:   .word   1FD4H
S_39:   .word   2006H
S_40:   .word   2038H
S_41:   .word   206AH
S_42:   .word   209CH
S_43:   .word   20CEH
S_44:   .word   2132H
S_45:   .word   2196H
S_46:   .word   21FAH
S_47:   .word   225EH
S_48:   .word   22C2H
S_49:   .word   2326H
S_50:   .word   238AH
S_51:   .word   2452H
S_52:   .word   24B6H
S_53:   .word   257EH
```

What is claimed is:

1. A method of operating a barrier movement actuating receiver to allow barrier movement activation by users of both semipermanent and temporary access codes and to deny activation to users of temporary access codes after the passage of a predetermined amount of time, wherein the barrier movement actuating receiver is located behind the barrier and remote from a remote access code transmitter and wherein movement of the barrier is controlled by receipt of a valid access code, the method comprising:

storing in the receiver a semipermanent access code which remains valid until invalidated by user access interaction;

storing in the receiver a temporary access code which remains valid until the passage of a predetermined period of time;

receiving a transmitted access signal responsive to a user input access code from the remote access code transmitter;

activating the barrier actuating receiver to send a barrier activation signal to move the barrier when the received access signal matches a stored signal responsive to a valid stored semipermanent access code and when the received access signal matches a stored signal responsive to a valid stored temporary access code; and invalidating the temporary access code upon the passage of the predetermined period of time.

2. A method in accordance with claim 1 comprising storing in the receiver a time indicator identifying the time period for which the temporary password is to remain valid.

3. A method in accordance with claim 2 wherein the invalidating step comprises invalidating the temporary access code upon the passage of a time derived from the time indicator stored in the time indicator storage step.

4. The method of claim 1 wherein said remote access code transmitter comprises a keypad type access code sender.

5. A method of operating a barrier movement actuating receiver to allow barrier movement activation by users of both semipermanent and temporary access codes and to deny activation to users of temporary access codes after a predetermined number of uses of the temporary codes, wherein the barrier movement actuating receiver is located behind the barrier and remote from a remote access code transmitter and wherein movement of the barrier is controlled by receipt of a valid access code, the method comprising:

storing in the receiver a semipermanent access code which remains valid until invalidated by user interaction;

storing in the receiver a temporary access code which remains valid until after a predetermined number of receptions thereof;

receiving a transmitted access signal responsive to a user input access code from the remote access code transmitter;

activating the barrier actuating receiver to send a barrier activation signal to move the barrier when the received access signal matches a stored signal responsive to a valid stored semipermanent access code and when the received access signal matches a stored signal responsive to a valid stored temporary access code; and invalidating the stored temporary access code after a predetermined number of receptions thereof.

6. The method of claim 5 wherein said remote access code transmitter comprises a keypad type access code sender.

7. A method in accordance with claim 5 comprising storing in the receiver a usage value indicative of the number of uses for which the temporary password is to remain valid.

8. A method in accordance with claim 7 wherein the invalidating step comprises invalidating the temporary password when the temporary password is used to activate the receiver a number of times derived from the stored usage value.

9. A method in accordance with claim 8 comprising decrementing the stored usage value each time the temporary password is used to activate the receiver.

10. The method of claim 5 comprising invalidating the stored temporary access code upon the passage of a predetermined period of time.

11. A method of operating a barrier movement actuating receiver to allow barrier movement activation by users of both semipermanent and temporary access codes and to deny activation to users of temporary access codes after the passage of a predetermined amount of time and/or a predetermined number of uses of the temporary codes, wherein the barrier movement actuating receiver is located behind the barrier and remote from a remote access code transmitter and wherein movement of the barrier is controlled by receipt of a valid access code, the method comprising:

storing in the receiver a semipermanent access code which remains valid until invalidated by user access interaction;

storing in the receiver a temporary access code which remains valid until the passage of a predetermined period of time and/or after a predetermined number of receptions thereof;

receiving a transmitted access signal responsive to a user input access code from the remote access code transmitter;

activating the barrier actuating receiver to send a barrier activation signal to move the barrier when the received access signal matches a stored signal responsive to a valid stored semipermanent access code and when the received access signal matches a stored signal responsive to a valid stored temporary access code; and invalidating the temporary access code upon the passage of a predetermined period of time and/or after a predetermined number of receptions thereof.

12. The method of claim 11 wherein said remote access code transmitter comprises a keypad type access code sender.

13. A method of operating a barrier movement actuating receiver to allow barrier movement activation by users of both semipermanent and temporary access codes and to deny activation to users of temporary access codes after expiration of the temporary access code, wherein the barrier movement actuating receiver is located behind the barrier and remote from a remote access code transmitter and wherein movement of the barrier is controlled by receipt of a valid access code, the method comprising:

storing in the receiver a semipermanent access code which remains valid until invalidated by user access interaction;

storing in the receiver a temporary access code which remains invalid until it expires;

receiving a transmitted access signal responsive to a rolling code from the remote access code transmitter, wherein the rolling code includes a portion responsive to a user input access code;

activating the barrier actuating receiver to send a barrier activation signal to move the barrier when the received access signal matches a stored signal responsive to a valid stored semipermanent access code and when the received access signal matches a stored signal responsive to a valid stored temporary access code; and invalidating the temporary access code upon the expiration of the temporary access code.

14. The method of claim 13 wherein the temporary access code expires upon the passage of a predetermined period of time.

15. The method of claim 13 wherein the temporary access code expires after a predetermined number of receptions thereof.

16. The method of claim 13 wherein the temporary access code expires upon the passage of a predetermined period of time and/or after a predetermined number of receptions thereof.

17. The method of claim 13 wherein said remote access code transmitter comprises a keypad type access code sender.

18. The method of claim 13 wherein the rolling code from the remote access transmitter is converted to a trinary bit code prior to generating a transmitted access signal.

* * * * *